United States Patent [19]

Desalu

[11] 4,064,392
[45] Dec. 20, 1977

[54] ENGINEERED SAFEGUARDS SYSTEMS AND METHOD IN NUCLEAR POWER PLANT TRAINING SIMULATOR

[75] Inventor: Adewunmi A. Desalu, Cambridge, Mass.

[73] Assignee: Westinghouse Electric Corporation, Pittsburgh, Pa.

[21] Appl. No.: 519,723

[22] Filed: Oct. 31, 1974

Related U.S. Application Data

[63] Continuation of Ser. No. 335,285, Feb. 23, 1973, abandoned.

[51] Int. Cl.² ............................................ G06F 15/52
[52] U.S. Cl. .................................. 364/492; 176/19 R; 364/504; 364/578; 364/300
[58] Field of Search ............... 444/1; 235/184, 151.21, 235/151.3, 151; 176/19, 24; 35/10, 13, 10.2; 340/172.5

[56] References Cited

U.S. PATENT DOCUMENTS

| 3,061,945 | 11/1962 | Hawkins | 35/10 |
| 3,237,318 | 3/1966 | Schager | 35/10 |

OTHER PUBLICATIONS

Reactor Simulator Utilizing a Vacuum System; Harry Reese, Jr.; RCA Technical Notes; RCA TN No.: 493, Sept. 1961.
Dynamic Simulation of a Fast Reactor; R. G. Olson, Nucleonics, May, 1957; pp. 76–79.
An Electronic Reactor Simulator; Ross Cameron & D. A. Austin; Nuclear Power; Apr. 1957, pp. 146–151.
PWR Training Simulator; J. P. Franz & W. H. Alliston; Nucleonics, May, 1957; pp. 80–83.

Primary Examiner—Edward J. Wise
Attorney, Agent, or Firm—H. W. Patterson

[57] ABSTRACT

A method and system for simulating the dynamic real-time operation of a nuclear power plant wherein a plurality of remote control devices provide input data to a digital computer to calculate physical values corresponding to plant operation to operate indicating devices for monitoring the physical operation of the plant.

24 Claims, 29 Drawing Figures

| N₂ SUP TO ACCUM. ⓖ ⓡ [SACVN2] 8880 (ACCUM) | ACCUM. FILL FROM S.I. PMP ⓖ ⓡ [SACV85] 8881 (ACCUM) | ACCUM. FILL FROM B.I.T. ⓖ ⓡ [SACV86] 8882 (ACCUM) | |
|---|---|---|---|
| ACCUM. D VENT STOP ⓖ ⓡ [SACV63] 8875C (ACCUM) | ACCUM. D DRAIN STOP ⓖ ⓡ [SACV23] 8876C (ACCUM) | ACCUM. D TEST LINE ISOL. ⓖ ⓡ [SACV33] 8877C (ACCUM) | ACCUM. D TEST (AFTER CHECK) ISOL. ⓖ ⓡ [SACV53] 8879C (ACCUM) |
| ACCUM. C VENT STOP ⓖ ⓡ [SACV62] 8875B (ACCUM) | ACCUM. C DRAIN STOP ⓖ ⓡ [SACV22] 8876B (ACCUM) | ACCUM. C TEST LINE ISOL. ⓖ ⓡ [SACV32] 8877B (ACCUM) | ACCUM. C TEST (AFTER CHECK) ISOL. ⓖ ⓡ [SACV52] 8879B (ACCUM) |
| ACCUM. B VENT STOP ⓖ ⓡ [SACV64] 8875D (ACCUM) | ACCUM. B DRAIN STOP ⓖ ⓡ [SACV24] 8876D (ACCUM) | ACCUM. B TEST LINE ISOL. ⓖ ⓡ [SACV34] 8877D (ACCUM) | ACCUM. B TEST (AFTER CHECK) ISOL. ⓖ ⓡ [SACV54] 8879D (ACCUM) |
| ACCUM. A VENT STOP ⓖ ⓡ [SACV61] 8875A (ACCUM) | ACCUM. A DRAIN STOP ⓖ ⓡ [SACV21] 8876A (ACCUM) | ACCUM. A TEST LINE ISOL. ⓖ ⓡ [SACV31] 8877A (ACCUM) | ACCUM. A TEST (AFTER CHECK) ISOL. ⓖ ⓡ [SACV51] 8879A (ACCUM) |
| RWST. TO S.I. PMP SUCT. ⓖ ⓡ [SICV2M] 8806 (SISHHSI) | S.I. PMP DSCHG. ISOL. ⓖ ⓡ [SICV2G] 8802 (SISHHSI) | RHR LP B TEST LINE ISOL. ⓖ ⓡ [SICV5T] 8884B (SILHRP) | RHR LP B TEST LINE ISOL. ⓖ ⓡ [SICV5V] 8885B (SILHRP) |
| S.I. PMPS TO RWST. TANK ⓖ ⓡ [SICV2Q] 8814 (SISHHSI) | S.I. PMP ACCUM. TEST LINE ISOL. ⓖ ⓡ [SICV5W] 8888 (SILHRP) | | |
| S.I. PMPS TO RWST. TANK ⓖ ⓡ [SICV2P] 8813 (SISHHSI) | | RHR LP A TEST LINE ISOL. ⓖ ⓡ [SICV5S] 8884A (SILHRP) | RHR LP A TEST LINE ISOL. ⓖ ⓡ [SICV5U] 8885A (SILHRP) |

| COMP. COOLING WATER TO UNIT<br>(G)(R)<br>CCCVV2<br>(CCSYS) | COMP COOLING WATER FROM RHX STOP<br>(G)(A)(R)<br>CCCVV1 9412A<br>(CCSYS) | COMP. COOLING FROM EX LETDOWN(ISCHG) STOP<br>(G)(R)<br>CCCVV6 9437<br>(CCSYS) | C.C. WATER FROM BEARING COOL. (RCP) STOP<br>(G)(R)<br>CCCVBR 9414<br>(CCSYS) |
|---|---|---|---|
| TRANSF. SERV. WATER COMP. COOLING PUMP<br>221 | COMP. COOLING WATER STOP<br>(G)(B)(R)<br>CCCVV3 9412B<br>(CCSYS) | COMP. COOLING WATER TO RC PUMPS INLET ISOL.<br>(G)(R)<br>CCCVV9 9413B<br>(CCSYS) | COMP. COOLING WATER FROM THERMO BARRIER<br>(G)(R)<br>CCCVTC 9438<br>(CCSYS) |
| COMP. COOLING TANK VENT STOP<br>(G)(R)<br>CCCVST RCV017<br>(CCSYS) | COVER PLATE | COMP. COOLING WATER TO RC PUMPS INLET ISOL.<br>(G)(R)<br>CCCVV8 9413A<br>(CCSYS) | COMP. COOLING WATER FROM THERMO BARRIER STOP<br>(G)(R)<br>CCCVTB 9436<br>(CCSYS) |
| SERV. WATER SUPPLY TO AUX. F.W. PUMP STOP A<br>(G)(R)<br>SWCV12 FW97<br>(SUBI4) | SERV. WATER SUPPLY TO AUX. F.W. PUMP STOPS B<br>(G)(R)<br>SWCV14 SW99<br>(SUBI4) | SERV. WATER SUPPLY TO AUX. F.W. PUMP STOPS C<br>(G)(R)<br>SWCV15 SW100<br>(SUBI4) | SERV. WATER SUCTION CROSSOVER STOP<br>(G)(R)<br>SWCV17 SW102<br>(SUBI4) |
| TURBINE ROOM SERVICE ISOL.<br>(G)(R)<br>SWCV25 SW108<br>(SUBI8) | SERV. WATER SUPPLY TO AUX. F.W. PUMP STOPS B<br>(G)(R)<br>SWCV11 SW96<br>(SUBI4) | SERV. WATER SUPPLY TO AUX. F.W. PUMP STOPS C<br>(G)(R)<br>SWCV13 SW98<br>(SUBI4) | SERV. WATER SUCTION CROSSOVER STOP<br>(G)(R)<br>SWCV16 SW101<br>(SUBI4) |
| STEAM GENERATOR AUX. F.W. STOPS B<br>(G)(R)<br>FACV55 FW92<br>(SUBI6) | STEAM GENERATOR AUX. F.W. STOPS B<br>(G)(R)<br>FACV51 FW94<br>(SUBI6) | STEAM GENERATOR AUX. F.W. STOPS C<br>(G)(R)<br>FACV53 FW96<br>(SUBI6) | STEAM GENERATOR AUX. F.W. STOPS D<br>(G)(R)<br>FACV57 FW98<br>(SUBI6) |
| STEAM GENERATOR A<br>(G)(R)<br>FACV54 FW93<br>(SUBI6) | STEAM GENERATOR B<br>(G)(R)<br>FACV50 FW95<br>(SUBI6) | STEAM GENERATOR C<br>(G)(R)<br>FACV52 FW97<br>(SUBI6) | STEAM GENERATOR D<br>(G)(R)<br>FACV56 FW99<br>(SUBI6) |

| SAFETY INJ. PUMPS TRIP | COMPONENT COOLING PUMPS INLET TEMP. HIGH | RESIDUAL HEAT REMOVAL PUMP 1A COOLING WATER FLOW LOW | RESIDUAL HEAT REMOVAL PUMP 1B COOLING WATER FLOW LOW | REACTOR TRIP BKR A/B TRIPPED | REACTOR CNMT. PRESS CHANNELS I, II, III, IV PRESS HIGH |
| --- | --- | --- | --- | --- | --- |
| CMPT. COOLING PUMPS ON LOCAL CONTROL | COMPONENT COOLING PUMPS DISCH. PRESS LOW | RESIDUAL HEAT REMOVAL PUMP 1A DISCH. PRESS HIGH | RESIDUAL HEAT REMOVAL PUMP 1B DISCH PRESS HIGH | TRAIN A BYPASS BREAKER IN OPERATE POSITION | REACTOR CNMT. PRESS CHANNELS I, II, III, IV PRESS HIGH HIGH |
| SAFETY INJECTION PUMPS COOLING WATER FLOW LOW | COMPONENT PUMPS COOLING OE, OD, OC NOT AVAILABLE | RESIDUAL HEAT REMOVAL PUMPS 1A, 1B TRIP | LOW AUTO-STOP OIL PRESS OR TURBINE STOP VLV'S CLOSED | TRAIN B BYPASS BREAKER IN OPERATE POSITION | |
| | COMPONENT COOLING SURGE TANK LEVEL HIGH LOW | RESIDUAL HEAT EXCHANGERS RHRA & RHRB COOLING WATER FLOW LOW | RESIDUAL HEAT REMOVAL PUMPS 1A & 1B NOT AVAILABLE | | |
| | CMPT. COOLING HEAT EXCHANGERS DISCH. TEMP HIGH | COMPONENT COOLING PUMPS OE, OD, OC TRIP | CMPTR. ALARM NIS RAD. TILT ROD DEV/SEQ. | | |

| MINI FLOW ISOL. VALVE | | VCT. OUTLET ISOL. | | CHG. HEADER ISOL. VALVE | | EMERGENCY MAKEUP FROM REF. WTR. STORAGE TANK VALVE | |
|---|---|---|---|---|---|---|---|
| CHCV06 8110 (CHCV) | CHCV07 8111 (CHCV) | CHCV01 LCV112C (CHCV) | CHCV02 LCV112B (CHCV) | CHCV03 8105 (CHCV) | CHCV04 8106 (CHCV) | SICV1N LCV112D (SICV) | SICV10 LCV112E (SICV) |
| LETDOWN FLOW STOP VALVE | RCS. LETDOWN ISOL. VALVE | LETDOWN ORIF. STOP VALVE | | LETDOWN LINE CONTM. ISOL. | | 3-WAY TEMP CONT. FLOW TO DEMIN. | VCT. VENT ISOL. VALVE |
| DWCV01 LCV460 (DWCV) | DWCV02 LCV459 (DWCV) | DWCV41 8149A (DWCV) | DWCV43 8149C (DWCV) | DWCV52 8152 (DWCV) | DWCV53 8153 (DWCV) | DWCVK1 TCV129 (DWCV) | DWCVVT 8101 (DWCV) |
| | EXC. LETDOWN CONTROL | | DWCV42 8149B (DWCV) | | | | 3-WAY VALVE FROM DEMIN. DWCVK2 8167 (DWCV) |
| | SFCVEX 8381 (EXCV) | | | | | | |
| B.A. INJ. TO BLENDER | PRIMARY WATER INJ. TO BLENDER | MAKEUP INJ. TO CHG. PUMPS HEADER | | RCP. SEAL BYPASS RETURN | | | |
| BACVBA FCV110A (BACBZZ) | BACVWA FCV111A (BACBZZ) | BACVBB FCV110B (BACBZZ) | | SFCV42 8142 (EXCV) | | | |
| RCP. SEAL WATER RETURN LINE | 3-WAY VALVE SEAL RETURN | RCP D SEAL LEAKOFF STOP VALVE | | RCP D STANDPIPE SUPPLY STOP | | | |
| SFCV00 8100 (EXCV) | SFCV8A,B 8143 (EXCV) | SFCV4C 8141C (EXCV) | | SFCV6C 8168C (EXCV) | | | |

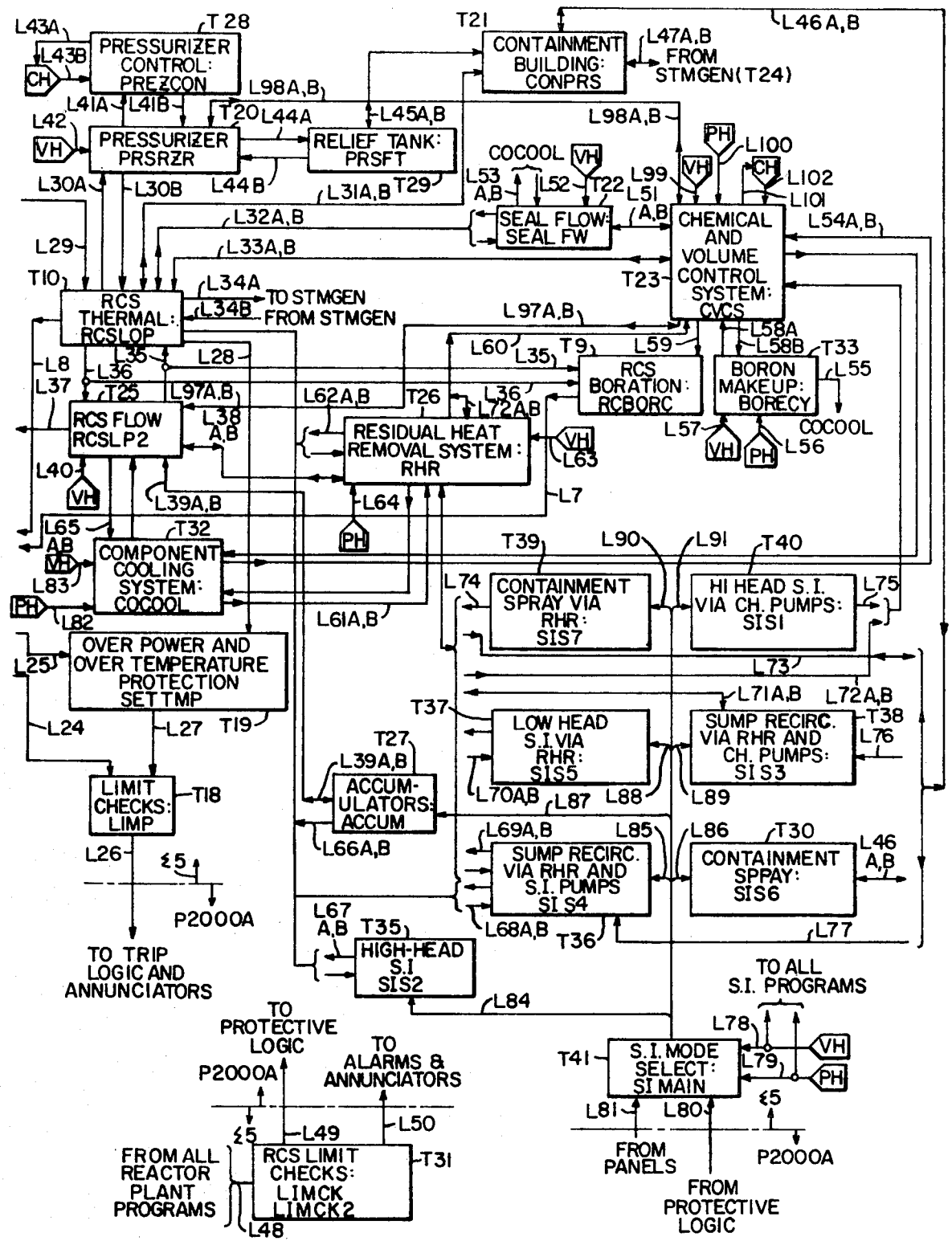
FIG.95/IB

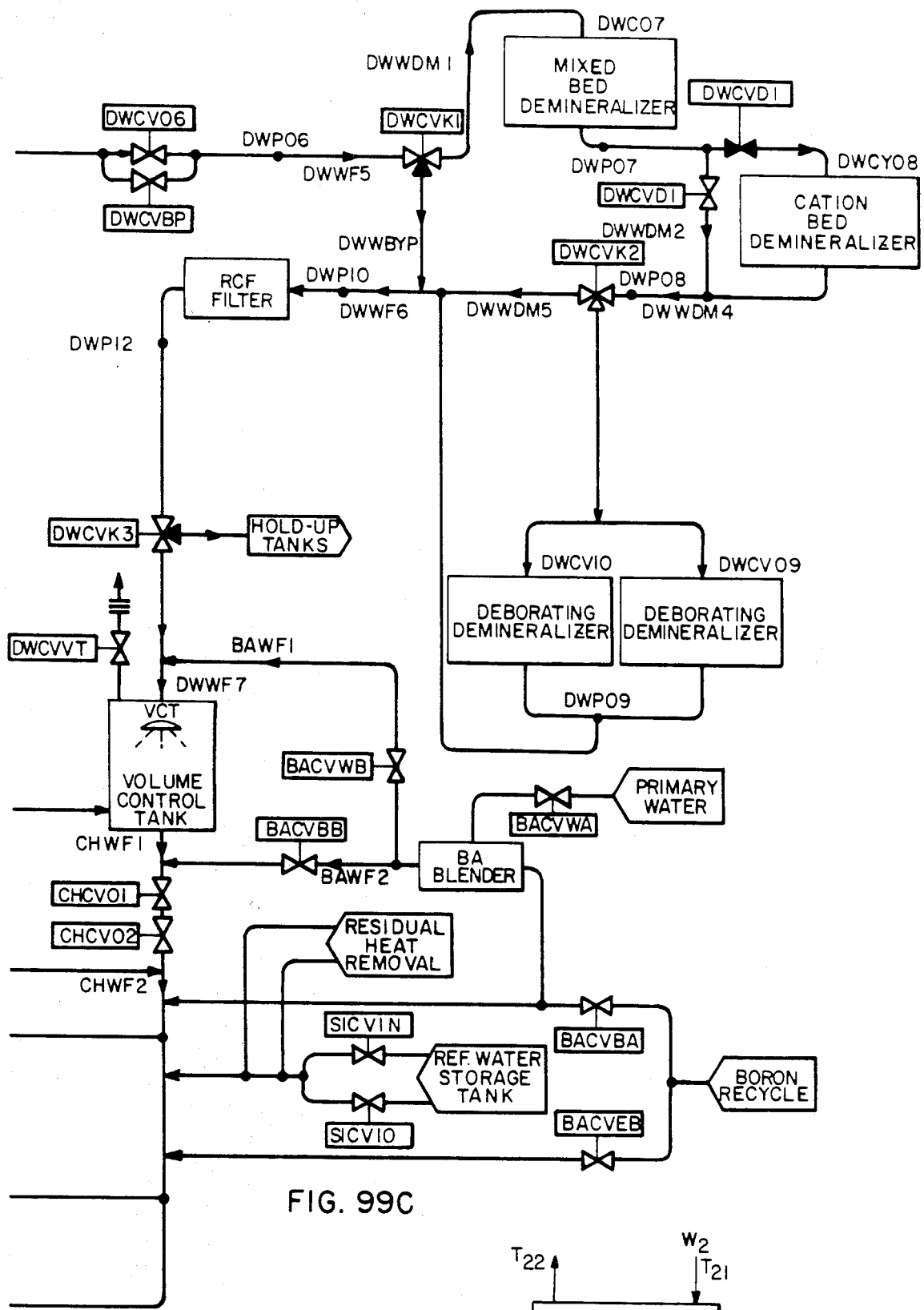
FIG. 99C
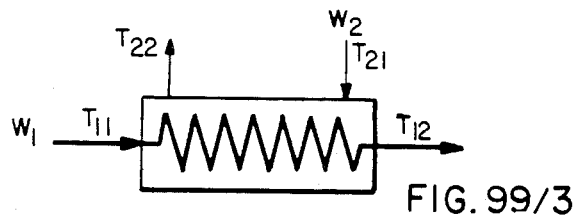
FIG. 99/3

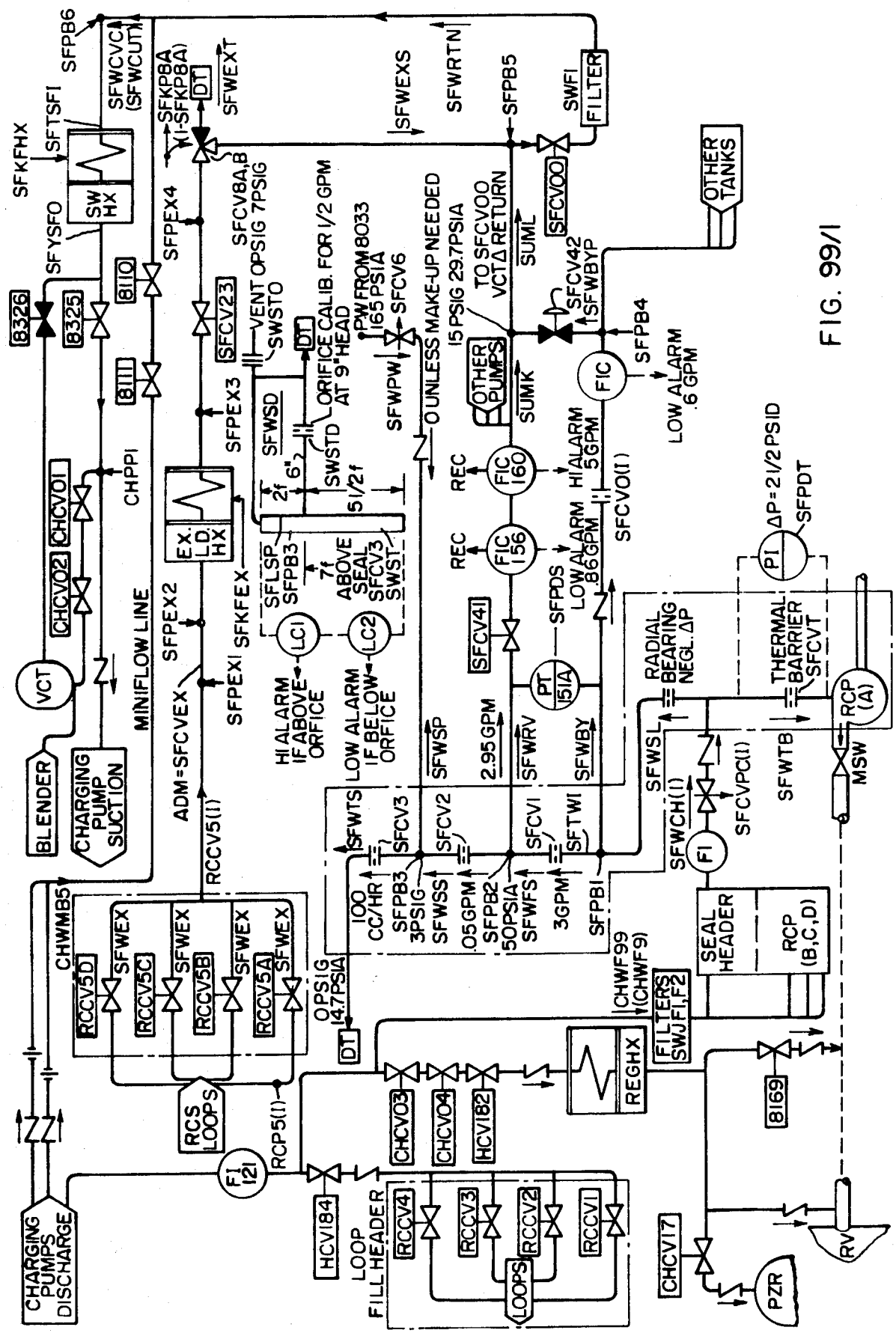
FIG. 99/1

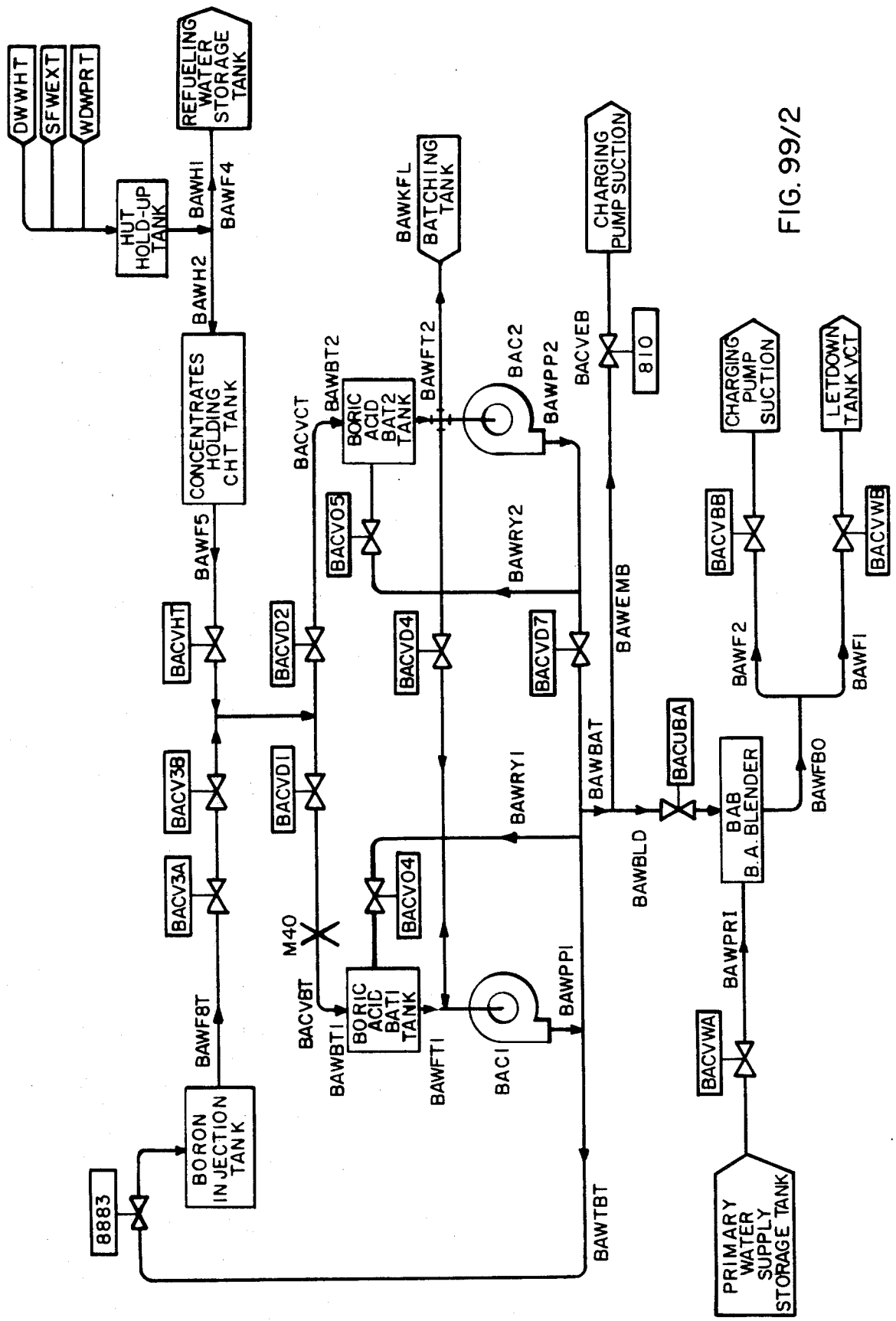
FIG. 99/2

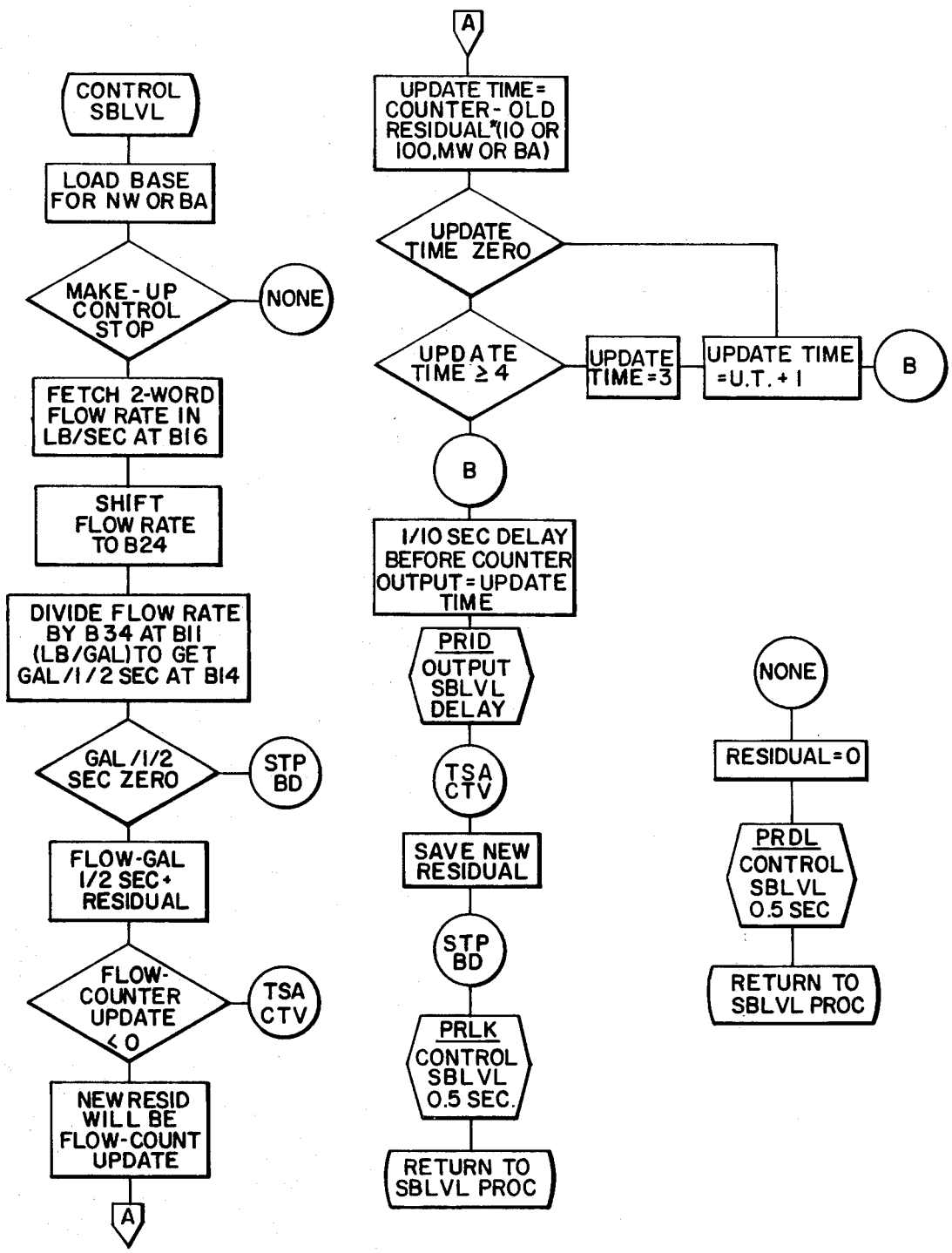
FIG. 99/4

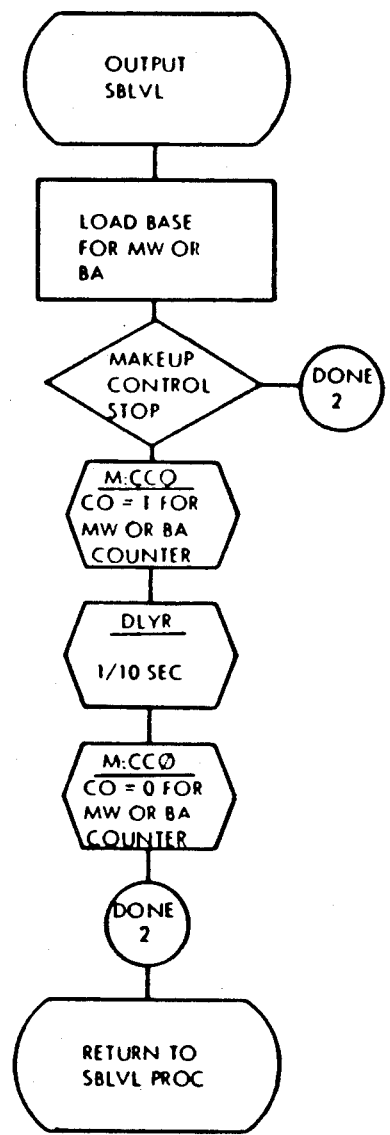
FIG. 99/5

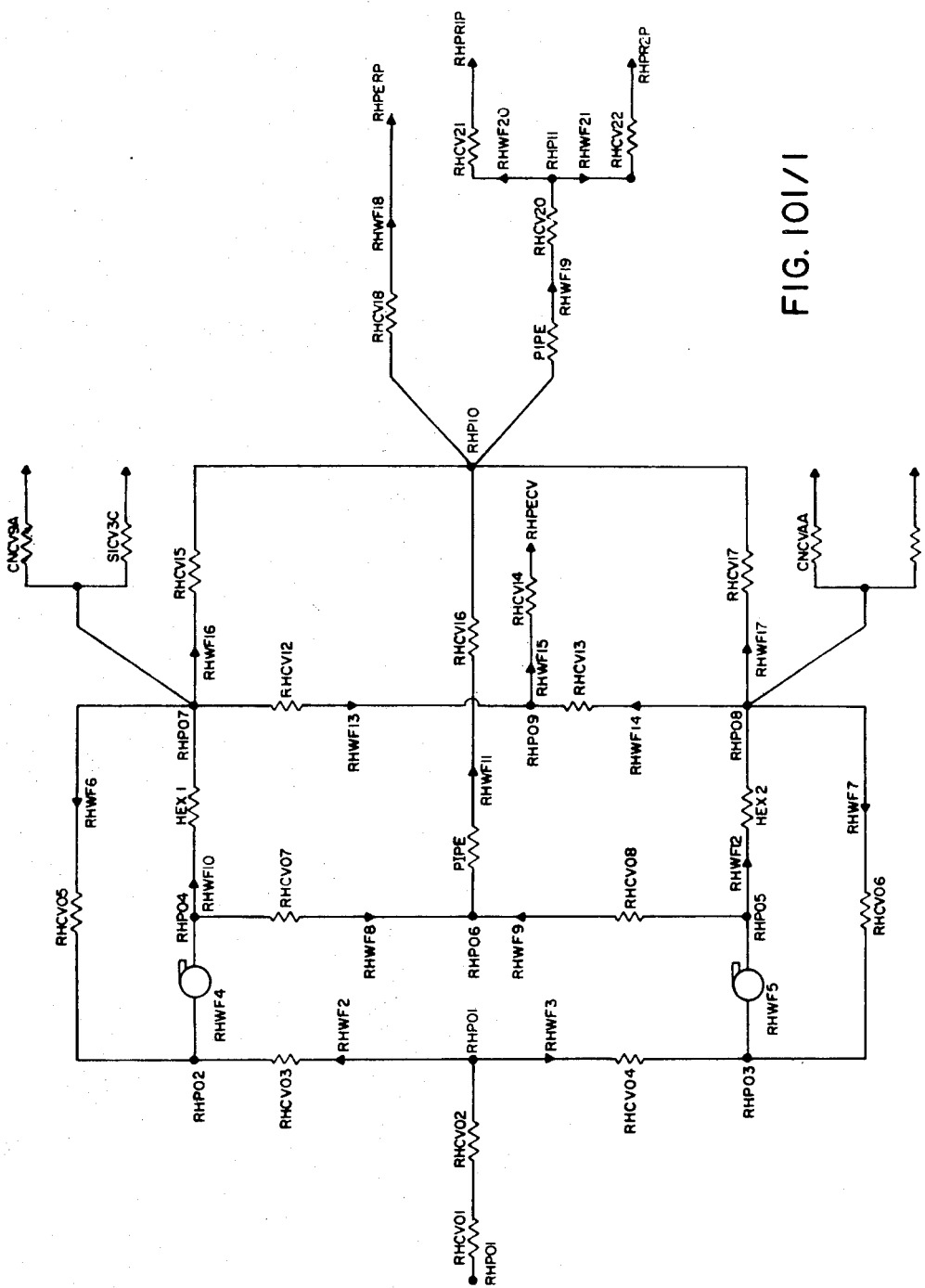
FIG. 101/1

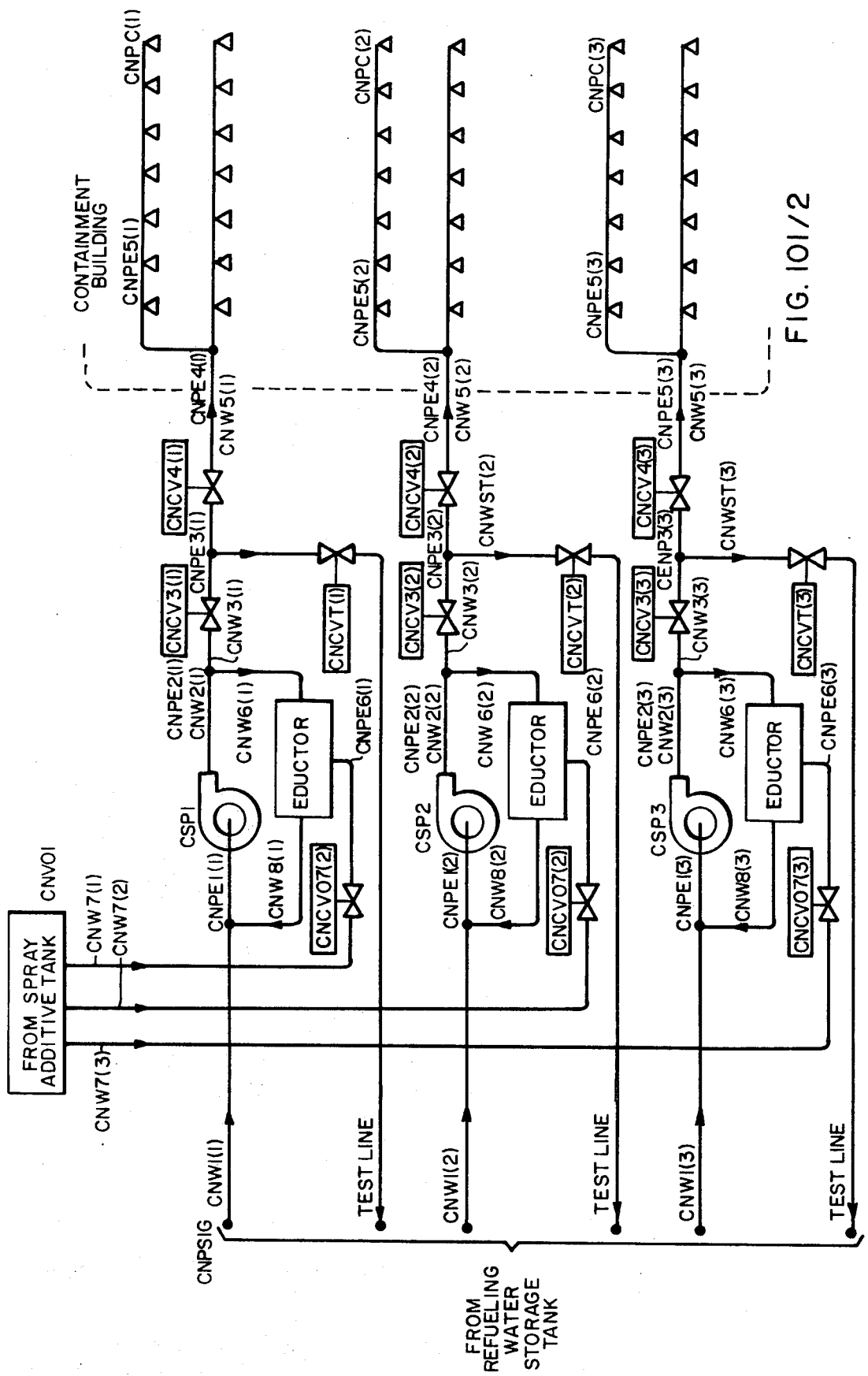
FIG. 101/2

ENGINEERED SAFEGUARDS SYSTEMS AND METHOD IN NUCLEAR POWER PLANT TRAINING SIMULATOR

This is a continuation, of application Ser. No. 335,285 filed Feb. 23, 1973, now abandoned.

CROSS-REFERENCE TO RELATED APPLICATIONS

Reference is made to the following concurrently filed and related patent applications which are assigned to the present assignee:

1. Ser. No. 333,901 entitled "Training Simulator For A Nuclear Power Plant" and filed by G. L. Gregg, R. E. Putman and J. W. Gomola filed Feb. 23, 1973 in U.S. Patent Office.
2. Ser. No. 335,286 entitled "Nuclear Power Plant Training Simulator System and Method" and filed by R. W. Ferguson and R. E. Converse filed Feb. 23, 1973 in U.S. Patent Office, now Pat. No. 3,903,463.
3. Ser. No. 335,295 entitled "Nuclear Power Plant Training Simulator Modeling Organization And Method" and filed by W. H. Alliston filed Feb. 23, 1973 in the U.S. Patent Office, now Pat. No. 3,919,720.
4. Ser. No. 335,181 entitled "Training Simulator For Nuclear Power Plant Reactor Monitoring" and filed by W. H. Alliston, F. R. Czerniejewski and B. A. Mutafelija filed Feb. 23, 1973 in U.S. Patent Office, abandoned.
5. Ser. No. Lb 335,288 entitled "Training Simulator For Nuclear Power Plant Reactor Control Model And Method" and filed by F. R. Czerniejewski, filed Feb. 23, 1973 in U.S. Pat. Office, now U.S. Pat. No. 3,914,794.
6. Ser. No. 335,294 entitled "Training Simulator For Nuclear Power Plant Reactor Coolant System and Method" and filed by W. H. Alliston and A. A. DeSalu filed Feb. 23, 1973 in U.S. Patent Office, now U.S. Pat. No. 3,916,445.
7. Ser. No. 335,391 entitled "Fluid Distribution Network And Steam Generators And Method For Nuclear Power Plant Training Simulator" and filed by W. H. Alliston, S. J. Johnson and B. A. Mutafelija filed Feb. 23, 1973 in U.S. Patent Office, now Pat. No. 3,914,795.
8. Ser. No. 335,183 entitled "Training Simulator And Method For Nuclear Power Plant Heater And Non-Linear Modeling" and filed by B. A. Mutafelija, filed Feb. 23, 1973 in U.S. Patent Office, now Pat. No. 3,936,885.
9. Ser. No. 335,293 entitled "Secondary System Modeling And Method For A Nuclear Power Plant Training Simulator" and filed by S. J. Johnson, filed Feb. 23, 1973 in U.S. Patent Office.
10. Ser. No. 335,184 entitled "Data Communication And Method For Real-Time Plural Computer Configuration" and filed by F. G. Willard, N. Slavin and L. S. Schmitz, filed Feb. 23, 1973 in U.S. Patent Office.

BACKGROUND OF INVENTION

The present invention relates to the full-scope real-time simulation of the dynamic operation of a nuclear powered electrical generating plant for training plant operators.

The increasing demand for well trained power plant operators together with the complexity of modern day power plants, has led to the realization that the simulator is the most effective tool for such training.

Also, with advancements in nuclear power plant technology, experienced operators from time-to-time need retraining in order to be competent. An actual nuclear plant cannot provide the operator with the required experience, such as starting up, changing load, and shutting down, for example, except after years of experience; and even then it is unlikely that he would observe the effect of important malfunctions and be able to take the best corrective procedures.

Although simulators have been used for many years, in power plant design, it is only recently that they have been used for power plant operator training. An article in the July 22, 1968 issue of Electrical World, entitled "Nuclear Training Center Using Digital Simulation" briefly describes the installation of a boiling water reactor plant simulator. An article in the same publication in the Oct. 6, 1969 issue entitled "Huge Simulator to Ready More Reactor Operators" discusses the proposed installation of a pressurized water reactor simulator. In Volume 10, No. 5 of the publication "Nuclear Safety" published during September and October 1969 is an article entitled "Training Nuclear Power Plant Operators With Computerized Simulators", and in the June 1972 issue of the publication "Power Engineering" there is an article entitled "Simulators" which describes a number of power plant operator training simulators presently in use or proposed.

Design simulators usually cover only a small part of the process, and may run slower or faster than real-time; while training simulators must operate and respond in a manner identical to the actual plant. A design simulator may involve only a narrow range of conditions, while a training simulator must simulate from "cold" shutdown to well beyond normal operating conditions. A design simulator usually involves only the major process, while a training simulator should cover every auxiliary system with which the plant is concerned.

Training simulators presently in use for operator training, which are more or less complete in their simulation utilize a digital computer that is connected to control consoles that are identical in operation and appearance to the plant being simulated. Also, an instructor's console is connected to control the simulator, introduce malfunctions, initialize the simulated plant at selected states of operation, and perform other functions useful for training purposes and control of the simulator.

Also, the simulation of the power plant must be of sufficient detail and accuracy that the operator cannot distingish between the behavior of the simulator and that of the actual plant under all normal and abnormal operating situations.

In the auxiliary and engineered safeguards systems, of the plant, for example, there are several complex non-linear fluid networks which must be simulated to operate in real-time under various operating situations. It is desirable to simulate such systems to eliminate iterative techniques. One way of accurately simulating such systems accurately with relative simplicity is to perform the calculations in accordance with an analogous electrical network, with the non-linearities applied by coefficient variation during successive time steps. Thus, linear equations can be solved with an initialized constant to obtain a new dependent variable, such as flow, from the linearized solution. Then, on a subsequent time step the new dependent variable is used to calculate a new set of coefficients where the non-linearity is included in the new set of coefficients for calculating a new updated variable. Thus, during each time step a value is calculated that is closer to the value that would be obtained by a complicated non-linear solution. To eliminate occasional numerical instability, an added correction term which is directly analogous to inertia in a fluid system can be used.

Further, with respect to boration of the reactor coolant loop, only the reactor senses the boron concentration. However, the time delays for the reactor to be effected by the injection of boron into different parts of the reactor coolant system loops are appreciable. Thus, in order to have accurate training simulation, this time delay should be simulated. For this purpose, it is desirable to simulate the reactor, reactor coolant loops and primary side of the steam generator as one tank. Should one of the reactor coolant loops be isolated, the equivalent volume for that loop can be removed from the simulated tank with respect to boron concentration. The isolated can be considered as a separate tank with the only connection between the two tanks being a mini-bypass flow around a cold leg stop valve of the loop, and the other leg stop valve if open. This path can then be used to balance the boron concentration in the isolated loop prior to cutting it into the system.

The actual safety injection system of a nuclear power plant consists of many parallel flow networks sharing many common components. These parallel paths have pressure heads defined at each end; and with the exception of severe accident conditions when several flow paths are called automatically, the specific flow path in operation is in accordance with a particular operating condition. In simulating the safety injection system, it is desirable to model the system into several different routines. Thus, upon the opening of the simulated valves, only the paths connected with those valves are called into operation. This saves computer time and unnecessary calculations. For each flow network, there are boundary conditions at both ends; and one desirable manner of solving for flow is to make the calculations in accordance with the electrical network analogy together with the introduction of inductance to inetgrate the flow from zero to steady state. This can be accomplished by using the pressure head at one end, to calculate flows and pressures down the loop and the expected pressure at the opposite end. Should the expected pressure differ from the pressure head at the one end, the difference can be divided by the inductance of the loop and converted to the required incremental flow and added to the flow distribution. Then the pressures can be recalculated until the pressures at each end of the particular path of the safety injection system are equal.

The residual heat removal system, like the safety injection systems has pressures defined at several boundaries. Two pressures are defined at the inlet and outlet of the reactor coolant loops, respectively; a third on the letdown line to a volume control tank and a fourth at a storage tank. Additionally, the residual heat removal system loop fans out to three additional loops, two of which are for cooling the coolant in the reactor coolant loop using residual heat removal pumps and heat exchangers, and a third, which is used primarily during start-up to control pressurizer pressure through the letdown line to the volume control tank. There is also a feedback path around each of the residual heat removal pumps and heat exchangers which are used primarily for warming the pumps prior to their use for cooldown. This system can be simulated in the same manner as the safety injection system. Additionally, it is necessary to simulate the thermal mixing of the three cooling paths in order to obtain accurate input and output enthalpies to the reactor coolant loops and letdown line.

The chemical and volume control system also can be subdivided into several sections for the purposes of simulation. However, in this regard, it is necessary for accurate simulation to consider the instability of the pressure regulated valve at low letdown flows. One advantageous way of effecting such a simulation is to simulate a small valve in parallel to provide a minimum valve coefficient for the controller. In actual plants, this valve is one that never closes completely. Further, in the simulation of the heat exchangers, it is possible for the flows to go to zero depending on the inlet and outlet valve positions, which causes thermal runaway on the low flow side. One way of preventing such an occurrence is to provide that the exit temperature of the low flow side does not exceed the inlet temperature of the other side of concentric flow heat exchangers or the outlet temperature for parallel flow heat exchangers.

The demineralization in the chemical and volume control system for the sake of simplicity can be simulated as pressure drops; and the automatic regulator for the volume control tank can be simulated such that nitrogen enters the volume control tank under low pressure and is relieved if it exceeds a maximum amount, in order to maintain a constant pressure on the tank.

The seal flow system which is used to prevent hot radiated water from entering the reactor coolant pump bearings and seals, should be simulated because of its importance to the system. This system is also used to pressurize an isolated reactor coolant loop by charging around the thermal barrier. However, it is desirable in such simulation to obtain correct calculated outputs for the large number of indicating devices on the control panel, and to keep the simulation as simple as possible. In keeping with this objective, it is desirable to simulate explicitly fast flows and pressure transients because of the small differential pressures, and to simulate the thermal effects on pump bearings and thermal barriers as lags.

To be complete, the component cooling system, which distributes cooling water to the various cooling systems, should be simulated. The system can be modeled as several continuous flow loops. The flow can be made dependent on the number of component cooling pumps in operation and their speed. The amount of surge flow can be made dependent on the change of density of the component cooling water due to thermal heat transfer at heat exchangers or cooling areas of the component cooling system loop.

To complete the simulation of the primary auxiliary systems, the accumulator system, which injects water into the reactor coolant loop automatically upon a decrease in pressure should be modeled in a simplified manner.

SUMMARY OF THE INVENTION

In accordance with the broad principles of the present invention, an improved method and system for simulating the real-time dynamic operation of a nuclear power plant is provided, which utilizes apparatus wherein a plurality of control devices and indication devices provide input data and respond to output data respectively to and from a computer that calculates physical values for the improved simplified simulation of a plurality of engineered safeguard and auxliary systems in the primary portion of the nuclear power plant.

In one aspect, an improved method and system for simulating the real-time operation of a complex non-linear fluid flow network is characterized by computer means that calculates in accordance with an analogous electrical network with non-linearities applied by coefficient variation in successive time steps.

In another aspect, an improved method and system for simulating the real-time operation of a boron concentration system is characterized by computer means and method that treats the reactor and reactor coolant loop as a single tank, with time delay incorporated into the boration at the reactor portion.

In still another aspect, an improved method and system for simulating the real-time operation of a safety injection system is characterized by computer means and method that segregates the system in accordance with its various network paths and calculating the physical values in accordance with pressure boundaries at the end of each path.

In still another aspect, the improved method and system is characterized by computer means and method that simulates the residual heat removal system to provide for operation during start-up that includes bypassing the residual heat removal pump and residual heat removal heat exchangers and preheating the residual heat removal pump.

In yet another aspect, the improved method and system is characterized by computer means and method that simulates the chemical and volume control system to include stabilizing pressure regulated valve means at low flows and preventing thermal runaway when flow is cut off at a heat exchanger.

In a further aspect, the improved method and system for simulating the dynamic operation of a nuclear power plane is characterized by a computer means and method for the improved simulation of the seal flow system for the reactor coolant pumps.

In a still further aspect, the improved method and system for simulating the dynamic operation of a nuclear power plant characterized by a computer means and method to simulate the accumulator system and the component cooling system.

BRIEF DESCRIPTION OF THE DRAWINGS

FIGS. 91C, 91D and 91H through 91L illustrate the front view of portions of the engineered safeguards system control console.

FIGS. 92A through 92F illustrate the front view of a portion of the reactor coolant system portion of the control console;

FIG. 95/1B is a functional block diagram illustrating the interconnections of the various individual modules that make up the simulator;

FIGS. 99A, 99B, and 99C when placed side-by-side illustrates schematically a portion of the chemical and volume control system of the type being simulated with emphasis on the charging and letdown functions of the system;

FIG. 99/1 is a schematic diagram of a portion of the chemical and volume control system with emphasis on the seal water injection system for a reactor coolant pump of the type being simulated;

FIG. 99/2 illustrates schematically the boron makeup or reactor makeup control system of the type being simulated;

FIG. 99/3 is a diagrammatic representation showing the inlets and outlets of a regenerative heat exchanger and letdown heat exchanger of the type being simulated;

FIGS. 99/4 and 99/5 illustrates a flow chart for the boric acid calculations;

FIGS. 101A through 101C when placed end-to-end represent a schematic diagram of a typical residual heat removal system and safety injection system of the type being simulated;

FIG. 101/1 illustrates an analogous electrical network of the simulation of the residual heat removal system;

FIG. 101/2 is a schematic diagram of the containment spray system of the type being simulated.

GENERAL DESCRIPTION OF SIMULATED NUCLEAR POWER PLANT

Figure 1:
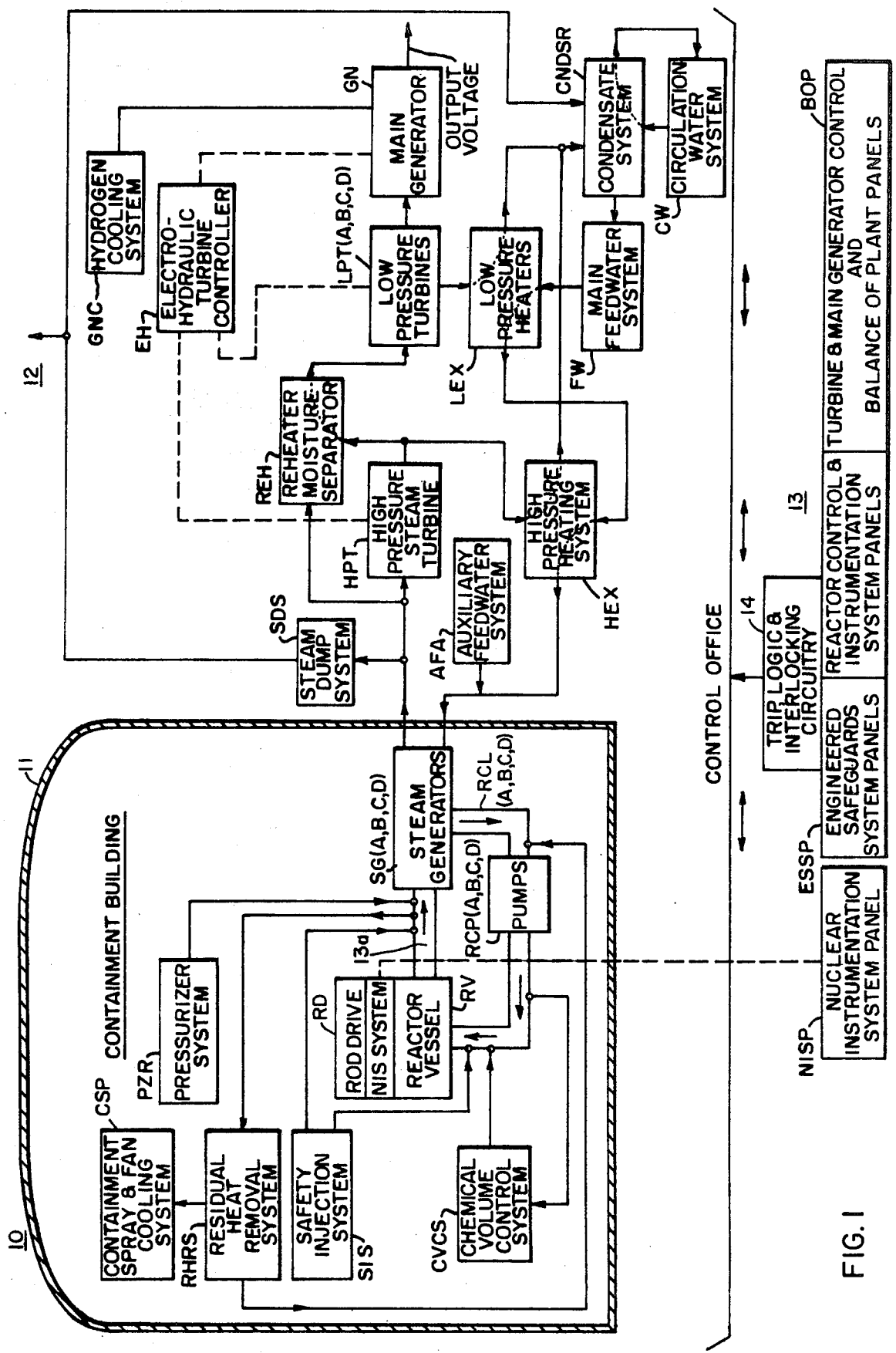
FIG. 1 shows a schematic block diagram of a nuclear powered electrical generating plant that is simulated in accordance with the present invention.

Referring to FIG. 1, the preferred embodiment of the invention is described in connection with the simulation of a nuclear power plant, in this case a four loop pressurized water reactor power plant. Such a plant includes a primary system generally referred to as 10 which is housed in a containment building 11, a secondary system, generally referred to as 12, and a control office that includes control and indication panels 13 for operating and monitoring the various elements in the power station. The plant itself is described herein in a general sense to an extent which will aid in understanding the invention. More detail on the plant is ascertainable from the more detailed invention description herein. Extensive background information on nuclear plants of various kinds is widely available in prior patents and publications. Certain invention features are applicable to nuclear plant types other than the pressurized water type.

The primary system includes a nuclear reactor housed in a reactor vessel RV and in this instance four closed reactor coolant loops RCL (A, B, C, and D), connected in parallel to reactor vessel RV. Each loop contains a reactor coolant pump RCP (A, B, C, and D) and a steam generator SG (A, B, C, and D). The reactor vessel RV, reactor coolant loop piping RCL, pumps RCP, and primary side of steam generators SG, all form what is referred to as a reactor coolant system RCS. The primary system 10 also includes an electrically heated pressurizer system PZR and certain auxiliary systems hereinafter described.

High pressure water circulates through the reactor vessel RV to remove the heat generated by a nuclear chain reaction within a fuel arrangement disposed in the reactor. This heated water exits from the reactor vessel RV and passes via the coolant loop piping RCL to the steam generators SG. In the steam generators SG, the coolant water gives up its heat to the feedwater in the secondary side of the steam generator SG to generate steam for a turbine driven electrical generator GN. The reactor coolant cycle is completed when the coolant is pumped back to the reactor vessel RV for reheating in the nuclear reactor.

Rod drive system RD is used to control reactor power level and consists of clusters or banks of movable cylindrical neutron absorber rods. The absorber rods move within guide tubes in certain fuel assemblies in the reactor fuel arrangement. The reactor coolant pumps RCP are vertical single stage mix flow pumps of the shaft seal type; and are designed so that adequate coolant flow is maintained to cool the reactor core adequately under all conceivable circumstances. The steam generators SG are vertical U-tube units that contain integrally therewith, in the secondary side, moisture separation equipment that reduces the moisture content of the steam to one-quarter percent or less. The electrically heated pressurizer PZR connected to one of the four reactor coolant loops RCL maintains the reactor coolant system RCS pressure during normal operation, limits the system coolant pressure variation during plant load transients, and keeps the system coolant pressure within design limits during abnormal conditions.

The reactor operating level is controlled inherently by a negative temperature coefficient of reactivity of the water; by control rod cluster positioning as already indicated; and by a soluble neutron absorber, such as boron in the form of boric acid. The boric acid is inserted into the coolant during cold shutdown, partially removed during startup, and adjusted in concentration during the life time of the fuel in the core to compensate for such effects as fuel consumption, and accumulation of fission products, which tend to slow the nuclear chain reaction.

The primary system includes engineered safeguard systems, ESS including chemical and volume control system CVCS, safety injection system SIS, residual heat removal system RHRS, containment spray and fan cooling system CSP, and an accumulator discharge system (not shown) which is described in detail in connection with the description of the individual models.

The chemical and volume control system CVCS performs a number of functions, such as filling the reactor coolant system RCS, providing a source of high pressure water or pressurizing the system RCS when cold, maintaining the water level in the pressurizer system PZR when the RCS system is hot, reducing the concentration of corrosion and fission products in the reactor coolant, adjusting the boric acid concentration of the reactor coolant, and providing high pressure seal water for the seals of the reactor colant pumps RCP.

The residual heat removal system RHRS portion of the engineered safeguard systems ESS transfers heat energy from the reactor core and the system RCS during plant shutdown and refueling operations. Components in the residual heat removal system RHRS are also employed in conjunction with the safety injection system SIS.

The safety injection system SIS supplies borated water to the system RCS to limit the fuel rod cladding temperature in the unlikely event of a loss of coolant accident. Also, the system SIS functions to provide a means of introducing a spray of borated water into the containmemt 11 as an additional dynamic heat sink. The system SIS includes several independent subsystems characterized by equipment and flow path redundancy. This redundancy assures complete reliability of operation, and continued core cooling even in the event of a failure of any single component to respond actively as intended. For example, during the passive accumulator injection phase of the system operation which is described in connection with the individual models, accumulator tanks rapidly inject borated water into the reactor coolant system automatically when the depressurization of loops RCL causes a reversal of the pressure drop across the accumulator check valves. The accumulators provide rapid cooling of the reactor core for large breaks which would otherwise result in core uncovering and overheating before the electrically driven low head safety pumps of the SIS system are energized and delivering coolant. The low head system of safety injection provides for injection of borated water into the RCL loops for large breaks, which would result in rapid blowdown and depressurization. A high head system for injection into the loops RCL for small breaks is provided for those instances that would result in slow blowdown and depressurization. The low head system utilizes pumps of the residual heat removal system RHRS which takes water from a refueling water storage tank, and pumps borated water through one of the residual heat exchangers, through an injection header and injection lines to each of the reactor coolant loops. The high head safety injection phase utilizes two subsystems which provide extremely rapid response to an SIS system actuation signal, utilizing a boron injection tank and a charging pump of the chemical and volume control system CVCS.

The containment building 11 completely encloses the entire primary system and insures that an acceptable upper limit for leakage of radioactive materials to the environment is not exceeded, even if gross failure of the elements contained therein were to occur. The containment spray system CSP is included in the primary system to limit the pressure in the containment atmosphere to below the containment design pressure, and remove sufficient iodine from the containment atmosphere to limit the radiation doses to safe value. This system delivers NaOH to the space within the containment building 11. The reactor containment fan cooling system portion of CSP which is also part of the containment building monitoring system removes heat from the containment building during normal operation, and during any loss of coolant accident. When a loss of coolant accident is sensed, the fan motors are automatically switched to low speed to provide circulation of the steam-air mixture in the containment building.

The steam generators SG (A, B, C, and D) deliver steam at appropriate pressure and temperature in the secondary system for conversion to mechanical and then to electrical energy in the turbines and the generators, respectively. The secondary steam is additionally used for various operational auxiliary services such as turbine shaft steam seals, turbine drives for main and auxiliary feedwater pumps and steam jet air ejectors.

Steam is admitted to a double flow high pressure turbine HPT that is controlled by governor valves with quick acting throttle or stop valves ahead of them for rapid isolation in an emergency. Four separate pipes convey steam from the governor valves to the turbine nozzle chambers. The steam passes through an impulse blading or control stage and a number of reaction stages of the high pressure turbine HPT; the impulse chamber steam pressure is measured and used as a load measurement for use in reactor control.

On leaving the last row of high pressure blades, the steam has a moisture content of approximately 10% Thus, the steam is then passed through a moisture separator and reheater REH to improve the turbine efficiency and reduce the low pressure turbine exhaust moisture. The exhaust steam from the high pressure turbine when first passed through the moisture separator portion REH removes approximately 10% of the flow which is extracted as moisture. The remaining 90% flows through steam heated reheater portion of REH where it receives approximately 100° F superheat. The moisture is removed and drained to a heater drain tank (not shown); and the steam which rises above the moisture separator passes over the reheater and is reheated by live steam.

The hot reheated steam is conveyed to the double flow low pressure turbines LPT (A, B, C) the number of which in use can depend on the electrical output required. The low pressure turbine exhaust directs the steam to a condenser CNDSR that has cooling water passing through tubes which condense the steam to water where it is collected in a chamber, called a hot well. The condenser cooling water is controlled by circulating water system CW. The condensate system CNDSR and the feedwater system FW return the condensed steam from the turbine condenser, and the drains of the regenerative feed heating cycle, to the steam generators SG (A, B, C, and D) while maintaining the proper water inventories throughout the cycle.

The feedwater system FW conveys the feedwater through low pressure heaters LEX and then through high pressure heaters HEX to the generators SG. The auxiliary feedwater system AFA is used when the main system is inoperative. These systems automatically maintain the water level of the steam generators SG during both steady-state and transient operation.

The turbine HPT is equipped with an electrohydraulic control system EH comprising a solid state electronic controller and a high pressure fluid supply. The electronic controller computes a control signal based on measured turbine speed, measured first stage steam pressure, and speed and loss reference values established by the dispatcher or initiated at the operator's control panel 13. The control signal is transmitted to the electrohydraulic actuator of each main steam throttle and/or governoring valve to produce the valve positioning needed to meet the reference load. During turbine startup, the throttle valves are position controlled to accelerate the turbine from turning gear or higher speed up to synchronous speed. The high pressure hydraulic fluid system provides the power for all turbine steam control valves, electrohydraulic actuators, and positions the governor valves in response to the electric control signals from the electronic controller. The interceptor valves are also operated by the hydraulic fluid, and they may be position controlled or simply controlled to be either open or closed.

The electrohydraulic control system provides turbine control during all phases of operation by varying the turbine valve openings. Hydraulic cylinders move the valves to the required opening with electrically operated servo-valves controlling the cylinder's position.

The main generator GN operated by the turbine is a hydrogen inner cooled synchronous generator with a water cooled stator and an output voltage of approximately 22 to 25 kV at 60 cycles. The excitation is provided by a shaft driven air cooled brushless exciter. Cooling for the generator is provided by system GNC which circulates hydrogen at a pressure of about 75 psig through the generator GN by fans attached to the generator shaft.

Various plant parameters including reactor parameters, coolant and steam pressures, temperature, and flows and liquid levels in the various systems, as well as the speed of the turbines and electrical output of the generator are sensed and displayed through meters, alarms, and annunciators on the central office panel 13. Among the reactor parameters the position of the rods of the reactor and the state of all operable components are displayed to inform the operator of the condition or state of operation of the nuclear power plant.

The state of operation of the various components of the plant and certain fluid pressures, temperatures, and levels are connected through interlocking and logic circuitry 14 to prevent unsafe operation of selected system components and to trip or shut down the plant under abnormal conditions.

Nuclear instrumentation panel NISP is provided with various recorders, indicators, meters, and selector switches to display the neutron flux values in various sectors of the reactor, both in an axial and radial direction, which function is termed in-core flux mapping.

Also, a portion of the panel NISP displays through meters the flux in various sectors of the reactor vessel RV to inform the operator of the various ranges of nuclear flux, such as source, range, intermediate range, and power range of the reactor during start-up shutdown, which operation is termed ex-core radiation detection. Further, the temperature of individual fuel rods of the reactor, and the radiation in various parts of the plant are monitored and displayed on the panels NISP. Finally, the auxiliary power to the plant is controlled by a portion of the panel NISP.

GENERAL DESCRIPTION OF SIMULATOR CONFIGURATION

The nuclear power plant simulator according to one embodiment of the invention comprise digital computation apparatus and peripheral equipment operatively connected to control and indication panels which are identical in appearance and wiring to the actual control and indication panels of the four loop pressurized water reactor power plane that is simulated. The general function, structure, and operation of digital computers is set forth in a publication entitled "Electronic Digital Systems" by Mr. R. K. Richards, which was published in 1966 by John Wiley and Sons, Inc. and bears the Library of Congress card catalog number 66-17618, to which reference is made for a detailed description thereof in order to aid in an understanding of the apparatus and methods in carrying out the invention.

Figure 2:
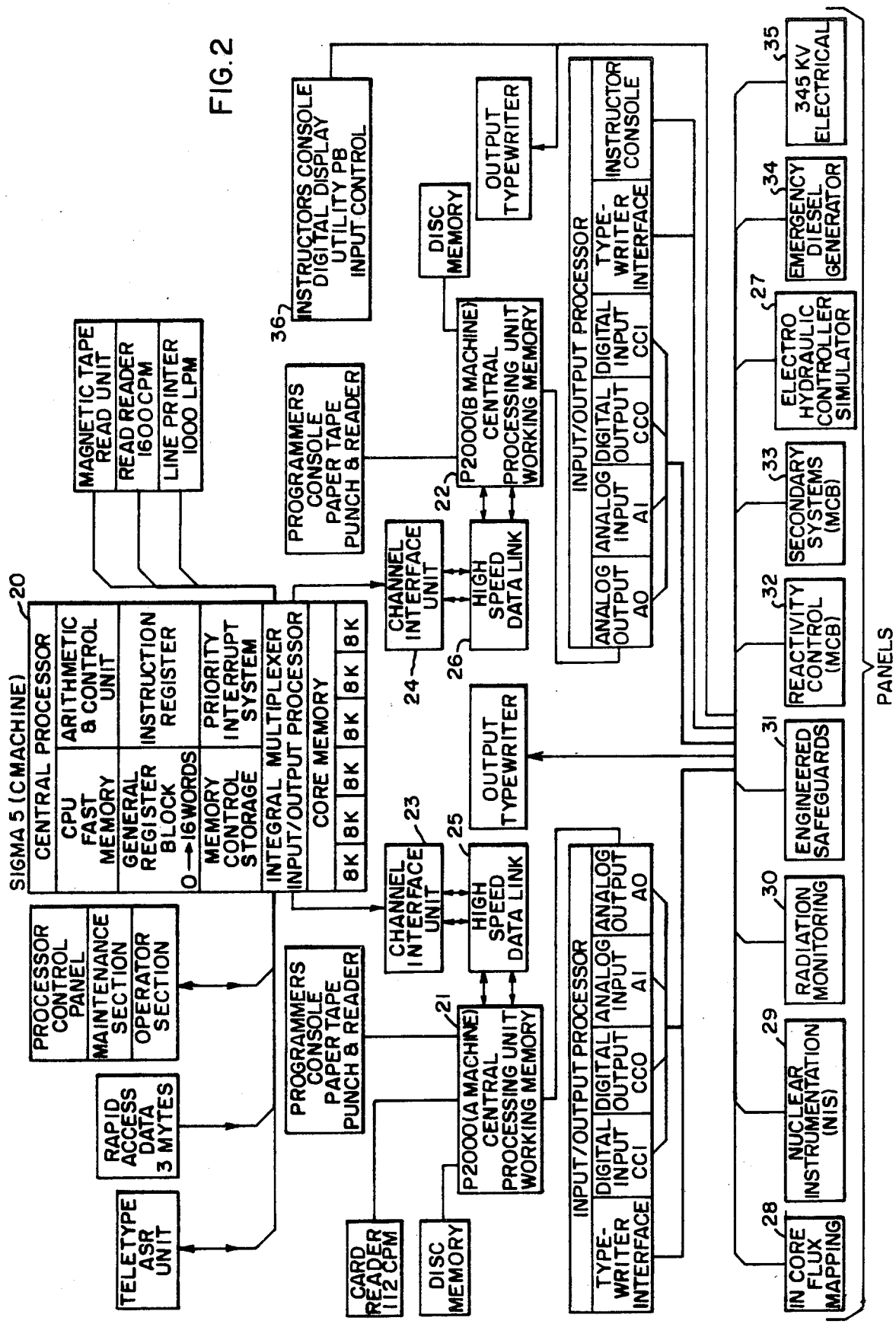
FIG. 2 shows a schematic block diagram of the apparatus used in simulating the operation of the plant shown in FIG. 1.
Figure 9I:
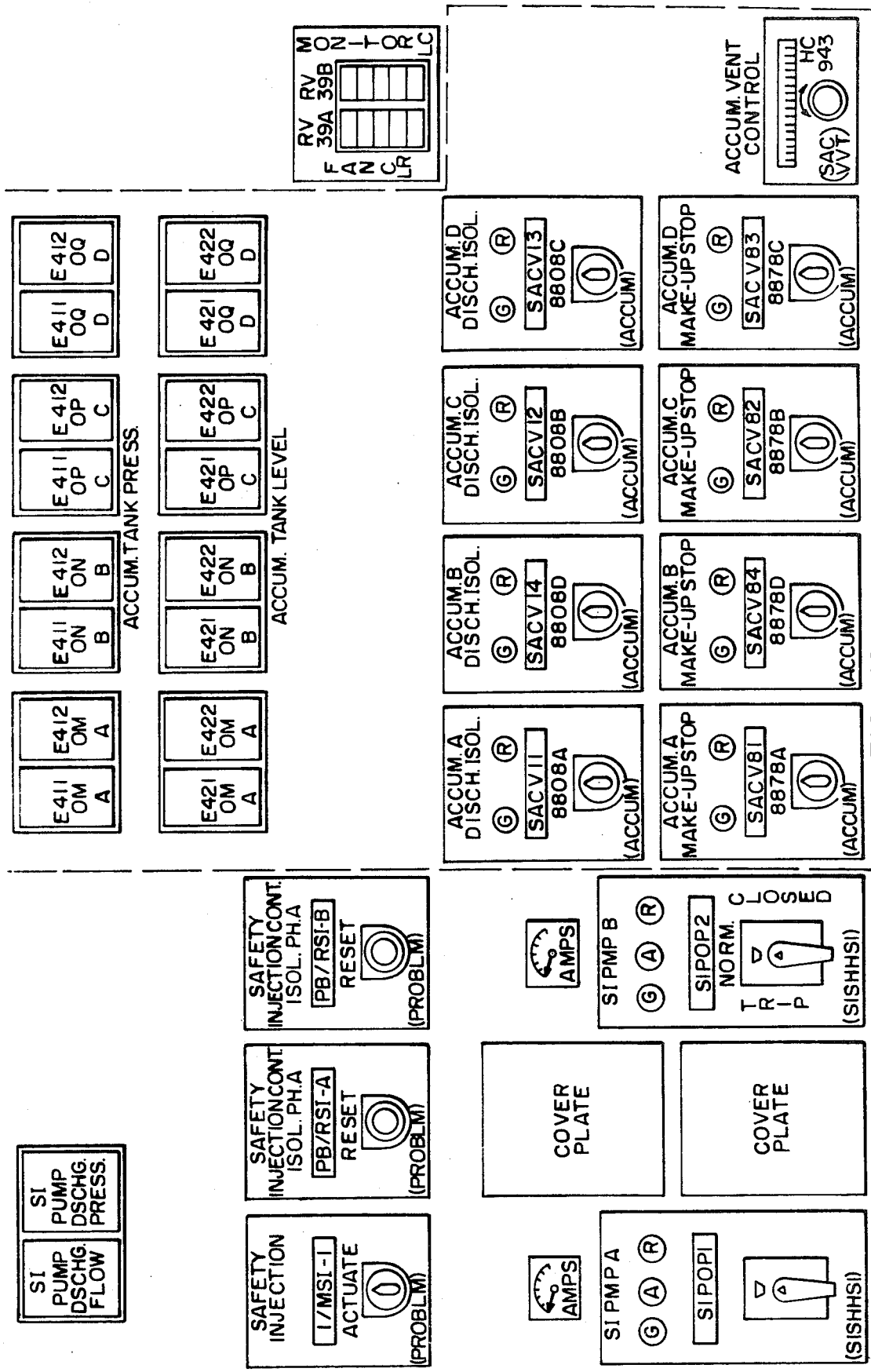
Figure 9I:
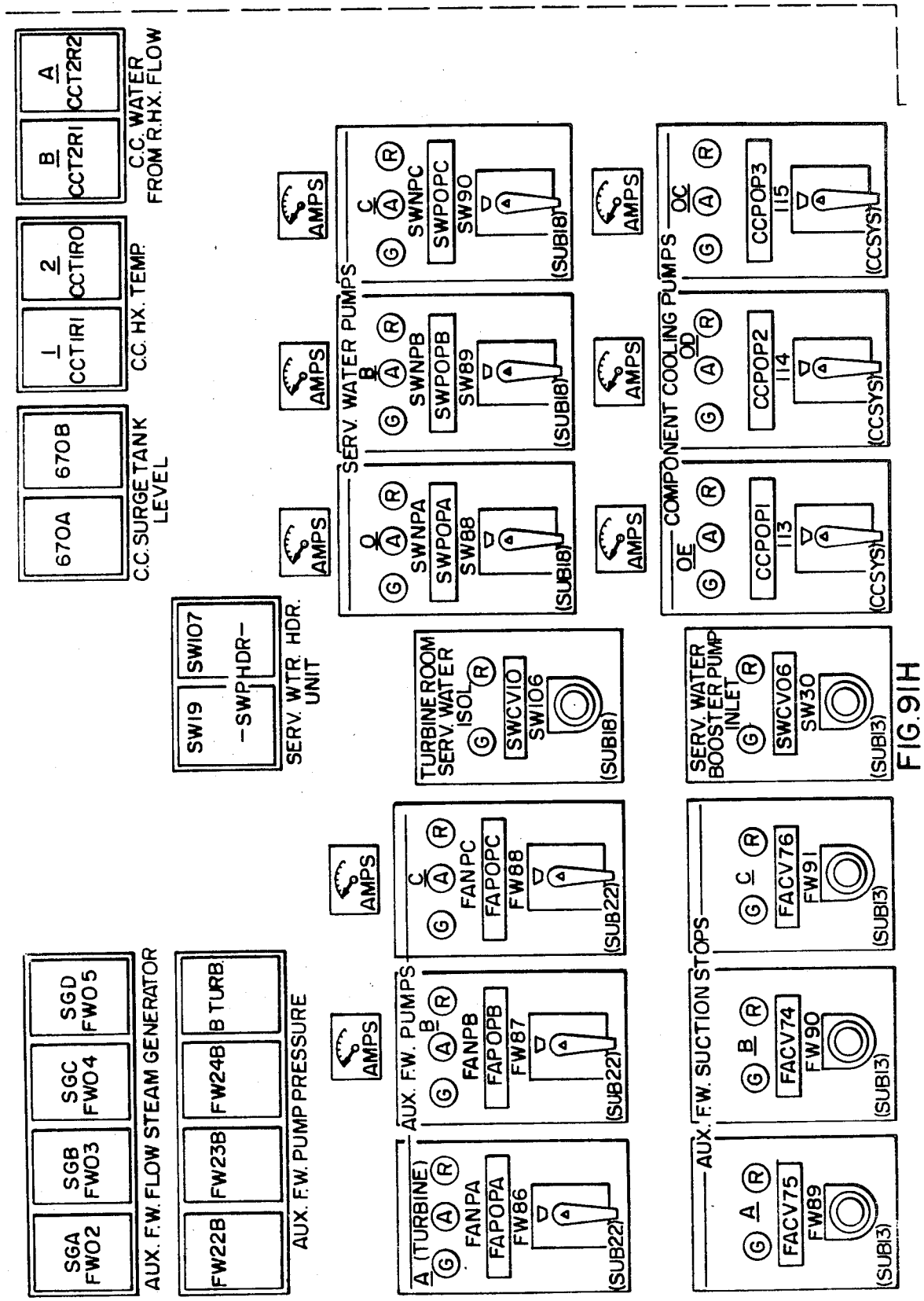
Figure 9I:
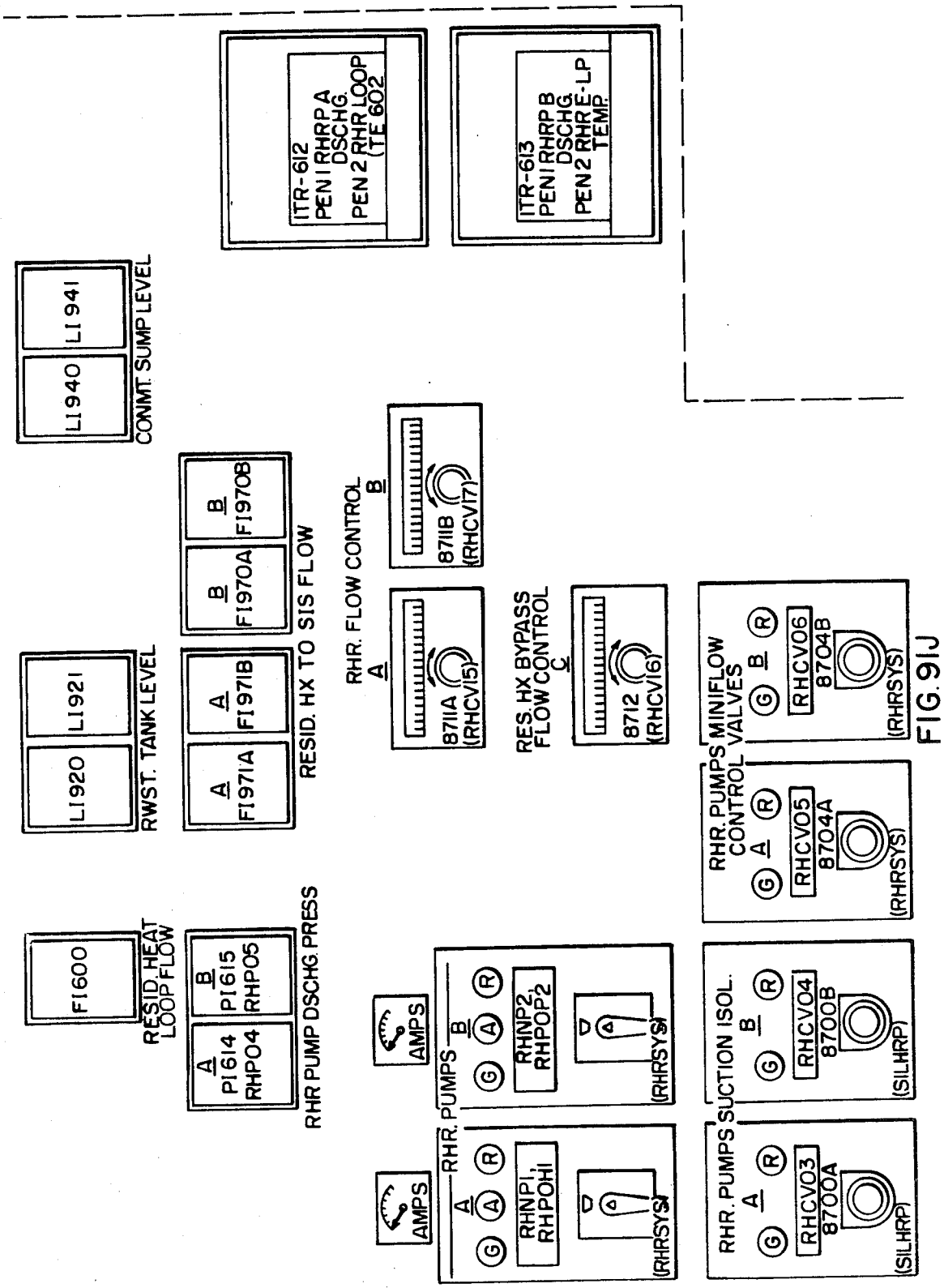
Figure 9I:
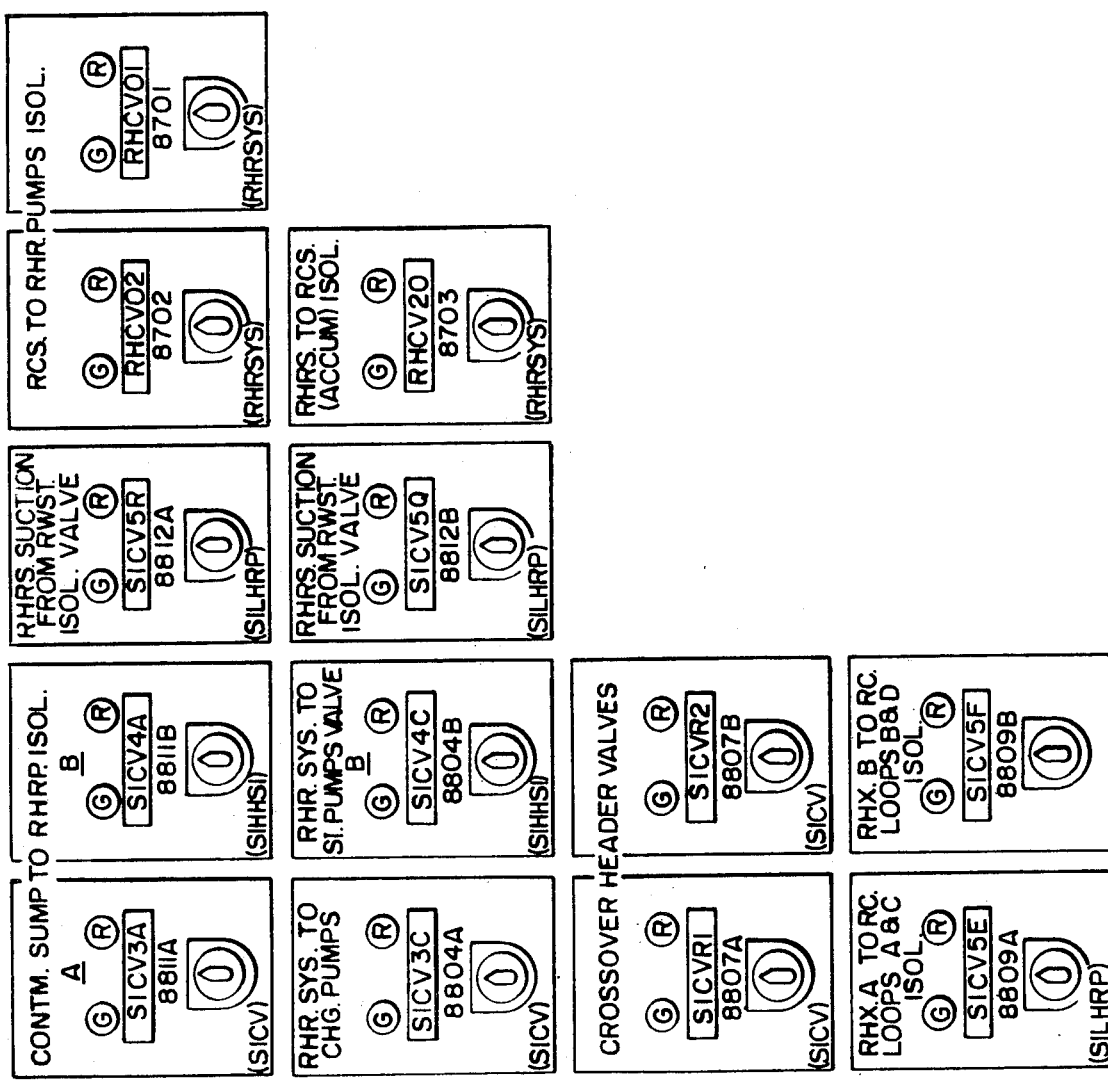

Specifically, and referring to FIG. 2, the simulation system includes a Sigma 5 digital computer 20 referred to at times in this specification also as the "C" machine and associated peripheral equipment. The Sigma 5 computer system is manufactured and sold by Xerox Data Systems, Inc. and has been in general use for over one year prior to the filing date of this application. For more information on the Sigma 5 computer system reference is made to the appendix.

The simulator also includes digital computers 21 and 22 referred to at times hereinafter also as the "A" machine and "B" machine, respectively and associated peripheral equipment of the type manufactured and sold by Westinghouse Electric Corporation, and which is known as model P2000, and which computers have been in general use for over one year prior to the filing data of this application. The P2000 digital computers 21 and 22 are described in a publication entitled "Prodac 2000 Computer Systems Reference Manual" copyrighted in 1970 by Westinghouse Electric Corporation and bears copyright Registration No. A244775, to which reference is made to aid in an understanding thereof.

The Sigma 5 computer, or C machine provides an extensive arithmetic capability for the power plant simulator. The computers 21 and 22, act as process input/output controllers for the C machine. In practicing many features of the invention, a single computer or other multiple computer arrangements may be employed.

Communication between the A, B, and C machines is provided by a combination of the Xerox Data Systems Model 7650 channel interface units 23 and 24, and high speed data link devices 25 and 26 respectively, described more fully hereinafter. The C machine provides the software control and synchronization for the multiple computer configuration involving the A machine, B machine, and C machine; and the A and B machines in addition to providing the process input/output capability for the C machine also provide a capability for instantaneous simulator responses through their external interrupt system, the processing of all interlock and protection system logic, and the processing of several are employed in the simulator models, such as a reactor control rods program. The significant hardware features associated with each of the A and B machines as shown in FIG. 2 included in the appendix. The major C macine hardward subsystems illustrated in FIG. 2 and utilized in the present embodiment of the invention are also included in the appendix to this specification.

The simulation of the electrohydraulic control system EH as depicted in FIG. 1 and represented by a simulator panel portion 27 of FIG. 2 is accomplished in part by the actual analog electrohydraulic controller manufactured and sold by Westinghouse Electric Corporation, which has been in use for more than a year prior to the filing date of this application. The panels 27 through 35 in FIG. 2 provide the same outward appearance and operation as panels in an actual plant and are connected directly through appropriate computer system equipment to the A machine and the B machine.

Instructur's console 36, which provides the control facility to start, stop and manipulate the simulator is connected to software in the B machine.

A basic real time batch monitor (hereinafter referred to as RMB) software system of the C machine is a two partition system designed for normally running simultaneously foreground and background programs. The foreground programs include the system software extension programs which are made up of a sublevel processor, data link handler, and disc handler. Such foreground programs also include data conversion routines, and various dynamic models for the simulated system, which include reactor models, primary system models, secondary system models, a valve handler routine, a pump handler routine, and a controller handler routine. In order to permit an economy in core memory requirements, in the present embodiment of the invention the foreground programs and the background programs are not run at the same time.

CONTROL PANELS

In controlling an actual nuclear power plant of the type being simulated, the individual control devices such as selector switches, levers, and pushbuttons close contacts to select certain components for operation, to energize motor operated valves, solenoids, and relays; and through a protective system of logic to select, or change the position or condition of various components for starting up, varying operation, shutting down, providing emergency measures in the event of malfunction, and testing components in subsystems of the plant. In addition, certain plant components or subsystems function in automatic control loops to which there are typically applied one or more monitored plant variables as feedback signals.

In monitoring the operation of an actual plant, temperature, pressure, flow, level, flux, and other physical measurements are detected by appropriate sensing devices which transmit such information to the control panels for operating meters, recorders, and indicators. As already indicated certain monitored variables are also used for control.

In realistically and accurately simulating the control and monitoring of a nuclear power plant in accordance with the present embodiment of the invention, such control panels together with the control and monitoring devices are an exact replica physically and operatively, of the plant being simulated. However, in simulating the system in accordance with the present embodiment, the control and monitoring devices of the control panels are wired to each other, and to turbine EH controller; and also to contact input and contact output terminals, respectively, on the A or B machines. The panel interface logic and the plane protective logic are contained in both the A and B machines as hereinbefore mentioned. The control consoles permit the student operator to control and monitor the operation of the plane in the same manner as the operator of an actual plant. For example, he can start up, increase the power, shut the plant down, and restart. At any time the instructor can change physical values or malfunction the models as previously described. Then the operator can change the operation of the plant to correct the malfunction or introduce emergency measures as required. The student is able to see realistically in real-time the consequences of any action that could be taken in the real plant.

In detailed drawings of the control panels, descriptive legends are associated with appropriate control and monitoring devices in a manner similar to an actual installation; and in addition thereto, software symbols in many instances are used to identify specific control panel devices with the same software symbol being used to identify the component being operated by such devices in the schematic diagrams of the actual system being simulated. In other instances, the actual valve number is used to the schematic diagram and the control panel where it will aid in understanding the simulation of the system.

In the software modeling aspects of the plant simulator, various plant parts are modularly designated as individual "models". With respect to the various plant system models, system variables are designated herein by using a maximum six character reference designation. The first two characters correspond to the system concerned; the next one or two characters correspond to the particular physical variable; and the final one or two characters correspond to a particular location, subscript, or description of the device.

Referring to FIG. 95/1B, each of the various models of the modularized simulator system according to the present embodiment of the invention is shown as an individual block having identified therein the computer subroutine or subroutines which structurally and functionally constitute the model or system module. The models generally correspond to functional parts of the simulated plant and they are appropriately interconnected to form the overall model, and they are coupled externally of the computer to the control panels by inputs and outputs referenced in such Figures as L1 through L178 inclusive to provide for instructor and operator interfacing. A list of the various models together with reference numerals are contained in the Appendix.

The blocks bearing the designation VH represent the valve handler program VCHAND that responds to the manipulation of the panel controls for operating the valves of the system. The blocks bearing the designation CH represent the controller handler program CONHAN that responds to the operation of the auto-manual controllers on the panels; and the blocks PH represent the pump handler program PHAND that is governed by the pump control switches on the panels. Thus, the programs VCHAND, CONHAN and PHAND provide simulation elements, i.e., valves, controllers and pumps, which are distributed throughout the model organization for interaction with the various system modules in accordance with their functional roles.

The appropriately labeled dashed lines intersecting the input and outputs L designate those functions that occur or are calculated in the Sigma 5 digital computer or C machine or one of the P2000 computers A or B as the case may be. As previously described, certain of the models are calculated four times per second or every cycle; other models are calculated two times per second or every other cycle; and some are calculated on demand or in response to the manipulation of an appropriate control. In this section of the specification, the individual models and their interaction are described and the reasons for the presence of such models and that interaction are made more apparent elsewhere herein.

The RCS thermal model T10 provides an output L30A which comprises surge flow, surge enthalpy for flow into the pressurizer, spray enthalpy, saturation pressure of the reactor vessel dome, saturation pressure of the reactor outlet, and cold leg pressure at the spray tap point. The output L30A is utilized in the pressurizer (PRSRZR) model T20. The model T20 in turn calculates the simulated coolant branches for normal condition (steam bubble above liquid), solid water condition, empty condition, and special conditions for major loss of coolant. The model T20 produces an output L30B which comprises pressure, and surge enthalpy for flow out of the pressurizer to the RCS thermal model T10.

The RCS thermal model T10 further produces an output L31A to the input of the containment building (CONPRS) model T21 which comprises the reactor coolant system heat loss, the loss of coolant accident outflow and outflow enthalpy. The model T21 calculates containment temperature and pressure based on flow and energy released to the containment building, and it provides an input L31B, which comprises containment temperature and pressure, to the model T10.

The RCS thermal model T10 also produces an output L32A which comprises four pressures at the reactor coolant pumps, four cold leg temperatures of the reactor coolant loops for instances in which the labyrinth seal flow reverses, pressure at the drain header tap points, and the excess letdown enthalpy for use in the seal flow (SEALFW) model T22 which calculates the flows and pressures and temperature distribution in the seals of the reactor coolant pumps. The seal flow model T22 produces an output to the RCS thermal model T10 which comprises four labyrinth seal flows, seal water enthalpy, and the excess letdown flow. The model T10 also produces output L33A, which comprises two letdown tap pressures, and letdown enthalpy to the chemical and volume control system (CVCS) model T23, which calculates the chemical and volume control system pressures, temperatures, enthalpies, and flow distribution.

The RCS thermal model T10 also provides an output 34A, which comprises the steam generator primary average temperatures (4) and four primary pressures for tube leak malfunctions, to the steam generators, main steam system and high pressure turbine (STMGEN) model T24 which simulates the operation of the four steam generators FGA, through SGD. The model T10 receives an input L34B from the model T24 which comprises the steam generator heat flux for the four steam generators and a leak flow for tube leak malfunction. Model T10 also receives inputs L35 which comprise the reactor coolant system loop flows for all locations and produces an output L36 which comprises the reactor coolant specific volumes for all locations from and to RCS flow (RCSLP2) model T25, which calculates the pressure and flow distribution around the RCS loops. The previously described model T9 also receives inputs L35 and L36 from the models T25 and T10 respectively.

The RCS flow model T25 produces an output L37 which comprises the reactor core flow to the previously described model T12. Model T25 also produces an output L38A which comprises the residual heat removal system pressures at selected tap points; and receives inputs L38B which comprise the residual heat removal flows to and from residual heat removal system (RHR) model T26, which in turn simulates the behavior of the residual heat removal system in its normal use. Inputs L39A to the model T25 comprises safety injection tap point pressures and output L39B from the model T5 comprises the safety injection flows L39A and L39B couple the model T25 with the accumulator (ACCUM) model T27, which simulates the accumulator dump during safety injection, pressurization or depressurization of the accumulators with nitrogen, the accumulator drain to the volume control tank and drain tank, and the filling of the accumulators. The model T25 also receives input L40 which comprises 8 main turbine stop valve admittances and 4 bypass valve admittances from the valve handler program VH.

The previously described pressurizer model T20 provides output L41A which comprises the pressurizer level and pressurizer pressure to pressurizer control (PREZCON) model T28, which calculates protection logic and control signals, spray flow, pressurizer heater power, and relief flow with associated malfunctions. In turn, the model T28 provides output L41B which comprises the pressurizer heater power to the model T20. The valve handler provides input L42 which comprises 3 spray valve admittances, relief valve admittance, and safety valve admittance to the model T20.

When the pressurizer control model T28 is on automatic, an error is fed to the controller handler (not shown), which in turn feeds valve commands to the valve handler. The resulting spray valve admittances are sent to the model T20. The controller handler receives from the model T28 the pressurizer level error and the pressurizer pressure error 43A. Bifurcated control is employed; that is, low pressure actuates the pressurizer heaters while high pressure actuates the spray.

The control handler provides an input L43B to the pressurizer control model T28 which comprises the heater power control signal. The spray valve control output goes direct from the controller handler to the valve handler; and the level control output goes directly to the positive displacement pump speed calculation or to the charging flow valve controller, depending on whether the positive displacement or centrifugal charging pumps are in use. The model T20 provides an output L44A which comprises relief line flows and relief fluid enthalpy to the relief tank (PRSFT) model T29 which simulates the pressurizer relief tank. The model T29 in turn provides an output L44B which comprises the pressurizer relief tank pressure to the model T20.

The relief tank model T29 provides an output L45A which comprises the relief tank rupture disk flow and the relief tank rupture disk flow enthalpy to the previously mentioned containment building model T21. The model T21 in turn provides an output L45B which comprises containment pressure and containment temperature for heat loss to the relief tank model T29.

The model T21 provides an output L46A which comprises containment pressure to the containment spray safety injection system (SIF6) model T30. The model T30 in turn provides an output 46B which comprises containment spray flow and containment spray enthalpy to the model T21. Also, the model T21 provides an output 47A to the steam generator model T24 which comprises the containment pressure. The steam generator model T24 provides an output 47B to the model T21 which comprises the steam break flow, steam break enthalpy, feedwater line break flow, and feedwater line break enthalpy.

Outputs L48 comprises all plant variables in the simulator for which limit checks are to be performed. Also, output L49 from RCS limit checks (LIMCK, LIMCK2) model T31 provides all limit check logicals from the reactor coolant system to the protection logic. The model T31 further provides output L50 which comprises all limit check logicals from the reactor coolant system to the alarms and annunciators on the control panel.

The chemical and volume control system model T23 previously mentioned provides an output 51A which comprises pressure at the seal header on the charging line, enthalpy at the seal header on the charging line, and the charging pump suction line pressure below the valve LCV112C to the previously mentioned seal flow model T22. In turn, the model T22 provides output L51B which comprises the seal header flow, the seal return flow including excess letdown flow, and the temperature of the seal water return flow to the model T23.

The seal flow model T22 receives input L52 which comprises all seal flow system valve admittances from the valve handler program. The model T22 provides an output 53A which comprises the component cooling water return temperature from the seal water heat exchanger and the component cooling water return temperature from the excess letdown heat exchanger to component cooling system (COCOOL) model T32, which calculates the flow and pressure distribution in the component cooling system as well as the thermal dynamic behavior of the residual heat removal heat exchangers. Also, in the model T32 the component cooling surge tank level is calculated based on water density changes. The model T32 provides and output L53B which comprises the component cooling water flow and temperature to the seal water heat exchanger, and the component cooling water flow and temperature to the excess letdown heat exchanger for input to the seal flow model T22.

The chemical and volume control model T23 provides an output L54A which comprises the component cooling water return temperature from the letdown heat exchanger to the model T32. In return, the model T32 provides an output L54B which comprises the component cooling water flow and temperature to the letdown heat exchanger for input to the model T23.

The boron makeup (BORECY) model T33, which simulates the systems associated with boric acid makeup, including the boron evaporators, boric acid storage tanks and transfer pumps, and the boric acid blender and associated valves and piping, provides an output L55 which comprises the component cooling water heat load from the boron evaporator condenser to the component cooling system model T32. Also, the pump handler provides an output L56 which comprises the boric acid pump shutoff heads for fast and slow speeds to the model T33. The valve handler provides an output L57 for the model T33 which comprises admittances for all boron makeup system valves. The model T33 also has an output L58A, which comprises the boric acid blender outflow to the charging pump suction, the blender boron concentration, the blender outflow to the volume control tank spray line, direct boration flow to the charging pump suction by way of valve 8100 (concentration is assumed to be 20,000 PPM), and evaporator water flow to the refueling water storage tank, for input to the chemical and volume control system model T23. In return, the model T23 provides an output L55B which comprises charging pump suction pressure and pressure at the volume control tank spray line to the boron makeup model T33. The model T23 also provides an output L59 to the model T9 which comprises the charging flow total into the reactor coolant system for all paths, the charging boron concentration, the fill header flow for each isolated loop, the total letdown flow for all paths from the reactor coolant system, the drain header flow for each isolated loop, and the flow through the deborating demineralizer.

The previously mentioned model T26 provides an output L60 which comprises the pressure at the residual heat removal system letdown line and the temperature at the residual heat removal letdown line to the chemical and volume control model T23. The model T26 also provides an output L61A which comprises the component cooling water return temperatures from the two residual heat removal heat exchangers for input to the component cooling system model T32. In return, the model T32 provides an output L61B which comprises the component cooling water flows and temperature to the two RHR heat exchangers for input to the residual heat removal system model T26. The model T26 includes an output L62A which comprises the residual heat removal enthalpy to the reactor coolant system for input to the previously mentioned RCS thermal model T10. The model T10 in turn provides an output L62B which comprises the reactor coolant system tap point enthalpy returning to the residual heat removal system for input to the model T26. The valve handler has an output L63 which comprises all residual heat removal system valve admittances to the model T26; and the pump handler has an input L64 to the residual heat removal model T26 which includes the two residual heat pump heads.

The component cooling system model T32 provides an output L65A to the reactor coolant system flow model T25 which the component cooling water flow to the reactor coolant pump thermal barrier and bearing coolers, and the component cooling water temperature to the reactor coolant pump cooling. The model T25 in turn provides an output L65B to the model T32 which consist of the reactant cooling pump thermal barrier and motor heat load to the component cooling water.

The accumulator model T27 has an output L66A which comprises the accumulator flows to the reactor coolant system and the accumulator flow temperatures which are assumed fixed to the reactor coolant system for input to the RCS thermal model T10. The accumulator boration if assumed fixed in calculating the change in reactor cooling system boration. The model T10 provides output L66B which comprises the safety injection system tap point pressures for input to the model T27. The model T10 also has an input L67A which comprises the high head safety injection flows and temperature to the reactor coolant system from the high head safety injection (SIS2) model T35, which mechanizes the high head safety injection through the safety injection pumps and the portion of the accumulator fillings. In return, the model T10 provides an output L67B which comprises the safety injection tap point pressures through the model T35. The RCS thermal model T10 also has an input L68A which comprises the safety injection flows and temperatures to the reactor coolant system from the sump recirculation via the residual heat removal and safety injection pumps (SIS4) model T36, which mechanizes recirculation from the sump using the residual heat removal pump, containment pressure, and safety injection pumps. Also, the model T10 provides an output L68B which comprises reactor coolant system pressures to the model T36. The model T36 also provides output L69A which comprises the safety injection pump suction pressure to the residual heat removal system model T26; and the model T26 provides an input L69B to the model T36 which comprises the residual heat removal flow to the safety injection system and the residual heat removal heat exchanger outlet temperature.

The RHR model T26 has an input L70A which comprises tap point pressures from the low head safety injection system via the residual heat removal system (SIS5) model T37, which model mechanizes the low head safety injection through the residual heat removal pumps. The model T26 also provides an input L70B which comprises the residual heat removal to safety injection system flows and the residual heat removal heat exchanger outlet temperatures for input to the model T37. The RHR model T26 also has an input L71A which comprises tap point pressures from the sump recirculation via the residual heat removal and charging pumps (SIS3) model T38 which mechanizes recirculation from the sump using containment pressure, one residual heat removal pump and the charging pump. The model (SIS3) T38 provides an output L71B which comprises residual heat removal flow to the safety injection system and the residual heat removal temperatures to the safety injection system. The model T26 provides an output L72A which comprises the residual heat removal pump discharge pressure to the model T23 and an input L72B which comprises the charging pump suction pressure from the model T23. The model T26 also has an output L73A which comprises the residual heat removal system flow and temperature to the containment spray system T21.

The model T26 has an input L74 which comprises spray line pressures to the containment spray by way of the residual heat removal system (SIS7) model T39, which mechanizes the containment spray through the residual heat removal system. The model T23 has an input L75 which comprises the pressure at the boron injection tank inlet from the high head safety injection system via the charging pumps (SIS1) model T40, which recognizes the high head safety injection through the two centrifugal charging pumps and a portion of the accumulator filling. In this model the boron injection tank initial boron concentration is assumed fixed. The containment building model CONPRS T21 also provides an output L76 which comprises containment pressure, containment sump enthalpy, and containment sump level to indicate if the sump is dry for input to the model T38 previously mentioned. The model T21 also has an output L77 which comprises containment pressure, containment sump enthalpy and level to the previously mentioned (SIS4) model T36.

The valve handler has an output L78 to all the safety injection models and to the safety injection mode select (SIMAIN) model T41, which is the safety injection calling program. The model T41 also has an input L79 from the pump handler which comprises the safety injection pump heads; an input L80 from the protective logic which comprises the safety injection actuation signal; and an input L81 which comprises the manual safety injection actuation signal and reset signal from the control panels. The manual operation of the safety injection pumps and valves is handled through the pump handler and valve handler respectively, which includes the safety injection test function.

The model T32 receives an input from the pump handler L82 which comprises the component cooling pump heads and an input L83 which includes all component cooling system valve admittances from the valve handler. The model T41 has outputs L84, L85, L86, L87, L88, L89, L90, and L91 to the accumulator model T27 and the safety injection system models T30, and T35 through T40 which comprises an operation bid to the respectively safety injection models. The individual safety injection system models are not computed when inactive. Therefore the outputs L84 through L91 from the model T41 comprises a logical signal to initiate operation of their respective routines whenever the safety injection select model T41 determines that the proper condition, either automatic or manual, has been set up to commence their operation.

CHEMICAL AND VOLUME CONTROL SYSTEM

The Chemical and Volume Control System is designed to provide services to the Reactor Coolant System that include; maintenance of programmed water level in the pressurizer in order to maintain the required water inventory in the reactor coolant system (RCS); maintenance of seal water injection flow to the reactor coolant pumps; control of water chemistry conditions, activities level, boron concentration and makeup; and processing of effluent reactor coolant to effect recovery and reuse of boron absorber and makeup water; filling, draining, and pressure testing.

Charging, Letdown And Seal Water

The charging and letdown functions of the system are employed to maintain a programmed water level in the reactor coolant system pressurizer PZR and to maintain proper reactor coolant inventory during all phases of plant operation.

Figure 92A:
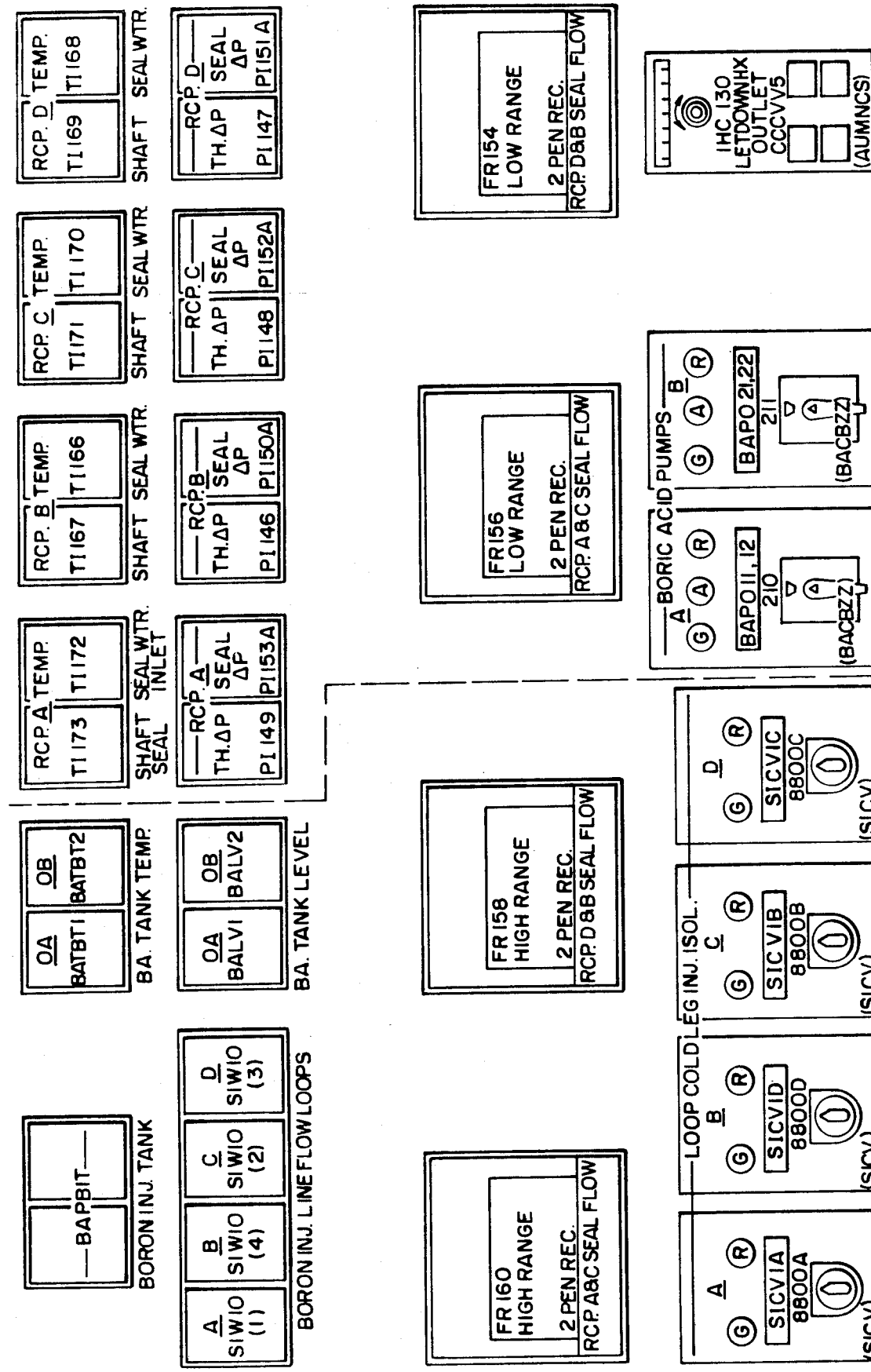
Figure 92B:
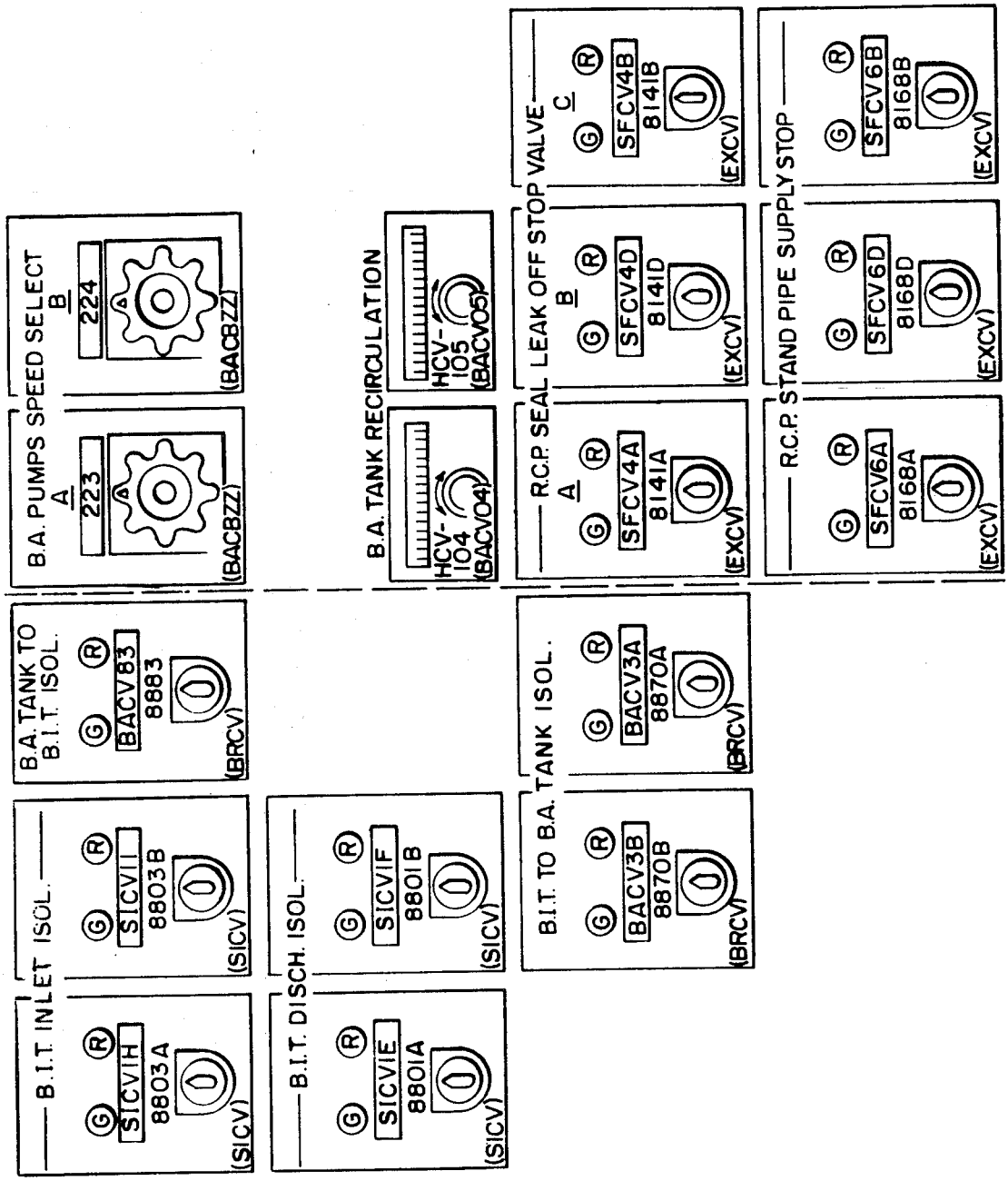
Figure 92C:
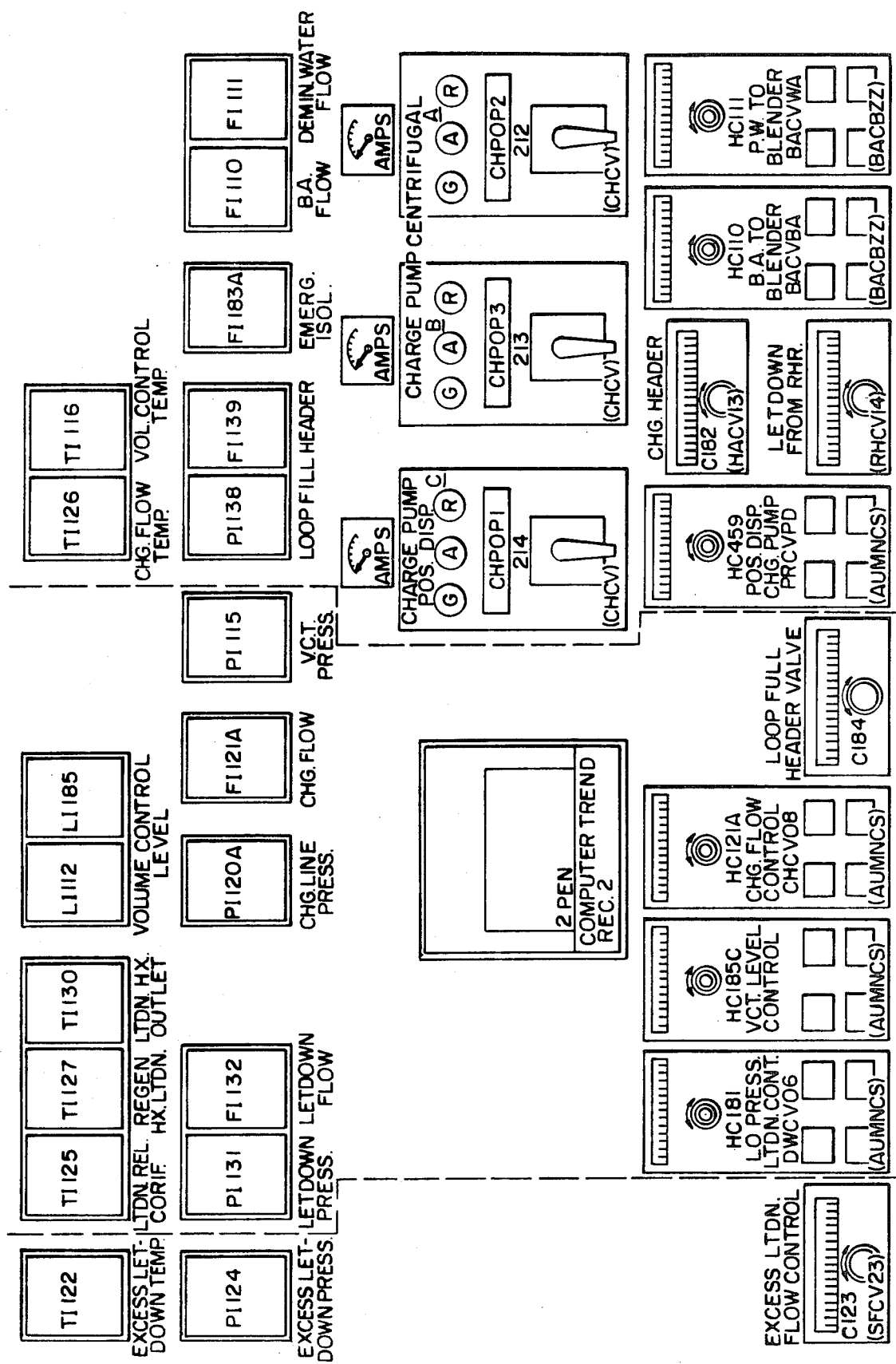
Figure 92E:
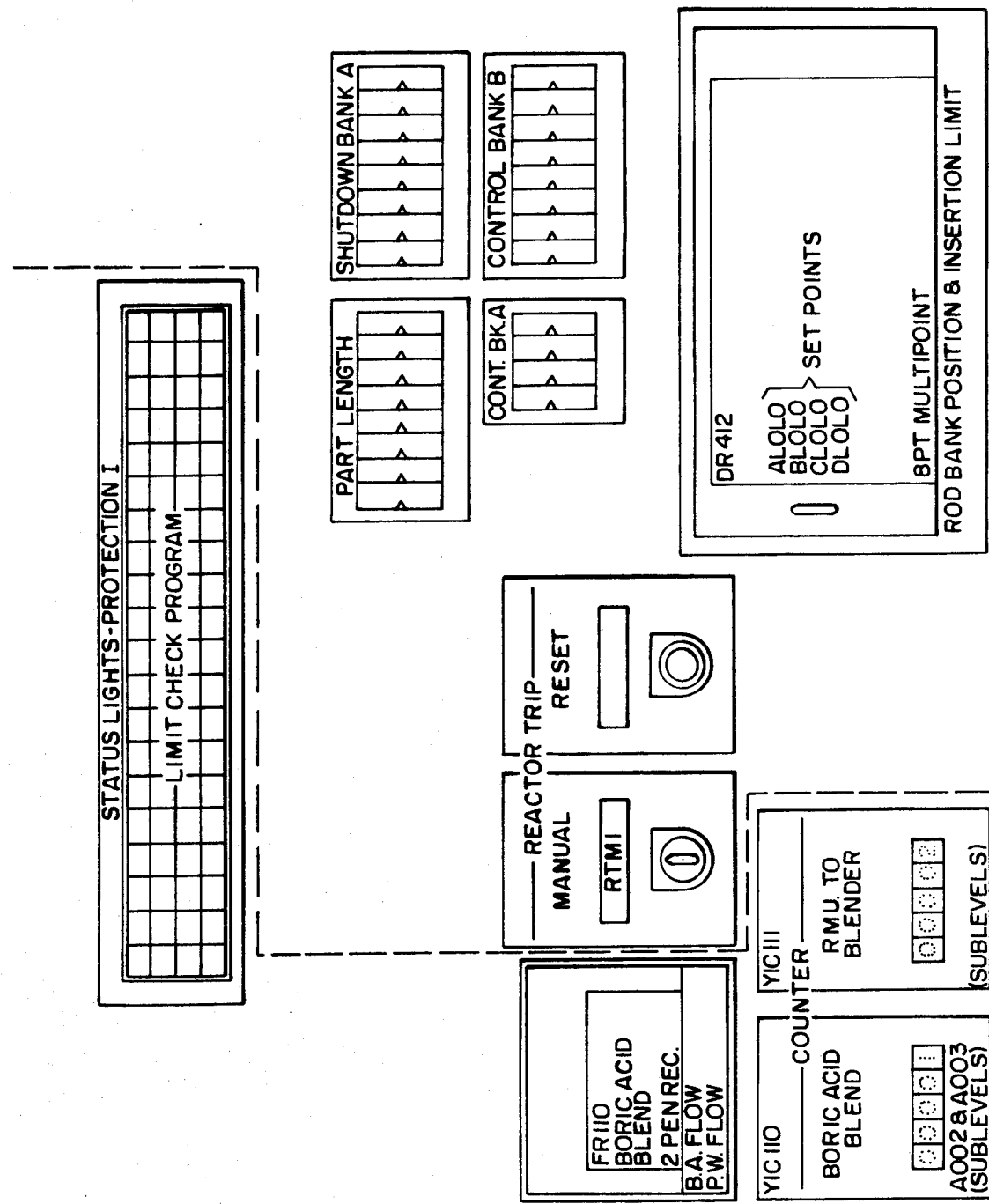
Figure 92F:
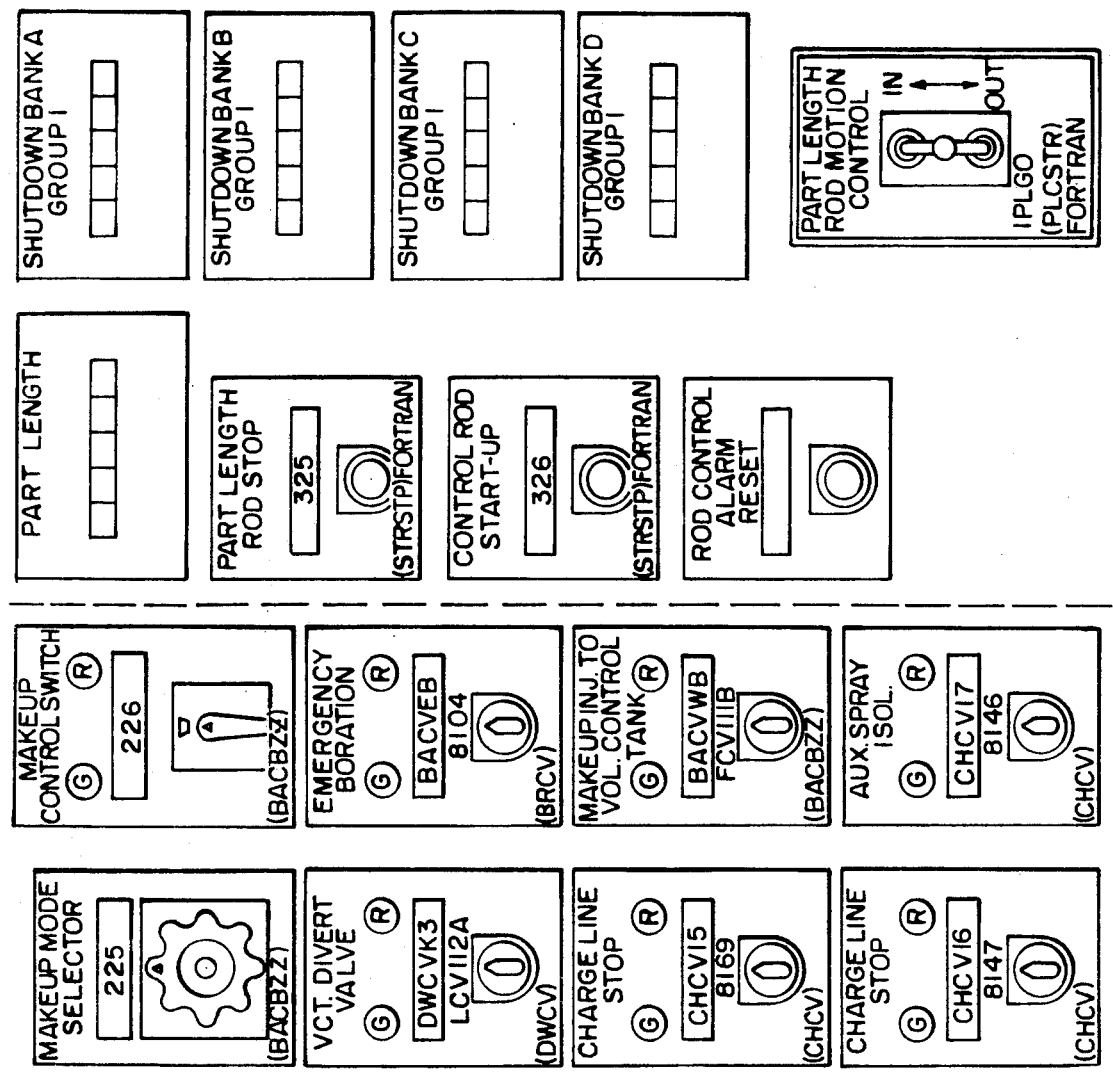
Figure 99A:
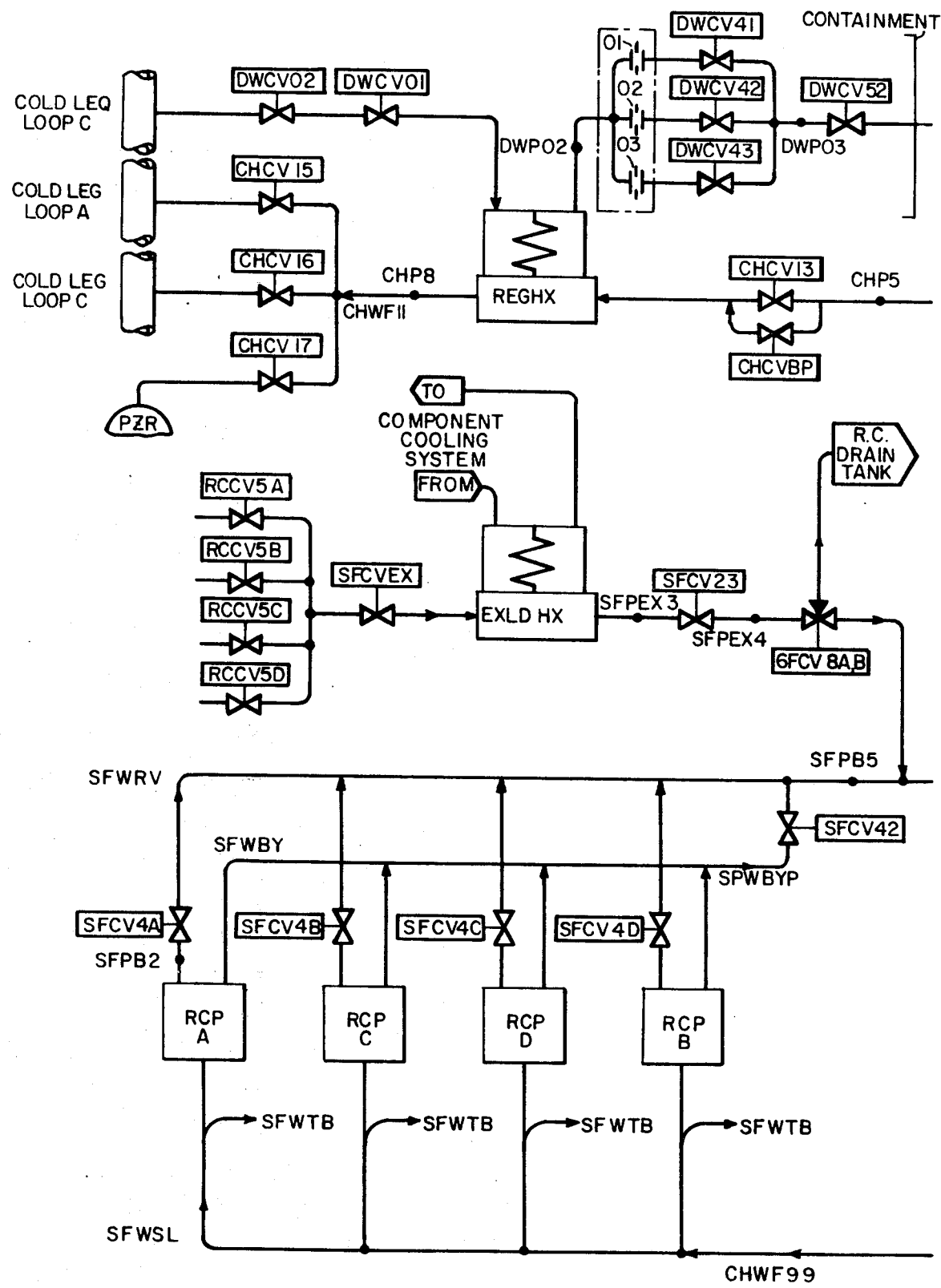
Figure 99B:
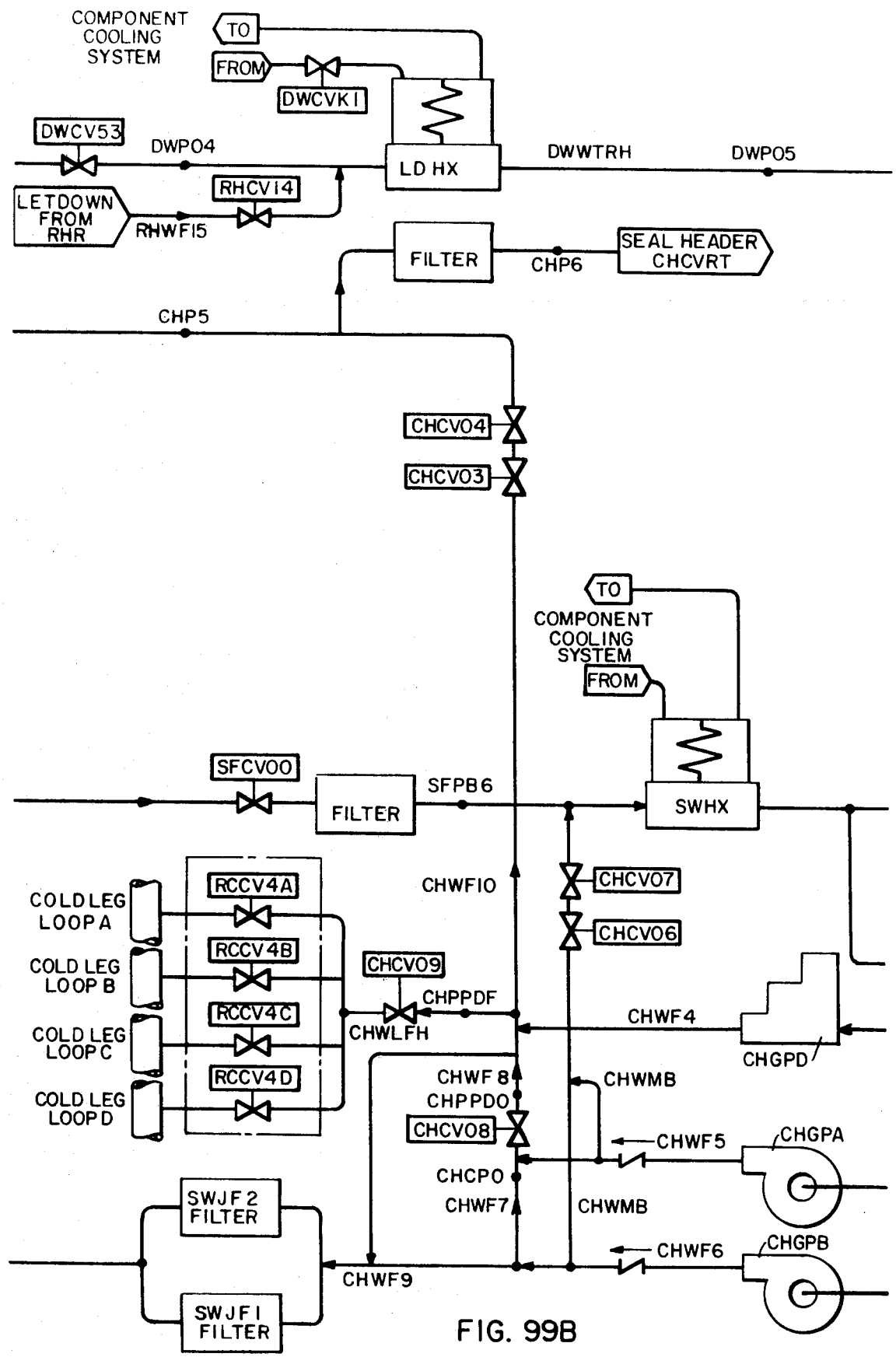

Referring to the control panels of FIGS. 92B, C, and D and FIGS. 99A, 99B, and 99C, specifically the reactor coolant is discharged to the chemical and volume control system from cold leg of loop C of the reactor coolant system, and then flows through the letdown control valves DWCV02 and DVCV01 through the shell side of the regenerative heat exchanger REGHX where, during normal operation, its temperature is reduced to about 290° F. The coolant then experiences a large pressure reduction in passing through one or more of the letdown orifices 01, 02, and 03 and the letdown orifice stop valves DWCV41, DWEV42, and DWCV43 and then through containment isolation valves DWCV52 and DWCV53 to the tube side of the letdown heat exchanger LDHX where its temperature is further reduced to approximately 130° F. From the outlet of the heat exchanger LDHX the coolant flows through another pressure reducing valve DWCV06 to maintain the upstream pressure between 300 and 350 psig to prevent flashing downstream of the letdown orifices 01, 02, and 03. The coolant than flows normally through valves DWCVK1, which is a three-way control flow valve to the demineralizer tanks. Normally the coolant flows to the mixed bed demineralizer DWCV07, and then through the three-way valve DWCVK2, to the reactant coolant filter RCF, three-way valve DWCVK3, to the volume control tank VCT. The gas space in the volume control tank VCT is filled with hydrogen, which is regulated to a pressure of 15-20 psig during normal plant operation.

Charging pumps CHGPA, CHGPB, and CHGPD (see FIG. 99B) normally take suction from the volume control tank VCT through outlet isolation valves CHCV01 and CHCV02. The charging pumps discharge to the reactor coolant system RCS at a pressure dictated by prevailing reactor coolant system pressure, through the charging flow control valve CHCV08, charging header isolation valves CHCV03 and CHCV04 and air operated pressure drop control CHCV13, and the tube side of regenerative heat exchanger REGHX, through valves CHCV15 and CHCV16 to the cold legs of reactor coolant loops A and C, respectively.

Normal charging flow is handled by the single positive displacement reciprocating charging pump CHGPD. If the reciprocating charging pump CHGPD reaches the high speed limit, as controlled either by the pressurizer PZR level requirements or by operation choice, a centrifugal charging pump CHGPA or CHGPB is placed in operation to provide the higher flow capacity demanded and to remove the reciprocating charging pump CHGPD from service.

A charging flow controller (not shown) maintains the preset charging flow, which is reset by the pressurizer PZR level requirements. A minimum flow through the centrifugal charging pumps CHPGA and CHGPB for protection is continuously diverted through minimum flow isolation valve CHCV07 and CHCV06 back to the volume control tank VCT through the seal water heat exchanger SWHX.

Another portion of the charging flow is directed to the reactor coolant pumps RCP(A), RCP(C), RCP(D), and RCP(B), through seal water injection filters SWJF1 and SWJF2.

Referring to FIG. 99/1, the seal water injection system is shown in detail for the reactor coolant pump RCP(A). Portions of the chemical and volume control system CVCS, the reactor coolant system RCS and the charging systems are shown in FIG. 99/1 for clarification only.

As illustrated diagrammatically in the drawing FIG. 99/1 with appropriate legends, the first seal SFCV1 is located above the lower radial bearing and has a normal leakage rate of approximately three gallons per minute at system operating pressure. Second seal SFCV2 normally accepts the three gallons per minute leakage from the first seal at a pressure of approximately 50 psi and seals it against the back pressure of several feet of water. Normal leakage rates for seal SFCV2 is three gallons per hour, third seal SFCV3 is a smaller, low pressure, seal designed to limit leakage into the containment vessel to approximately 100 cubic centimeters per hour.

Of the total quantity of eight gallons per minute injected into the pump RCP(A), 5 gallons per minute passes downward through the cooler assembly and removes heat from the thermal barrier.

The seal water flow leaves the filters SWJF1 and SWJF2 flows through the seal header, seal flow control valves SFCVPZ(I), and enters the pump at a point between the thermal barrier seal and the radial bearing. Approximately five gallons per minute of the flow enters the thermal barrier cooling cavity, and the remainder of the flow flows up the pump shaft and leaves the pump RCP(A) via the first seal at point SFPB2 and then flows through the seal flow control valve SFPCV4 flow indicator FIC156 and flow indicator FIC160 to actuate the low range pen recorder FR156 and the high range pen recorder FR160 to indicate the seal flow on the control panel as shown in FIG. 92A. When flow control valve SFCV42 is fully opened the flow is normally approximately 3 gallons per minute. The seal water then discharges through valve SFCVOO, the seal water filter SWF1, the seal water flow heat exchanger SWHX to the suction side of the charging pumps through valves 8325, or by an alternate path to the volume control tank through valve 8326. In the event the normal letdown path is inoperable, an alternate letdown path from the RCS loops discharges the reactor coolant from a cold leg of the loop where it flows through valve 8035 the tube side of the excess letdown heat exchanger EXLDHX where the coolant is cooled below 200° F. The flow then goes through a remote manual control valve SFCV23, which controls the excess letdown flow, and then normally joins the first seal discharge manifold at point SFPB5 on the drawing and passes through the seal water filter SWF1, the heat exchanger SWHX to the volume control tank VCT. This excess letdown flow can also be directed to the reactor coolant drain tank DT by the three-way valve SFCV8A, so that it bypasses the first seal return manifold. This path is utilized to remove some of the excess reactor coolant due to expansion of the system as a result of a reactor coolant system temperature increase during the final stages of heat up.

Approximately 5/10 of a gallon per minute flows through the seal SFCV2 to point SFPB3 and then flows through line SFWSP to the seal water storage tank SWST. The outlet to the storage tank SWST includes an orifice SWSTO which is calibrated for 5/10 of a gallon per minute, which is the same flow as the flow going through the seal SFCV2 in order that an alarm may be sounded by means of the level control elements LC1 and LC2 depending on the level of the water in the tank SWST. The remainder of the seal water goes through the seal SFCV3 from point SFPB3 to the drain tank DT at a rate of approximately 100 cc per hour.

Volume Control Tank

Although surges in the RCS volume due to electrical load changes are accommodated for the most part in the pressurizer PZR, the volume control tank VCT accommodates programmed pressurizer level mismatches which may occur due to a plus or minus 4° F temperature error. High water level in the tank VCT actuates a high level alarm and causes a letdown flow normally entering the tank VCT (FIG. 99B) through line DWWF6 filter RCF and the modulating three-way control valve DWCVK3 to be diverted by this valve to the hold up tanks DWWHT. A control tank controlled from the VCT level transmitter LI, is used to proportionally control the amount of flow diverted. A low level in the volume control tank VCT initiates makeup from the reactor makeup control system through valves CHCVO6, CHCVO7, the seal water heat exchanger SFKFEX to the tank VCT. If the reactor makeup control system does not supply sufficient makeup to keep the volume control tank VCT level from falling to a lower level, a low level alarm is actuated in the control office and the suction of the charging pumps is transferred to the refueling water storage tank by closing valves CACVO1 and CACVO2 and opening valves SICVIN and SICVIO.

Referring to FIG. 99/1, a special loop fill header comprising valves RCCV1, RCCV2, RCCV3, and RCCV4 is provided for the filling of each of the four reactor coolant system loops. Charging pumps CHGPA, CHGPB, and CHGPC may be utilized for filling an isolated loop by opening one of the appropriate valves RCCV1-RCCV4. The loop fill header may also be utilized for equalization of pressures between an isolated loop and the rest of the reactor coolant system.

Referring to FIG. 99/1, a loop drain header comprises valves 8035A through 8035D for draining an isolated loop. The water can be drained directly to the reactor coolant drain tank DT or through the excess EXLDHX to the reactor coolant drain tank DT or to the volume control tank VCT. The drain header is used whenever the excess letdown heat exchanger EXLDHX is put in service, this being its only connection to the reactor coolant system RCS.

A chemical control element is employed for pH control, and it is introduced to the reactor coolant system via the charging flow. In the event the coolant pH deviates because the concentration of the chemical control element exceeds a predetermined value, a cation bed demineralizer DWCVO8 is employed in the letdown line in series operation with a mixed bed demineralizer DWCVO7 by opening normally closed valve DWCVD1. Sincethe amount of chemical to be removed is small, the flow through the cation bed demineralizer DWCVO8 is not required to be the full letdown flow and thus a small bypass flow through the normally closed valve DWCVD1 is sufficient.

The mixed bed demineralizer DWCVO7 is provided in the letdown system to provide clean-up of the letdown flow. The demineralizers remove ionic corrosion products, certain fission products, and act as filters. One demineralizer bed only is shown, and it is usually in continuous service for normal letdown flow and can be supplemented intermittently if required. The demineralizer bed DWCVO7 has a sufficient capacity to maintain the cesium concentration in the reactor coolant below the required amount; and it is sized to accept maximum letdown flow of 120 gallons per minute. To provide further clean-up during cold shutdown and residual heat removal periods, a remotely operated valve RHCV14 at the inlet side to the letdown heat exchanger LDHX admits a bypass flow, which passes through the heat exchanger, through the mixed bed demineralizer DWCVO7 and reactant coolant filter RCF to the volume control tank VCT.

Chemical Shim And Makeup

Referring to FIG. 99/2, the function of soluble neutron absorber concentration control and makeup for the primary coolant is provided by the boron makeup or reactor makeup control system as illustrated diagrammatically therein. This system utilizes a 12% boric acid solution and primary makeup water from the primary water storage tank PWST for normal neutron absorber concentration and makeup. Additionally, for emergency boration and makeup, the capability exists to provide refueling water or a 12% boric acid solution from blender BAB to the suction of the charging pumps CHGPA, CHGPB, and CHGPC (See FIG. 99 B).

Initial filling and makeup quantities of the boric acid solution is prepared in a boric acid batching tank BAWKFL where boric acid crystals are dissolved in hot water and pumped to boric acid storage tanks BAT1 and BAT2. The batch is transferred from the tank BAWKFL to the boric acid tank BAT1 by pump BAC1 through a line which extends through valve BACVD4, the pump BAC1, the valve BACVO4 and into the tank BAT1. The pump BAC1 can also transfer boric acid from tank BAWKFL through valve BACVD7 and valve BACVO5 to the boric acid tank BAT2. The pump BAC2 can also transfer boric acid solution through similar lines as illustrated in FIG. 99/2. The boric acid transfer pumps BAC1 and BAC2 are two-speed pumps. One pump is normally run on slow speed recirculating the boric acid solution to the boron injection tank BIT through valve 8883 with the solution returning from the tank BIT through valve BACV3A and BACV3B, valve BACVD1 for the tank BAT1 and valve BACVD2 for the tank BAT2. In the event that makeup water is required, the pump switches to a fast speed.

The flow of boric acid from the boric acid transfer pumps BAC1 and BAC2, and the primary water from the primary water storage tank PWST is directed to the boric acid blending device BAB where mixing occurs. The flow from the pumps BAC1 and BAC2 is controlled by valve BACVBA, and the flow from the primary water storage tank PWST is controlled by valve BACVWA. The flow is then directed from the blender BAB to either the suction manifold of the charging pumps (FIG. 99B) CHGPA, CHGPB, and CHGPC through valve BACVBB, or is sprayed into the volume control tank VCT through control valve BACVWB. The boric acid solution can also be pumped directly to the charging pump suction through valve BACVEB.

Boric acid transfer pumps BAC2 are also capable of pumping the boric acid solution to and from a concentrate holding tank CHT where the boric acid solution is sampled to determine whether or not it meets the required concentration.

Chemical And Volume Control Systems Simulation

The entire chemical and volume control system simulation is performed by four subroutines in the models T9, T22, T23 and T33: (a) SEALFW for reactor coolant pump RCP seal flow, (b) BORECY for boron makeup, (c) RCBORC for boron concentration at designated points in the reactor coolant system RCS, and (d) CVCS for temperature, pressure and flow distribution in the chemical and volume control system.

The subroutine RCBORC calls the subroutine CVCS and the subroutine CVCS calls the subroutines SEALFW and BORECY.

Flow And Thermal Calculations For The Subroutine CVCS

The inputs to the subroutine CVCS include pressures and enthalpies at tap points of the reactor coolant system RCS, the status of charging pumps CHGPA, CHGPB, and CHGPC, valve admittances of the chemical and volume control system, flow of the component cooling water, temperature at the letdown heat exchanger LDHX, and flow and enthalpy at the letdown of the residual heat removal system RHR.

The outputs of the subroutine CVCS include pressures, flows, temperatures, and enthalpies at all points in the charging system CH, the letdown system DW, and the volume control tank VCT.

The subroutine CVCS for the purposes of clarity and understanding is considered to include three major subdivisions, (a) letdown flow system (b) charging flow system, and (c) volume control tank.

Letdown Flow System

In describing the letdown system reference is made to FIGS. 99A and 99B and FIG. 99/2. The regenerative heat exchanger REGHX and the letdown heat exchanger LDHX are simulated as follows. Referring to FIG. 99/3, the equations for the tube side of the heat exchangers REGHX and LDHX are:

$$(M_1 C_{p1}) \frac{dT_{12}}{dt} = W_1 C_{p1}(T_{11} - T_{12}) - UA \frac{(T_{11}+T_{12})}{2} - \frac{T_{21}+T_{22}}{2}$$

and in the shell side as $$(M_2 C_{p2}) \frac{dT_{22}}{dt} = W_2 C_{p2}(T_{22} - T_{21}) + UA \frac{(T_{11} + T_{12})}{2} - \frac{T_{21} + T_{22}}{2}$$

where:
- M is the mass of liquid in the heat exchanger,
- $W_1$ is the mass flow rate,
- $T_{ij}$ are the temperatures,
- UA is heat transfer coefficient and
- $C_p$ is the specific heat of water at the average temperature.

These two simultaneous differential equations are numerically integrated by finite difference approximation. In a two-flow in either side, the temperatures are set to be:

$T_{12} = T_{21}$ — for $W_1 = 0$.
$T_{22} = T_{11}$ — for $W_2 = 0$.

In the program CVCS, these are implemented for the regenerative heat exchanger where CHTH1 and CHTH2 is the inlet and outlet temperature of the heat exchanger REGHX; CHWF11 is the specific the flow through REGHX; CHCPRH is heat of flow to REGHX; CHUA is the heat transfer coefficient; CHMRX is mass of liquid on tube side of REGHX; and DWTC1. DWTC2 is letdown temperature from RCS loops and outlet temperature of REGHX respectively, as follows:

$$CHTH2 = \int \frac{A1 + A2}{A3} dt$$

where:
$A1 = CHWF11 * CHCPRH * (CHTH1 - CHTH2)$
$A2 = CHUA * (DWTC1 - CHTH2 + DWTC2 - CHTH1)$
$A3 = CHMRX * CHCPRH$ and $$DWTC2 = \int \frac{B1 - A2}{B3} dt$$

where:
$B1 = DWWT * DWCPRH * (DWTC1 - DWTC2)$
$B3 = DWMRX * DWCPRH;$ and

DWMRX is liquid mass on shell side of REGHX; DWCPRH is specific heat of letdown in REGHX and DWWT is letdown flow from RCS loops.

The letdown heat exchanger LDHX is implemented in a similar manner with appropriate changes in variables and need not be described separately. However, the inlet temperature for the letdown heat exchanger LDHX is calculated from the mixing of streams from the heat exchanger REGHX and the RHR letdown path as shown in FIG. 99/3. This is effected by the well-known algebraic mixing equation with flow dependence.

The outlet temperature from the letdown heat exchanger LDHX is utilized to determine the inlet temperature of the volume control tank VCT or demineralizer DWCVO9 as the case may be, and also drive the controllers for the letdown temperature regulator valve PCV130 and the three-way temperature controlled diversion valves TCV129 (see FIG. 92D).

The letdown flow and pressure drop calculation commences with the pressure drops through the isolation valves DWCVO1 and DWCVO2 and the regenerative heat exchanger REGHX, the drop of which is termed in the system variable as DWCVO3. The pressure at the outlet of the heat exchanger REGHX is calculated in the following manner $$DWPO3 + PRPRS - DWZ4 * (DWWT)^2$$

where:
DWZ4 has been calculated as the net resistance for the two valves and the heat exchanger. At the inlet to the heat exchanger LDHX, the letdown flow DWWT and the letdown flow from the RHR inlet RHWF15 when added together equal the total flow DWTRH to the heat exchanger LDHX.

The pressure drops at the outlet to the heat exchanger LDHX are all calculated from this flow DWTRH. The flow DWWT is calculated from the pressure difference of DWXX1 across the orifice valves DWCV41, 42, and 43 as follows DWXX1 = DWPO3 − DWPO4; where DWPO3 is calculated as previously described and DWPO4 is back calculated from the downstream pressure drop DWPO5. A filter is applied for smoothing and to approximate fluid momentum as follows:

$$DWWT = DWZ5 \sqrt{DWXX3}$$

where DWZ5 is the net orifice valve admittance, and $$DWXX3 = \frac{DWXX1 + (DWFILT - 1.) * DWXX2}{DWFILT}$$

where DWXX2 is the last valve of DWXX3.

To complete the flow and pressure drop calculation, it is necessary only to calculate the pressure from the tank VCT or the holdup tank HUT back to the pressure DWP04 at the outlet to the orifice valve DWCV41, 42, and 43. The pressure DWP10 at the inlet to the letdown filter RCF is calculated from the pressure drop in the volume control tank VCT and the letdown filter RCF.

If the pressure above the diversion valve TCV129 is operated to direct the flow to the volume control tank VCT (i.e., DWCVK1 is less than 0.3), then:

$$DWP06 = DWP10 + \frac{[DWWBYP]^2}{[DWCV11]^2}$$

If TCV129 is operated to direct flow to the demineralizer position, the drop through the demineralizers is calculated as follows:

$$DWP09 = DWP10$$
$$DWP08 = DWP09 + \frac{[DWWDM5]^2}{[DWCVK2]^2}$$

when the valve DWCVK2 is in the normal position, or $$DWP08 = DWP09 + \frac{[DWWDM6]^2}{[DWCV10]^2}$$

when the valve DWCVK2 is operated to direct the flow to the deborating demineralizer.

In this event, DWP07 = DWP08 when the cation bed demineralizer DWCV08 is bypassed by the valve DWCVD1 being opened and the valve DWCVD1 being closed. When the cation bed demineralizer DWCV08 is not bypassed that is, the valve DWCVD1 is closed and the valve DWCVD1 is opened, then the pressure DWP06 is calculated as follows:

$$DWP06 = DWP07 + DWZ12 [DWWDM1]^2$$

where DWZ12 is calculated as a net resistance for the mixed-bed demineralizer (with admittance DWCV07) and associated valves and piping (with admittance DWCVPP).

The pressure DWP05 above DWCV06 is then calculated as follows:

$$DWP05 = DWP06 + \frac{[DWWF4]^2}{[DWCVXJ]^2}$$

where:

DWWF4 is the flow through DWCV06
DWWTRH is the total flow as long as bypass valve DWCVBP is closed; and
DWCVXJ = DWCV06 + DWC131
Note that:
DWC131 sets the minimum admittance for valve DWCV06 which is a non-seating control valve.

The pressure DWP04 at the orifice of throttle valves DWCV41, 42, and 43 is then calculated as follows:

$$DWP04 = DWP05 + DWZ9*(DWWTRH)_2$$

where DWZ9 is a resistance equivalent to the two series valves DWCV52, DWCV53, and the letdown heat exchanger LDHX with admittance DWCV05.

Flows from the bypass side of TCV-129 are summed with return flow from the demineralizers to obtain the flow DWWF6 which is utilized as input to the tank VCT or the holdup tank HUT in accordance with the following formula:

$$DWWHT = DWCVK3*DWWF6$$

to the holdup tank HUT and $$DWWF7 = (1.-DWCVK3)*DWWF6$$

to the tank VCT.

The control functions that are utilized in the simulation of the letdown flow system are as follows. Referring to FIG. 92D the low pressure letdown control valves DWCV06 operated from the central office regulates the pressure DWP05 by moving the valves to change the admittance of DWCV06. This control function utilizes the central support routines for the valve handler and controller handler previously described, except for the calculation of the controller error signal. The letdown temperature regulator operated from the control panels (FIG. 92A) referred to as THC-130A regulates the temperature control valves TCV-130. The temperature is regulated by controlling the component cooling system flow to the letdown heat exchanger LDHX. In this instance, the central support routines for the controller and valve handlers previously described, are used. Whenever the temperature DWTC3 at the outlet of the letdown heat exchanger LDHX exceeds a predetermined set point DWTBYT, a logical DWLOG7 is set and the valves DWCVK1 is set to zero and operated to conduct the flow to the volume control tank VCT instead of the demineralizers DWCV07 through DWCV10 inclusive. Whenever the water level volume DWLVCT in the volume control tank VCT reaches a high level set point DWLHIV, an error signal is generated to operate the valve DWCVK3 to divert the flow to the holdup tank HUT from the tank VCT.

Volume Control Tank Simulation

In simulating the volume control tank VCT the following physical parameters are utilized: Mass Balance (DWMLVC), Temperature (DWTLVC), Boron Concentration (DWCBVC), Volume (DWLVBCT), and Pressure (CWPVCT). Referring to FIG. 99B, mass balance is calculated in accordance with the equation:

$$DWMLVC = \int (DWWF8-CHWF1+BAWF2)dt$$

where DWWF8=DWWF7+BAWF1 and the upper and lower limits of mass balance DWMLVC correspond to the full and empty condition of the tank VCT, respectively.

Temperature (DWTLVC) is obtained as follows: (1/DWMLVC) (BAWF1+120.−DWTLVCO)]

$$DWTLVC = \int (1/DWMLVC($$
$$[DWWFC*(DWTC3-DWTLVC) +$$
$$(NAWF1+BAWF2)*(120.-DWTLVC0]dt$$

where makeup has been assumed to enter the tank VCT at 120° F.

Boron concentration (DWCBVC) in the tank VCT is obtained as follows:

DWCBVC = ∫ DWZVC1/DWMLVCdt where:
DWZVC1 = {[(DWWDM5+DWWBYP)*(DWCB−DWCBVC) + DWWDMY*(.05*DWCB−DWCBC)]*(1.0−DWCVK3) + (BAWF1+BAWF2)*(BACB−DWCBVC)}

In simulating the boron concentration of the tank VCT, the deborating demineralizers DWCV09 and DWCV10 have been assumed to be 95% effective in removing boron from the letdown stream.

The volume DWLCCT of the tank VCT is obtained from mass and specific volume of the liquid. Several limit checks are made to set logicals for automatic makeup and other level functions.

The pressure DWPVCT is obtained from gas compression inasmuch as the tank VCT is normally gas pressurized with the colume DWVVVC filled by hydrogen or nitrogen as without any liquid. The following equation expreses the calculation:

$$DWPVCT_{NEW} = \frac{DWVVCT}{DWVVVC} \cdot DWPVCT_{OLD}$$

where DWVVVC and DWVVCT are new and old values of gas-space volume, respectively.

The pressure DWPVCT in the tank VCT is controlled by a feed-bleed system using simple diaphragm regulators (not shown) to vent the tank for high pressure or to admit nitrogen or hydrogen when pressure is low. Venting is represented by decrementing pressure at each time step according to:

$$DWPVCT = DWPVCT - \frac{2.3 \sqrt{DWPVCT - 14.7}}{DWVVVC}$$

provided the associated regulator diaphragm and the vent isolation valve 8101 is open; and provided the pressure DWPVCT exceeds atmospheric pressure, which condition is simulator check valve (not shown). If nitrogen is admitted, pressure is incremented at each time step as follows:

DWPVCT = DWPVCT + (10.7/DWVVVC up to the regulator setting 29.4 psi, or if hydrogen is admitted, pressure is incremented at each time step as follows:

DWPVCT = DWPVCT + 0.446/DWVVVC

The vent stop valves DWCVVT, and the valve DWCVH2 and DWCN2 which are operated to admit hydrogen and nitrogen to the volume control tank VCT respectively are under the control of the instructor. Maximum pressure in the volume control tank VCT is limited to a reasonable value such as 75 psia, since "tank rupture" is not simulated.

Referring to FIG. 99A, the flow CHWF4 from the charging pump CHGPA is determined directly by the speed of the positive displacement pump CHGPA. If all valves in the discharge line of the charging pump CHGPA are closed, the flow CHWF4 is set to zero indicating that the return safety valve from the positive displacement charging pump carries the flow back to the volume control tank VCT. The speed of the pump CGPD is regulated through the central support routine for the pump controller. The error signal input to the controller is calcuated in subroutine CVCS. The pump CGPD response is calculated from a ramp function:

CHNSPD = CHNSPD ± 10.0 Δt where the sign determines increase or decrease. It should be noted that this equation is utilized only when a speed change is requested by the controller.

The upper and lower limits of pump speed correspond to twenty gpm and one-hundred-seventy gpm, respectively. The lower limit is eliminated when the pump is off.

Pressure rise CHP0P2, CHP0P3 which are shutoff-head values for the centrifugal charging pumps CGPA and CGPB are received as inputs from the Pump Handler Routine. The maximum pressure rise of the two pumps CGPA and CGPB is used during changeover of one pump to the other, i.e., discharge pressure is:

CHPCP0 = CHPPI + Maximum of [CHP0P3, CHP0P2] + CK2*[CHWF5]$^2$ where the last term CK2 represents pump pressure "drop". CHPPI is calculated from DWPVCT and drop through valves CHCV01 and CHCV02. When both pumps CHGPA and CHGPB are running, they are assumed to share the flow equally, that is:

CHWF5−CHWF6 = (CHWF7+CHWMB)/2.

The net flow CHWF7 from the centrifugal pumps CGPA and CGPB is calculated from pressure difference and admittance of valve CHCV08. A smoothing filter is applied as follows:

CHWF7 = CHV08 * (CHPXX/DWSLVC)

where:

$$CHPXX = \frac{CHPX1 + (CHFILT - 1.) \cdot CHPX2}{CHFILT}$$

with:

CHPX1 = CHPCP0
and CHPX2 = last CHPX1.

The bypass flow CHWMB is obtained as follows:

$$(CHWMB)^2 = \left[ \frac{(CHCV06)^2 \cdot (CHCV07)^2}{(CHCV06)^2 + (CHCV07)^2} \right] \cdot (CHPCP0 - SFPB6)$$

From the continuity of flows as shown in FIGS. 99A and B, the following holds true:

CHWF8 = CHWF7+CHWF4

CHWF2 = CHWF4+CHWF5 +CHWF6

CHWF1 = CHWF2−SFWCVT

For safety injection using charging pumps, the status of the valves SICVIN and SICV10 is checked. If the valves are open the flows are calculated as a ratio of their valve coefficient CY, and boron concentration of the charging flow is equal to the boron concentration in the refueling water storage tank RWST.

Downstream of valve CHC08 and the pump CHGPD, the charging flow can divide between the normal flow path to the regenerative heat exchanger REGHX and the loop fill header. This flow is split by a ratio approximation as follows:

$$CHWF10 = \left(\frac{BYA3}{CIVPJ2}\right) \cdot CHWF8$$

$$CHWLFH = \left(\frac{CHZLFY}{DIVPJ2}\right) \cdot CHWF8$$

where:
BYA3 is the net admittance of valves CHCV04 and CHCV03 and

DIVPJ2 + CHZLFY+BYA3 where:

CHZLFY = CHCV09 if any of the header fill stop valves RCCV4(1)(4) are open

CHZLFY = 0.0 if all fill stop valves RCCV4(1)(4) are closed.

The fill header flow is divided among the loop tap points in accordance with:

$$CHWLF(I) = CHWLFH \cdot \frac{RCCV4(I)}{\sum_I RCCV4(I)}$$

The pressure above CHCV09 is back calculated for use in determining CHPPD0 in the normal charging path to the reactor coolant loop is closed. The equation used is:

$$CHPPDF = CHP4 + DWSLVC \cdot \frac{[CHWLFH]^2}{[CHCV09]^2}$$

where:

CHP4 = maximum of [CHP4Z(I)]
where:

$$CHP4Z(I) = RCPS(I) + DWSLVC \cdot \frac{[CHWLF(I)]^2}{[RCCV4(I)]^2}$$

Downstream of valve CHCV04, the flow CHWF10 can also divide between the normal charging path and the pump seal header. A ratio approximation is again used as follows:

$$CHWF11 = \frac{BZB3}{CHCVFT + BZB3} \cdot CHWF10$$

where CHCVFT is the net seal header admittance and BZB3 is calculated as the net admittance of the heat exchanger REGHX valve HACCV13 and its bypass valve CHCBP.

The flow is subsequently divided among the two loop charging taps through valves CHCV15 and CHCV16, and auxiliary spray line through valve CHCV17.

DIVPJ2 is recalculated as:

DIVPJ2 = CHCV15+CHCV16+CHCV17 and the flows CHWIF12, CHWF13, and CHWF14 are calculated as follows:

$$CHWF12 = \frac{CHCV15}{DIVPJ2} \cdot CHWF11$$

$$CHWF13 = \frac{CHCV16}{DIVPJ2} \cdot CHWF11$$

$$CHWF14 = \frac{CHCV17}{DIVPJ2} \cdot CHWF11$$

Since only a part of the above flow goes into the RCS loops, it is necessary to calculate the net loop inflow for input to the pressurizer surge tank RRZTK, as follows:

CHWCHG = CHWF12+CHWF13+RCS where:

$$RSC = \sum_I SFWTB(I)$$

To complete the calculation, the pressure at the CHGPD0 is obtained by back calculating pressure drops starting at the tap flows of the RCS system. This pressure, as described previously, is used to obtain a pressure difference across valve CHCV08 which is used in calculating the flow at the next time step. However, if the pump CHGPD only is in use, this is superfluous because such flow is determined by pump speed.

In back calculating the pressure drops, CHP8 is calculated from the RCS loop pressure as a function of the various tap-point flows and admittances, and:

$$CHP5 = CHP8 + DWSLVC \cdot \frac{[CHWF11]^2}{[BZB3]^2}$$

$$CHPPD\phi = CHP5 + DWSLVC \cdot \frac{[CHWF10]^2}{[BYA3]^2}$$

Subsequently, CHPPD0. CHPPD0 = Maximum of [CHPPD0, CHPPDF]. Normally, CHPPDF will exceed the previous CHPP$\phi$ only if the normal charging path is closed off. Hence if this occurs, the RCS loop fill header will determine the pump CHGPD discharge pressure.

Finally, the seal header pressure CHP6 is obtained from the charging pressure CHP5 and the filter pressure drop SFPDF as follows:

CHP6 = CHP5 − SFPDF

The boron makeup program BORECY simulates those systems associated with boric acid makeup including the boron evaporators, the boric acid storage tanks BAT1 and BAT2, the boric acid transfer pumps BAC1 and BAC2 and the boric acid blender BAB as well as the associated valves and piping.

The inputs to the boron makeup simulation include: flows from plant drains including the drains from the VCT tank letdown, diversion from the excess letdown, and the return line from the waste disposal drain tank; water pressure and flow from the primary water supply tank PWST; the pump shutoff head pressure for the boric acid transfer pumps BAC1 and BAC2; pressures of the volume control tank VCT; and the pressure in the suction line to the charging pumps CHGPA, CHGPB, and CHGPD.

The outputs from the boron makeup simulation include: the flow and boron concentration at the outflow of the blender BAB to the tank VCT and the suction line of the charging pumps CHGPA, B, D; the flow and boric acid concentration from the boric acid transfer tanks BAT1 and BAT2; and the levels in the boric acid transfer tanks BAT1 and BAT2.

The boron evaporator is included in the simulation even though no control for such evaporators are available in the control office of the preferred embodiment, because such simulation permits an overall boron inventory to be established. It is assumed that the evaporators handle approximately 15 gallons per minute each, converting the flow into purified water and 12% boric acid. Thus, either 0, 15 or 30 gallons per minute flows from the evaporators depending on the number of evaporators in use. The evaporator control is by means of "instructor-operated" functions. The boric acid is accumulated in a concentrate holding tank CHT, from which it can be transferred to the boric acid tanks BAT under instructor control.

Referring to FIG. 99/2 the mass, volume and boron concentration for the holdup tank HUT, the concentrate holding tank CHT is calculated as follows:

$$(d/dt)(BAWHT) - BAWH2$$

where:

$$BAWHT = DWWHT - SFWEXT + WDWDRT$$

Boron calculation for the holdup tank HUT is made by:

$$BACBHT = (BAMCHT/BAMHT)$$

Volume of the holdup tank HUT is based on:

$$(d/dt)(BAMCHT) = (BAWH1*BACB1) - (BAWH2*BACBHT)$$

The outflow from the holdup tank HUT is a function of the number of evaporators in use, or:

$$BAEH2 = \frac{15.*BANEVP*8.3543}{60}$$

The flow BAWF3 to the concentrates holding tank CHT is:

$$BAWF3 = BAWH2* \frac{BACBHT}{20000}$$

and the flow to water storage is obtained from the continuity equation heretofore described. The mass balance in the concentrates holding tank CHT is:

$$(d/dt)(BAMCCH) = BAWF3 - BAWF5$$

while the boron concentration is held at 12% or 20,000 PPM.
The mass flow rate leaving the concentrate tank CHT is obtained from the equation:

$$BAWF5 = BACVHT * (20. - BAPRS1).$$

The transfer pump (not shown) pressure is assumed to be twenty PSIA. The flow to the boric acid tanks BAT1, 2 is obtained by using a proportioning approximation by dividing flow to the two tanks BAT, where such flow is the total return flow from the tank B.I.T. recirculation plus flow from the concentrates holding tank CHT.

In addition to normal storage of boric acid solution in the tanks BAT1 and BAT2, the BAC1 or BAC2 pump recirculation function to prevent coagulation is simulated. The recirculation flows are obtained from the pressure difference between the BAC1 and BAC2 pump discharge and the BAT1 and BAT2 tank respectively in accordance with the following equation:

$$W_i = G_i * (BAPRSH - P_i)$$

where:

$i = 1,2$, $W_1 = BAWRY1$, $W_2 = BAWRY2$, $G_1 = BACVO4$,
$G_2 = BACVO5$, $P_1 = BAPRS1$, $P_2 = BAPRS2$.

In this case, when the volume in the particular tank BAC1 or BAC2 is less than five cubic feet the flows are set to zero, and the tank is assumed to be empty.

The recirculation flow through the Boron Injection Tank BIT is obtained in accordance with the following:

$$BAWFBT = \sqrt{\frac{(BACV3A)^2*(BACV3B)^2}{(BACV3A)^2 + (BACV3B)^2} * \left(BAPBIT - \max_{(BAPRS1, BAPRS2)}\right)}$$

When the volume in the tank BIT is less than five cubic feet the flow is set to zero and the tank BIT is assumed to be empty.

The blender BAB control utilizes the central controller service routines and the makeup logic described in connection with the computer P-2000A. The error signals to drive the blender controller are calculated in the subroutine BORECY, the limit of the control errors is then checked, and the corresponding valve admittances are returned from the Valve Handler subroutine. The BAWBLD flow to the blender, BAB is then calculated by using the expression:

$$BAWBLD = BACVBA* \sqrt{BAXX2}$$

where BAXX2 is the pressure difference and has been smoothed using a filter technique like that described in connection with the letdown line. The pressure difference BAXX2 is obtained from the differential equation using fluid inertia.

Primary water flow to the blender BAB uses the equation in the same form as the alternate flow to the blender BAB described above, namely:

$$BAWPRI = BACVWA* \sqrt{BAXZ2}$$

where:

BAXZ2 is a smoothed value.

The boron concentration BACB is in the blending BAB obtained from:

$$BACB = BACBCH*BAWBLD/BAWFBD$$

where:

$$BAWFBD = BAWBLD + BAWPRI$$

The two flows to the letdown and charging paths as shown in FIG. 99/2 are expressed as:

$$BAWF1 = BABFF1 = BAWFBD \frac{*BACVW}{BACVWB + BACV3B}$$

and $$BAWF2 = BABFF2 = BAWFBD \frac{BACVBB}{BACVWB + BACCVBB},$$

Pressure in the blender BAB is obtained from the charging pump suction pressures when the valve BACVBB is open as follows:

$$BAPBLD = CHPPI + \frac{(BABFF2)^2}{(BACVBB)^2}$$

and when the valve BACVWB is open, the following is used:

$$BAPBLD = CHPPI + \left(\frac{BABFF1}{BACVWB}\right)^2$$

When the valve BACVEB is open, bypass flow, BAWEMB is equal to the charging flow BAWF2. The total boration flow from the BA pump BAC1 or BAC2 is obtained from the continuity equation:

$$BAWBAT = BAWEMB + BAWBLD$$

When the volume in the blender BAB is less than five cubic feet, the flow is set to zero.

The flows BAWPP1 and BAWPP2 through the pumps BAC1 and BAC2, respectively are obtained from the expressions $$BAWPP1 = \frac{BAWRY1 + BAWBAT}{1 + BACVD7} + (BAWTBT + BAWRY2)\frac{*BACVD7}{1 + BACVD7}$$

and $$BAWPP2 = (BAWRY1 + BAWBAT)\frac{*BACVD7}{1 + BACVD7} + \frac{BAWRY2 + BAWTBT}{1 + BACVD7}$$

The pump discharge pressure is obtained by using pump equations of the form:
$$P_{out} = P_{in} + \Delta P + K\omega^2$$
where:

$\Delta P$ and K are obtained from the pump characteristics for two different speeds.

In the case of malfunction M40, plugged filter tank BAT1, represented by a check labeled M40 of FIG. 99/2, two admittances BACVBT and/or BACVCT, respectively are set to the values chosen by the instructor.

The flows from the tank BAT1 and BAT2 are calculated by using equations of the form:

The fluid mass BAMST1 and BAMST2 in each tank BAT1 and BAT2 is now obtained from the differential equations:

$(d/dt)$ (BAMST1) =
   BAWBT1 + BAWRY1 − BAWFT1 and BAWFT2
   $d/dt$ (BAMST2) =
   BAWBT2 + BAWRY2 − BAWFTS

From this calculation the base BALV1 and BALV2 follows immediately from:

$$BALV1 = BAMST1 * BASPV$$

$$BALV2 = BAMST2 * BASPV$$

To prevent the mass BAMST1 and the mass BAMST2 of the fluid in the tanks BAT1 AND BAT2, respectively from going beyond their limits, a control action causes the valves BACVD1 and/or BACVD2 to close as the space above the tank liquid becomes smaller than 0.01 cubic feet in each tank.

Seal Flow System Simulation (SEALFW)

The seal flow system for the reactor coolant pumps RCP(A)-(D) and the related excess primary coolant letdown system as illustrated diagrammatically in FIG. 99/1 are both simulated by the subroutine SEALFW in the model T22.

The inputs to the seal flow system include seal header flow (CHWF9), coolant loop pressure RCP1, charging pump return miniflow (CHWMB), volume control tank EXLDHX pressure.

The outputs of the seal flow system simulation SEALFW are: thermal barrier pressure drops SFPDT, the first seal SFCV1 and pressure drop SFPDS, seal flow temperature SFTSFI, SFTSFO, SFTSS, SFTWI, direct and bypass seal return flows SFWBY and SFWBYF, and seal SFWS standpipe levels.

The seal header flow CHWF9, or CHWF99, after scaling, is divided among the several reactor coolant pumps RCP(A)-(D) by utilizing a proportioning or linearizing equation as follows:

$$SFWCH(I) = \frac{SFJJ(I)}{SFSUM} CHWF99$$

$SFJJ(I) = SFCVP(I)*(CHP6(I) - SFPB1(I))$
$SFSUM = \Sigma SFJJ(I)$
   $I$

SFJJ(I) on this SFWCH(II), are limited to positive values to simulate the inlet check valve effects.

Flow SFWS(I) through the first seal SFCV1 is initially calculated by:

$$BAWFT1 = \left[\frac{2-BACVD4}{2} *BAWPP1 + \frac{BACVD4}{1 + BACVD4} *(BAWPP2-BAWKFL)\right]$$
$$* \left[BACVBT + (1.-BACVCT)\right]$$

and $$BAWFT2 = \left[\frac{BACVD4}{1 + BACVD4} *BAWPP1 + \frac{2-BACVD4}{2} *(BAWPP2-BAWKFL)\right]$$
$$* \left[BACVCT + (1.-BACVBT)\right]$$

$$SWFS(I) = SFCV1(I) * (SFPB1(I) - (SFPB2(I))$$

with:

$$SFPD1(I) = RCPG(I)$$

which assumes a small pressure drop across the thermal barrier SFCVT. Seal bypass flow SFWBY(I) is then calculated, where only positive flow is considered to simulate the check valve in the line.

$$SFWBY(I) = SFCVO(I) * (SFPB1(I) - SFPB4(I))$$

The flow SFWS(I) through the first seal SFCV1 and the flow SFWBY through the bypass line is summed to obtain the flow SFWSL(I) through thermal bearing as follows:

$$SFWSL(I) = SFWS(I) + SFWBY(I)$$

Branching is provided in all of the preceding calculations to eliminate negative-square-root situations. The pressure SFPB2(I) of the second seal SFCV2 is calculated according to the following equation:

$$SFPB2(I) = SFPB5 + \frac{SFWRV(I)^2}{SFCV4(I)}$$

and the flow SFWSS(I) from the second seal SFCV2 is calculated as follows:

$$SFWSS(I) = SFCV2 * (SFPB2(I) - (SFPD3(I))$$

Flow SFWTS(I) in the third seal SFCV3 is determined from the pressure SFPB3 is standpipe SWST as follows:

$$SFWTS(I) = SFCV3(I) * (SFPB3(I) - 14.7)$$

Flow SFWSP(I) to the standpipe is calculated as:

$$SFWSP(I) = SFWSS(I) - SFWTS(I)$$

Standpipe pressure SFPB3(I) is dependent upon elevation head in accordance with:

$$SFPB3(I) = 14.7 + \frac{1.5 + SFLSP(I)}{DWSLVC * 144}$$

utilizing the specific volume DWSLVC of the volume control tank VCT.

The standpipe fluid mass SFMSP(I) and level SFLSP(I) are obtained as follows:

$$\frac{SFMSP(I)}{dt} = SFWSP(I) + SFWPW(I) - SFWSD(I)$$

$$SFVSP(I) = SFMSP(I) * DWSLVC$$

where:
SFVSP(I) is the volume in the standpipe SFST, and SFLSP(I) = 5.0923 SFVSP(I)
where:

$$5.0923 = \frac{144.}{\text{standpipe area (in}^2)}$$

The flow SFWSD(I) in the standpipe orifice SWST0 is zero if the level SFLSP IN the stanpipe is less than five and one-half feet. The flow corresponds to the following equation if the level is greater than five and one-half feet:

$$SFLSP = 0.92(SFLSP - 5.5)$$

The standpipe SWST makeup Flow SFWPW(I) is obtained as follows:

$$SFWPS(I) = SFCV(I) \left( \frac{165. - SFPB3(I)}{DWSLVC} \right)$$

where 165 psia supply pressure is assumed as shown in FIG. 99/1.

Thermal barrier flow SFWTX(I) and pressure drop SFPDT(I) is calculated as follows:

$$SFWTB(I) = SFWCH(I) - SFWSL(I)$$
$$SFPDT(I) = \frac{SFWTB(I) * SFWTB(I)}{SFCVT(I)}$$

Referring to FIG. 92A, the pressure of the seal SWCV1 is displayed in the central office on indicators PI-151A through PI-153A for each of the pumps RCP(A) through RCP(D) respectively. For display purposes, the seal SFCV1 pressure drop is calculated as follows:

$$SFPDS(I) = SFPB1(I) - SFPB2(I)$$

When the four pump calculations (I=A,B,C,D) have been completed, the total bypass flow SFWBYP is summed:

$$SFWBYP - \sum_I SFWBY(I)$$

The seal return flow SFWRV for each pump is calculated as follows:

$$SFWRV(I) = SFWFS(I) - SFWSS(I)$$

The return flows are totalled as represented by:

$$SUMK = SFWRV(I)$$

and the bypass flow SFWBYP is added to obtain a sum SUML=SUMK+SFWBYP. Then, to obtain total return flow SFWRTN, the following applies:

SFWTRN = SUML for valve SFCV8A,B, to drain
DT SUML+SFWEXS for valve SFCV8A,B, to seal return The net flow SFWCVC returning to the seal water heat exchanger SWHX and the volume control tank VCT is obtained by adding the charging pump miniflow CHWMBS to SFWRTN (SFWCVC=SFWRTN+CHWMBS).

Referring to FIG. 92A, the seal shaft temperatures are indicated on the control panel by indicators TI-169, TI-171, TI-162 and TI-173. The seal water inlet temperature is indicated on the control boards by indicators TI-112, TI-166, TI-170, and TI-168. For a normal operation, the seal inlet temperature SFTW(I) is equal to the temperature DWTLVC of the volume control tank VCT, which in turn is equal to the outlet temperature of the charging pumps. In obtaining the shaft seal temperature SFTSS, a small increment due to conductive heat is added. This increment is calculated from the reactor coolant loop temperature RCP5(I), which in turn in calculated from the reactor coolant enthalpy RCH6(I) using the PWATER function fit, hereinafter described. Thus, the seal temperature is calculated in accordance with the following equation:

SFTSS(I) = DWTLVC+0.04(RCT5(I)−DWTLVC)

If seal inlet flow is reduced to an extent that a negative outflow from the RCS loops results, i.e. (SFWTB(I) is negative), the inlet temperature SFTWI(I) is ramped to 140° F and the shaft seal temperature SFTSS(I) is ramped to 160° F at maximum increments of 0.05° F per second.

Should loop outflow occur and the component cooling water flow to the pump bearings is lost, both inlet and shaft seal temperatures are increased to a maximum of the RCS loop temperature at a rate of approximately 2° F, per second.

Pressure in the seal return lines are back-calculated in the following manner, beginning with inlet pressure CHPPI to the volume control tank VCT below valve CHCVO1. First, the pressure SFPB6 at the inlet to the seal water heat exchanger SWFX is calculated as follows:

$$SFPB6 = CHPPI + \frac{[SFWCVC]^2}{[SFKFHX]^2}$$

Then pressure SFPB5 above the valve SFCVOO is obtained utilizing SFPB6 as follows:

$$SFPB5 = SFPB6 + \frac{[SFWRTN]^2}{[SFCVOO]^2}$$

The pressure SFPB4 above the valve SFCV42 is obtained as follows utilizing the pressure SFPB5:

$$SFPB4 = SFPB5 + \frac{[SFWBYP]^2}{[SFCV42]^2}$$

In obtaining the heat balance for the seal return, the inlet temperature SFTSFI for the seal water heat exchanger SWHX is calculated by the algebraic mixing of flow FUMT from the pump seals, excess letdown flow SFWEXS (if any), charging pump minoflow CHWMBS, the temperature DWTLVC of the volume control tank, the temperature FXTEX0 of the seal flow heat exchanger and the net flow SFWCVC returning to the seal water heat exchanger SWHX. The formula for such calculation is as follows:

$$SFTSFI = \frac{SUMT+DWTLVC \cdot CHWMBS+SFTEX0 \cdot SFWEXS}{SFWCVC}$$

where branching is used to prevent division by zero, in which case SFTSFI is set equal to DWTLVC. In the above equation, the following applies:

$$SUMT = \sum_I (SFWBY(I)+SFWRV(I) \cdot SFTSS(I))$$

The calculations for the seal flow heat exchanger SWHX are described on a counter flow basis. Temporary variables A1 (primary heat rate), A2 (heat flux), and A3 (primary heat capacity), and B1 (secondary heat rate), B2 (secondary heat flux), and B3 (secondary heat capacity), are defined by the following equations:

A1 = SFWCVC·SFCPSF [SFTSFI−SFTSF0], where:

SFCPSF = specific heat of SWHX $$A2 = SFUAFS \left[ \frac{}{2.} + \frac{SFTSFO-CCTSFI}{2.} \right]$$

where:

SFUAFS = total heat transfer coefficient of SWHX

A3 = SFMSF·SFCPSF, where:

SFMSF = Mass of SWHX

B1 = CCWSF·CCCPSF [CCTSFI−CCTSFO], where:

CCWSF = Flow rate in secondary side of SWHX

CCCPSF = Specific heat in secondary side of SWHX

B2 = A2,

B3 = CCMSF · CCCPSF where:

CCMSF = Mass in secondary side of SWHX.

For the primary or seal water flow side, the temperature drop SFTD of the seal water heat exchanger SWHX is expressed as follows:

SFTD = (A1−A2)/A3 and the outlet temperature SFTSFO is expressed as follows:

SFTSFO = ∫ (SFTD)dt

For the secondary or component cooling water side, the temperature drop CCTD is expressed:

CCTD =: (B1+B2)/B3 and the outlet temperature of SWHX is expressed as:

CCTSFO = ∫ (CCTD)dt

The end point averaging technique used in the calculation of heat flux, when used at extremely small flow rates, is subjected to the "see-saw" effect. If this effect is severe, it can cause the outlet temperature SFTSFO to exceed the inlet temperature SFTSFI on the opposing side. To prevent such results in the simulation for the heat exchanger SWHX, as well as other small heat exchangers in the system, a branching technique is utilized to effectively limit any temperature overswings.

Excess Letdown System Simulation

The excess letdown system from the loop drain header to the three-way valve SFCV8A,B is simulated as follows.

If all drain header isolation valves RCCV5A through RCCV5D inclusive are closed, both the drain flows from the individual valves (SFWEX(I)) and the total drain flows (SFWEXF) are set to zero. This is done by calculating a total valve admittance ASJJ1 as follows:

$$SFZ26 = \frac{SFZ25 + 4.0 [SFZ27]}{5.0}$$

then branching on this valve at zero value if the flow is zero.

When one or more drain header valves RCCV5 is open, header pressure is calculated as a function of loop pressure. This pressure is propagated to a point above valve SFCV23 through a series of pressure drop equations. The pressure below SFCV23 is determined separately from drain pressure or pump seal return pressure, depending on the position of the diverting valve SFCV8A,B. Next, total flow SFWEXR is calculated from the pressure difference across SFCV23 by:

$$SFWEXF = SFCV23 \sqrt{SFZ26}$$

where SFZ26 is a "smoothed" pressure difference calculated as four-fifths of the last pressure difference plus one-fifth of the current pressure difference as follows:

$$ASJJ1 = \sum_I RCCV5(I)$$

where:
SFZ25 = SFPEX3-SFPEX4 current

SFZ27 = SFPEX3-SFPEX4 last.

Branching is provided to avoid negative square roots. The absolute valves are used merely to avoid negative valves.

From the preceding total flow SFWEXF drain heater branch flows SFWEX(I) are calculated from the linearized proportioning equation:

$$SFWEX(I) = \frac{RCCV5(I)}{ASJJ1} [SFWEXF], \text{ and}$$

branching is provided to prevent division by zero.

If one or more drain header valves RCCV5 are opened, that is, ASJJ1 = 0.0, separate pressure drops are calculated, and then the header pressure SFPEX1 is taken as the minimum resulting pressure in accordance with the following equations:

$$SFPZ1(I) = RCP5(I) - \frac{[SFWEX(I)]^2}{[RCCV5(I)]^2}$$
$$SFPEX1 = \text{MINIMUM OF } \{SFPZ1(1,2,3,4)\}$$

In the foregoing equation, any errors from the approximation are temporary, since, once the valve stroke has been completed in accordance with the valve handler program previously described, open admittances of all the valves are the same.

Pressure SFPEX2 above the excess letdown heat exchanger EXLDHX is calculated from the equation:

$$SFPEX2 = SFPEX1 - \frac{[SFWEXF]^2}{[SFCVEX]^2}$$

and pressure SFPEX3 below the heat exchanger EXLDHX is calculated from the equation:

$$SFPEX3 = SFPEX2 - \frac{[SFWEXF]^2}{[SFKFEX]^2}$$

When the diversion valve SFCV8A,B is positioned to produce seventy percent or more flow to the drain tank DT, it is assumed that pressure SFPEX4 above the valve SFCV8A,B depends on atmospheric pressure, that is:

$$SFPEX4 = 14.7 + \frac{[SFWEXT]^2}{[SFCV8B]^2}$$

where SFCV8B is the valve admittance to the drain side DT and SFWEXT is the flow to the drain side.

For less than seventy percent flow to drain tank DT, the pressure is assumed dependent on the seal return pressure SFPB5 as follows:

$$SFPEX4 = SFPB5 + \frac{[SFWEXS]^2}{[SFCV8A]^2}$$

where SFCV8A is the valve admittance to the seal system side and SFWEXS is the flow to the seal system side.

To determine the above flows, a proportioning factor (SFKP8A) is used. The factor SFKP8A is calculated as 0.25*SFCV8A. Therefore, SFCV8A has a range of zero to 4.0, and SFKP8A has a range from zero to 1.0.

SFWEXT = SFKP8A * SFWEXF

SFWEXS = (1.0 − SFKP8A)*SFWEXF

The excess letdown heat exchanger EXLDHX is simulated in the same manner as the seal flow heat exchanger SWHX previously described.

Boron Concentration Calculation Simulation (RCBORC)

The boron concentration model T9 integrates boron inflow to the reactor coolant loops and outflow from the reactor coolant loops to obtain as an output the net boron concentration in the four loops of the entire reactor coolant system and the net boron concentration separately for any isolated loop.

The inputs to the boron concentration calculation include all flows into the reactor coolant system RCS with corresponding boron concentrations as follows: charging flow, seal flow, fill header flow, residual heat removal flow, and safety injection system flows. Also, all flows out of the reactor coolant system RCS including letdown flow, drain header flow, and residual heat removal return flow are applied as inputs.

The isolated loop boron concentration is calculated primarily for the purpose of obtaining boron inventory. When a previously isolated loop is reconnected by opening one or both of the stop valves RCCVO1 or RCCVO2, for example, any boron offset or difference between the isolated loop and the remainder of the reactor coolant system is eliminated. The boron offset elimination is predicated on the fact that the protective logic in the system will prevent the reconnection of an isolated loop until sufficient time has elapsed for the bypass equalizing flow to cause the isolated loop and the main system concentrations to be equalized. With both stop valves closed, the rate of boron flow (RCZABI) is in accordance with the following equation:

$$RCZABI = (CHWLF(I) + SFWTB(I))*[CHCB - RCCBIS(I)]$$

Under the same condition, the mass (RCMISL(I) is expressed as follows:

$$RCMISL(I) = \int [CHWLF(I)+SFWTB(I)-SFWEX(I)-RCWMBP(I)]dt$$

When one of the stop valves, RCCVO1, or RCCVO2 is closed, normally the stop valve RCCVO1 in the cold leg, the boron rate RCZABI is calculated as follows:
$$RCZABI = CHWLF(I) * [CHCB-RCCBIS(I)] + RCWMBP(I)*[RCCB-RCCBIS(I)]$$

and the mass (RCMISL(I) is as follows:

$$RCMISL(I) = \int [CHWLF(I)-SFWEX(I)]dt$$

Thus, the boron concentration (RCCBIS(I) is obtained as follows:

$$RCCBIS(I) = \int \frac{RCZABI}{RCMISL(I)} dt$$

Boron and mass flow summations are also made for use in the main system calculation, expressed as follows: with both stop valves RCCVO1 and RCCVO2 closed, $$RCWTRC = \sum_I RCWMBP(I)*RCCBIS(I), \text{ and}$$
$$RCMTRC \sum_I RCWMBP(I)$$

with one closed, $$RCWTRC = \sum_I RCWMBP(I) [RCCBIS(I) - RCCB]$$
$$RCMTRC = 0.$$

The boron concentration RCZABJ for the main reactor coolant system is obtained as follows: RCZABJ is calculated as four less the number of isolated loops, which calculation is utilized in computing volume; the several safety injection flows per tap are summed to get the total flow; the net volume RCVTAL of the reactor coolant system less the pressurizer volume and the volume of the isolated loops is calculated; and a variable RIJ which is the negative of the volume change in the system whenever a loop is added or isolated is formed. The variable RIJ persists for one time step only and then is reset. The purpose of this variable is to prevent a false concentration change due to a volume change when a loop is added or isolated to or from the reactor coolant system.

The boron concentration RCCB for the main reactor coolant system is then calculated in a manner similar to that for the boron concentration for the individual loops. The terms RCWTRC and RCMTRC introduce the boron and mass changes respectively from the isolated loops.

The boron rate RCZABM for the main reactor coolant system is then calculated as follows:

$$RCZABM = (CHWCHG+CHWF14)*(CHCB-RCCB) + RCWTRC$$

The mass RCMSS for the main reactor coolant system is then calculated:

$$RCMSS = [CHWF14 + CHWCHG + RHWF20 + RHWF21 - RHWF1 - DWWT + RCMTRC]dt$$

Thus, the boron concentration RCCB is obtained in accordance with the equation:

$$RCCB = \frac{RCZABM}{RCMSS + XMPW} dt$$

In the event safety injection has occurred, the boron concentration for each safety injection source is obtained and an approximate time delay applied. The safety injection flows and concentrations are then used in an alternate mass and concentration calculation, which calculation is similar to the calculation for the main system with the exception of the added flows and concentrations.

A "test switch" is provided so that the boron concentration for the reactor coolant system can be set by an input for test purposes. The test switch sets a logical FIXBOC to the TRUE condition and the desired concentration input as FRCCB in parts per million. The program will ramp the concentration from its current value to the desired value at a rate of 4/10 parts per million per second.

Flow Counter Programs

Referring to the flow chart of FIG. 99/3 or 99/4, two counters on the reactor panel indicate the flow in gallons of makeup water, and the flow in tenths of gallons of boric acid in the simulator. The counters are operated by four sublevels, two per counter. The sublevels use common program instructions with base pools for each counter. The C machine transmits the flow rate of makeup water MW and boric acid BA as two word mixed numbers. The amount of flow per second period is calculated as:

(flow (fal/sec) = flow rate (lb/sec)8.34(lb/gal)).
If the flow in a one-half second period has increased by one gallon or one-tenth of a gallon, the output sublevel for NW or BA is bid. No output is generated if the "makeup control" switch is in the "stop" position. A residual counter is used for amounts less than one gallon or one-tenth of a gallon and for any excess above the counter update amount.

Component Cooling System

Figure 100:
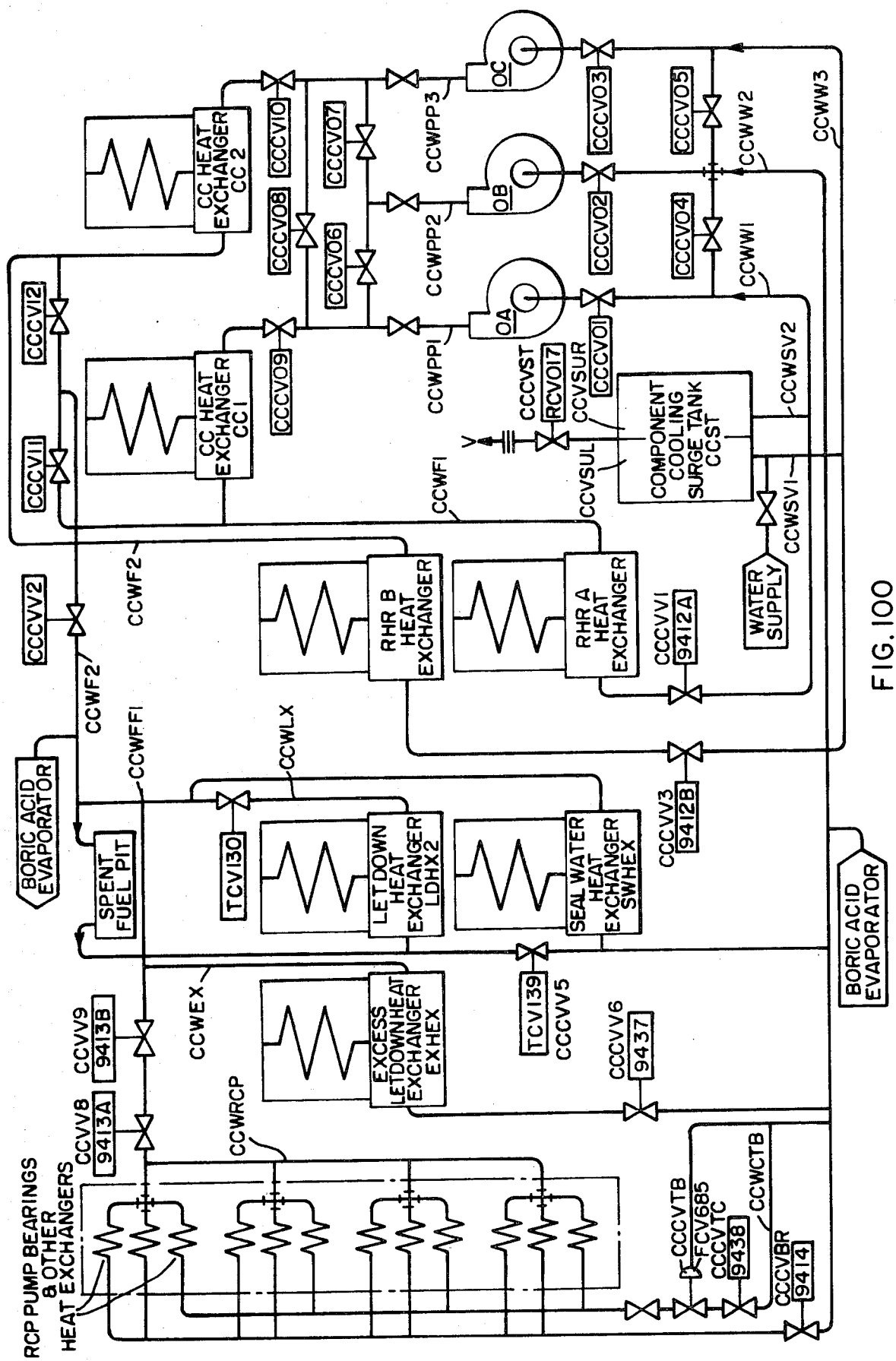
FIG. 100 is a schematic diagram of a typical component cooling system of the type being simulated.

Referring to FIG. 100, and the control panel of FIG. 91I, the component cooling system serves as an intermediate system between the reactor coolant system RCS and the service water system to prevent possible leakage of radioactive material into the environment. The system includes component cooling pumps OA, OB and OC; heat exchangers CC1 and CC2, and a component cooling surge tank CCST. Cooling water is circulated by one or more of the pumps OA, OB and OC through the shell side of the heat exchangers CC1 and CC2 to the components, a portion of which are shown in FIG. 100 as "Reactor Coolant pumps, bearings and other heat exchangers," and back to the pump suction. The surge tank CCST is tied into the pump section line in order to accommodate expansion and contraction of the system water due to temperature changes or leakage. The mineralized makeup water is supplied to the system as shown in FIG. 100.

The system is designed to supply 120° F cooling water to the component being cooled when the residual heat removal system is first placed in operation during plant shutdown, which is the maximum permissible temperature of the cooling water supply to the reactor coolant pumps. During normal plant operation, the temperature of the cooling water supplied to the reactor pumps approximates 95° F. Each component cooling heat exchanger CC1 and CC2 is sized for the heat removal load that occurs during normal full power operation. The component cooling flow requirement during full power is normally met by operation of a single one of the component cooling pumps OA, OB or OC; however during plant cool down, all three component cooling pumps are required to operate.

Normally the component cooling surge tank is vented through valve RCV017 to the drain header, but if high radiation is detected in the cooling system the valve RCV017 is automatically closed. The relief valve RCV017 relieves the minimum flow rate of the water which would enter the surge tank CCST flowing the unlikely event of a ruptured thermal barrier cooling coil in the reactor coolant pump.

For purposes of containment isolation, trip valves 9413A and 9413B are installed in the cooling water inlet to the reactor coolant pumps, valves V9438 and V9414 are installed at the cooling water outlet headers of the reactor coolant pumps, and trip valves V9437 here installed at the outlet of the excess letdown heat exchanger EXHEX. The temperature of the component cooling water supplied to the various components is indicated in the control room by meters TI-674 and TI-675. The common return flow from each residual heat exchanger RHRB and RHRA is indicated in the central control office by meters FI688 and FI689, respectively.

Component Cooling System Simulation (COCOOL)

The model T32 for the component cooling system COCOOL employs component cooling flows, pressures, temperatures, and component cooling and residual heat removal heat exchangers. In addition to the component cooling valves which are remotely operated from the control panels of FIG. 91I, the simulation includes flow distribution through valve CCV01 through CCV12 (see FIG. 100) inclusive which are operated by the instructor.

The inputs to the component cooling system represent flows and temperatures to the various heat exchangers, and the outputs include the component cooling flows and temperatures which are supplied to heat exchangers in the various components that the component cooling system services. Because most of the valves are on-off type, simplified network equations are utilized. A combination of valves CCZ1, CCZ2, and CCZ3 are simulated from the "local operator action" or the instructor operated valves CCCV01, CCCV02 and CCCV03 to accommodate flow and pressure distribution the three component cooling pumps OA, OB, and OC. Based on the position of the valve CCCVV1, CCCVV2, and CCCVV3, and the total pump pressure CCPPP, the total outflow to the component cooling network is calculated in accordance with the equation:

$$CCWFLW = \frac{300. * CCXM1}{CCXMAX} + \frac{75.*(CCXMAX - CCXM1)}{CCXMAX} + \frac{300.}{CCPPP} + 300.$$

which is obtained as a curve fit from the design data, and where:

$$CCXM1 = CCCVV1 + CCCVV2 + CCCVV3$$

and CCXMAX is a maximum Cv of 162.69.

The flow through each individual pump is then proportional to the pump speed and is written as:

$$CCWPP1 = CCWFLW*CCNP1$$

for the pump OA, and in an equivalent manner for the pump 0B and 0C. The flow CCWHX1 and CCWHX2 in the common header between the component cooling leak pumps and the heat exchangers CC1 and CC2 is similarly written as a function of the combination of valves and corresponding pressure as follows:

$$CCWPH1 = \frac{CCWPP1}{1 + CCCV06*CCCV07} + \frac{CCCV06*CCWPP2}{CCCV06 + CCCV07} + \frac{CCCV06*CCCV07*CCWPP3}{1 + CCCV06*CCCV07}$$

and $$CCWPH2 = \frac{CCCV06*CCCV07*CCWPP1}{1 + CCCV06*CCCV07} + \frac{CCCV07*CCWPP2}{CCCV06 + CCCV07} + \frac{CCWPP3}{1 + CCCV06*CCCV07}$$

The flows through the heat exchangers CC1 and CC2 depend on the above calculated flows and the valve positions of the instructor operated valves CCV08, CCV09 and CCV10. Specifically, the flow through the heat exchanger CC1 is in accordance with the following equation:

$$CCWHX1 = \frac{CCWPH1 + CCCV08*CCWPH2}{1 + CCCV08} * \frac{2.*CCCV09}{CCCV09 + CCCV10}$$

and the flow through the heat exchanger CC2 is:

$$CCWHX2 = \frac{CCCV08*CCWPH1 + CCWPH2}{1 + CCCV08} * \frac{2*CCCV10}{CCCV09 + CCCV10}$$

The change in water density is calculated for use in the calculation of the surge for the component cooling surge tank CCST. First the mixing equation (heretofore described) is utilized to calculate an average temperature. This average temperature is then utilized in the function fit to obtain corresponding specific volume. This same procedure is repeated for the inlet to the component cooling heat exchangers and for their outlet and for the flows and enthalpies coming from the letdown heat exchanger LDHEX, seal flow heat exchanger SWHEX and excess letdown heat exchangers EXHEX as well as the reactor coolant pump RCP(A)

through RCP(D), inclusive. The change in density is obtained from the density difference between two consecutive time steps.

The component cooling heat exchangers CC1 and CC2 are calculated by solving two simultaneous differential equations for the tube and the shell outlet water temperatures. These equations have the same form as described in connection with the chemical and volume control system (CVS). The inlet temperature is obtained from the mixing equation heretofore mentioned, assuming that the flows are mixed at the common header before entering the heat exchangers. In the event that the component cooling water is less than 0.01 pound per second, the inlet temperature to the heat exchanger CC1 and CC2 is set to be equal to the outlet temperature. In the service water system, a similar procedure is effected; and an additional check is made to prevent the component cooling outlet temperature from being less than the serice water outlet temperature, both the service water heat exchanger and the component cooling heat exchanger follow the same calculation and will not be described separately.

Combined admittances are formed for the valves CCV1, CCCVV2, CCCVV3, CCCV11, and CCCV12, which are then used to calculate flows through the valves CCCVV1, CCCVV2, CCCVV3. Thus, flow through the valve CCCVV1 is in accordance with the following equations:

$$CCWF1 = \frac{CCCVV1 \cdot CCWHX1}{CCZ14} + \frac{CCCVV1 \cdot CCCV11 \cdot CCCV12 \cdot CCWHX2}{CCZ15}$$

$$CCWF2 = \frac{CCCVV2 \cdot CCCV11 \cdot CCWHX1}{CCZ14} + \frac{CCCVV2 \cdot CCCV12 \cdot CCWHX2}{CCZ15}$$

$$CCWF3 = \frac{CCCVV3 \cdot CCCV11 \cdot CCCV12 \cdot CCWHX1}{CCZ14} + \frac{CCCVV3 \cdot CCWHX2}{CCZ15}$$

where CCZ14 and CCZ15 are combined admittances mentioned above. Flow to the evaporators, CCWEVP is taken to be 23% of the CCWF2, so that the flow to the components is:

CCWFF1 = CCWF2 − CCWEVP

Now, the flows through different components of the component cooling network are proportional to the flow CCWFF1 and the ratio of admittances. Total constant flow to the RC pump is:

CCWRCP = CCWFF1 * (CCZ24/CCZ25)

CC flow to the excess letdown heat exchanger is:

CCWEX = CCWFF1 * (CCVV6/CCZ25)

CC flow to the letdown heat exchanger is:

CCWLX = CCWFF1 * CCCVV5/CCZ25

CC flow to the seal flow heat exchanger is:

CCWSF = CCWFF1 * CCCVV4/CCZ25

CC flow to the spent fuel Pit is:

CCWFT = CCWFF1 * CCCVFT/CCZ25 where:

$$CCZ24 = \frac{(CCCV8)^2 \cdot (CCCVV9)^2}{(CCCVV8)^2 + (CCCVV9)^2}$$

and

CCZ25 = CCCVV4 + CCCVV5 + CCCVV6 + CCZ24 + CCCVFT.

The flows through the RC pump thermal barrier and bearings are calculated in the same manner as the above flows. Namely, CC flow through the thermal barrier is:

CCWCTB = CCWRCP * (CCCVSS/CCCVBR+CCCVSS)

CC flow through the bearings is:

CCWCBR = CCWRCP * (CCCVBR)/(CCCVBR+CCCVSS)

where:

$$CCCVSS = \frac{(CCCVTB)^2 \cdot (CCCVTC)^2}{(CCCVTB)^2 + (CCCVTC)^2}$$

The above mentioned calculations are protected by checking denominator value, and preventing it from going to zero. The return flow CCWFFD is the sum of the flows CCWRCP, CCWEX, CCWLX, CCWSF and CCWFT.

A residual heat removal heat exchangers RHRA and RHRB are simulated by using a system of differential equations like that mentioned heretofore and described in detail in connection with the description of the chemical and volume control (CVC) system. When the coolant flow in the heat exchangers is smaller than 0.01 pounds per second, the inlet temperature is made equal to the outlet temperature. When the flow in the tube side of the heat exchangers RHRA and RHRB is smaller than 0.01 pounds per second, the tube water inlet temperature is made equal to tube outlet water temperature. Also, the outlet temperature on the tube side of the heat exchanger is limited so it can never be lower than the temperature on the shell side of the heat exchanger.

The surge tank simulation is based on the water density change previously described. The surge tank CCST is separated by a baffle so that two separate surge flows and two separate surge tank volumes CCVSUR and CCVSUL are calculated. Thus, two separate mass calculations are written as follows:

(d/dt) (CCMSUR) = CCWSU1 d/dt (CCMSUL) = CCWSU2

Now, if the mass in each side is greater than 2770 lb., the overflow across the baffle is calculated from:

CCMDL = CCMSUL − 2770 and

CCMDR = CCMSUR − 2770 and, accordingly, $$CCMSUL = CCMSUL + CCMDR$$

and $$CCMSUR = CCMSUR + CCMDL$$

Pressure in the surge tank CCST is calculated as the ratio of the vapor volumes at the two consecutive steps, or:

$$CCPSUR = CCPSUR * (CCVVPL/CCVVP)$$

where, surge tank pressure is given as:

$$CCVVP = CCVSUT - CCMSU1 * CCSCD2$$

with CCMSU1 is the total mass in the surge tank given as $$(d/dt)(CCMSU1) = CCWSU1 + CCWSU2$$

When the vent valve RCV-017 is open, the surge tank pressure is signaled to be equal to atmospheric pressure.

Residual Heat Removal System (RHR)

The primary function of the residual heat removal system RHR is to remove heat energy from the reactor core and the coolant system RCS during plant cool down and core refueling operations. This system is also used as part of the safety injection system SIS and the containment spray system CSS, which use is described in connection with the appropriate system description. As a secondary function, the RHR system is used to transfer refueling water between the refueling water storage tank RWST and the refueling cavity at the beginning and end of refueling operations.

Figure 101A:
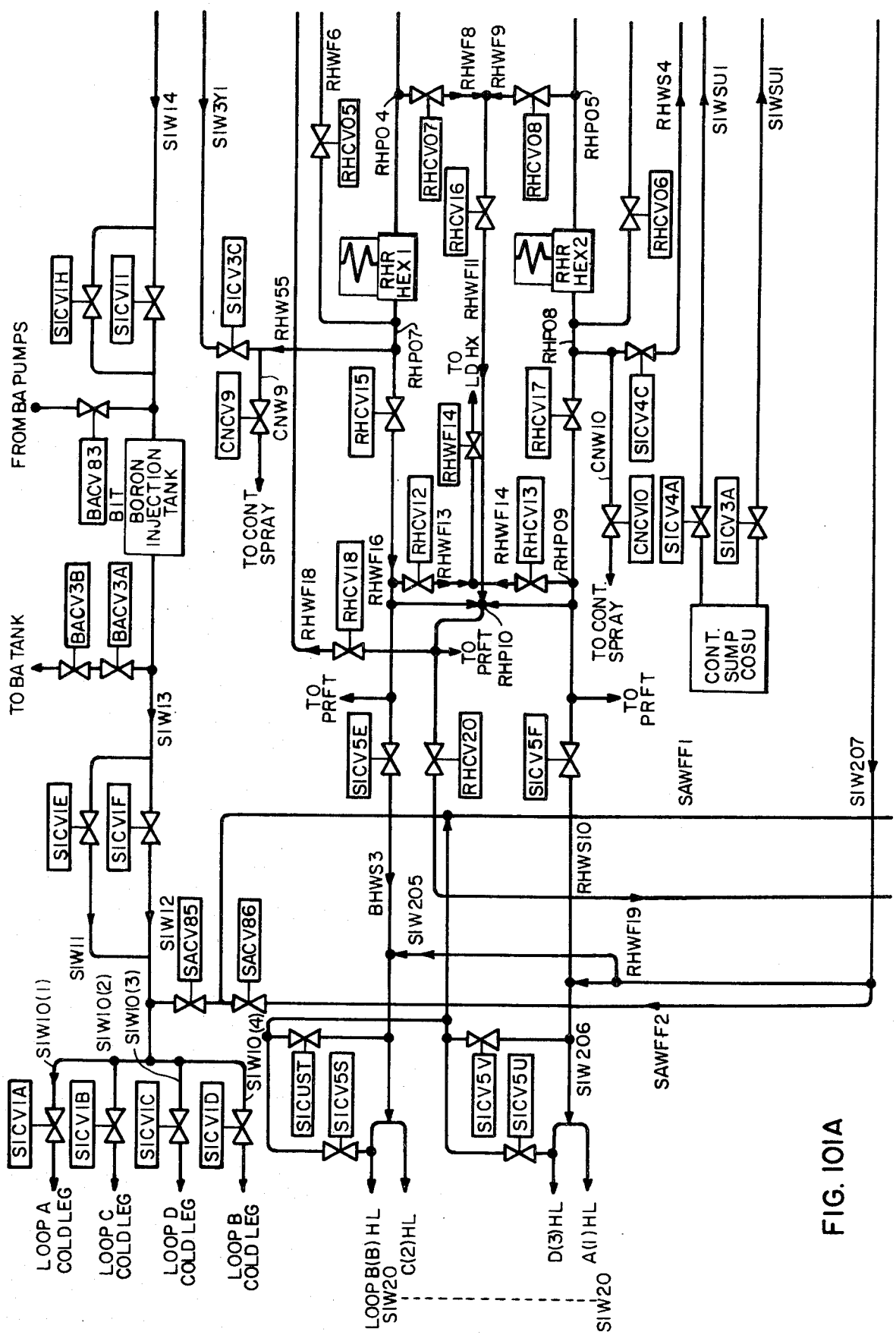
Figure 101B:
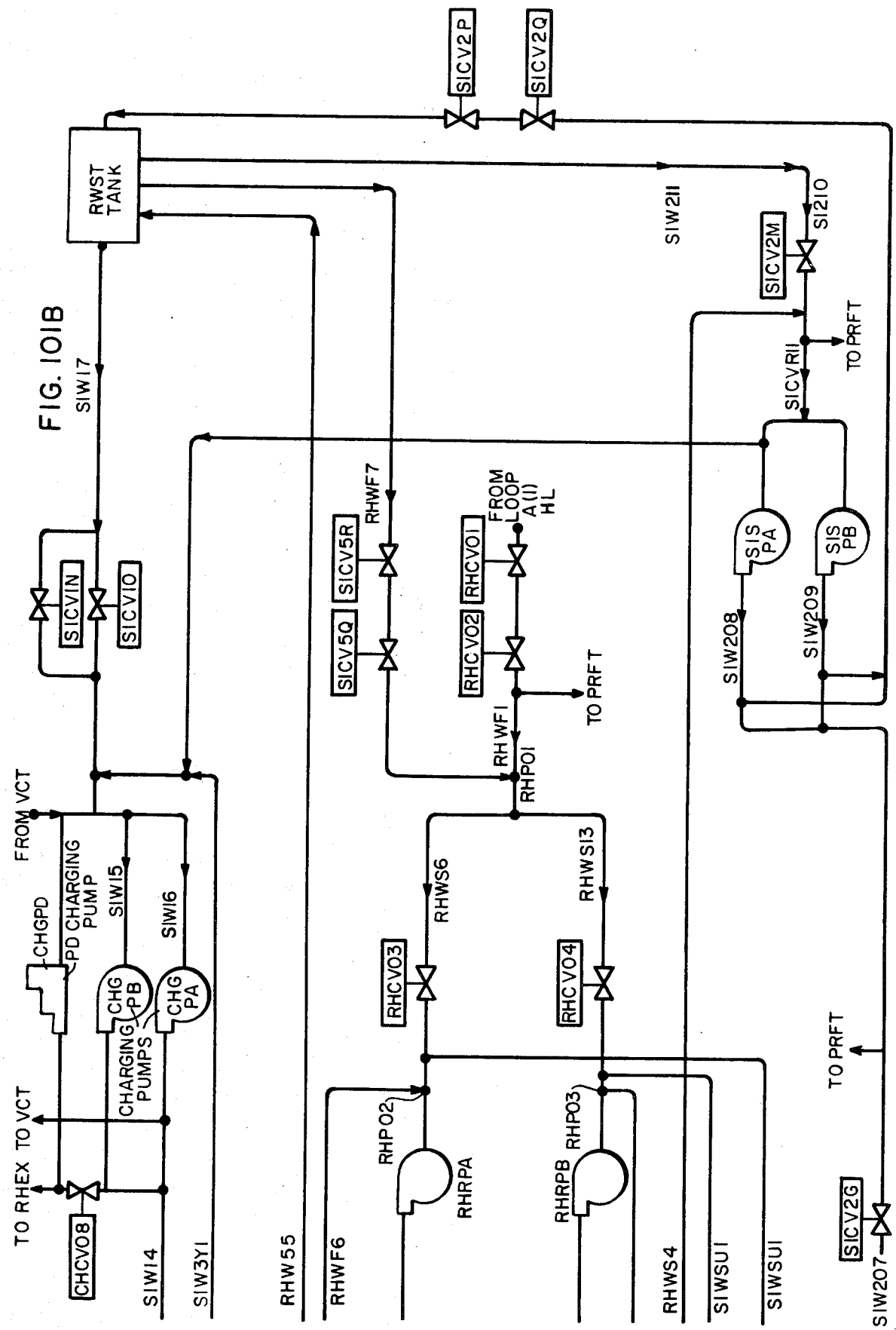
Figure 10I:
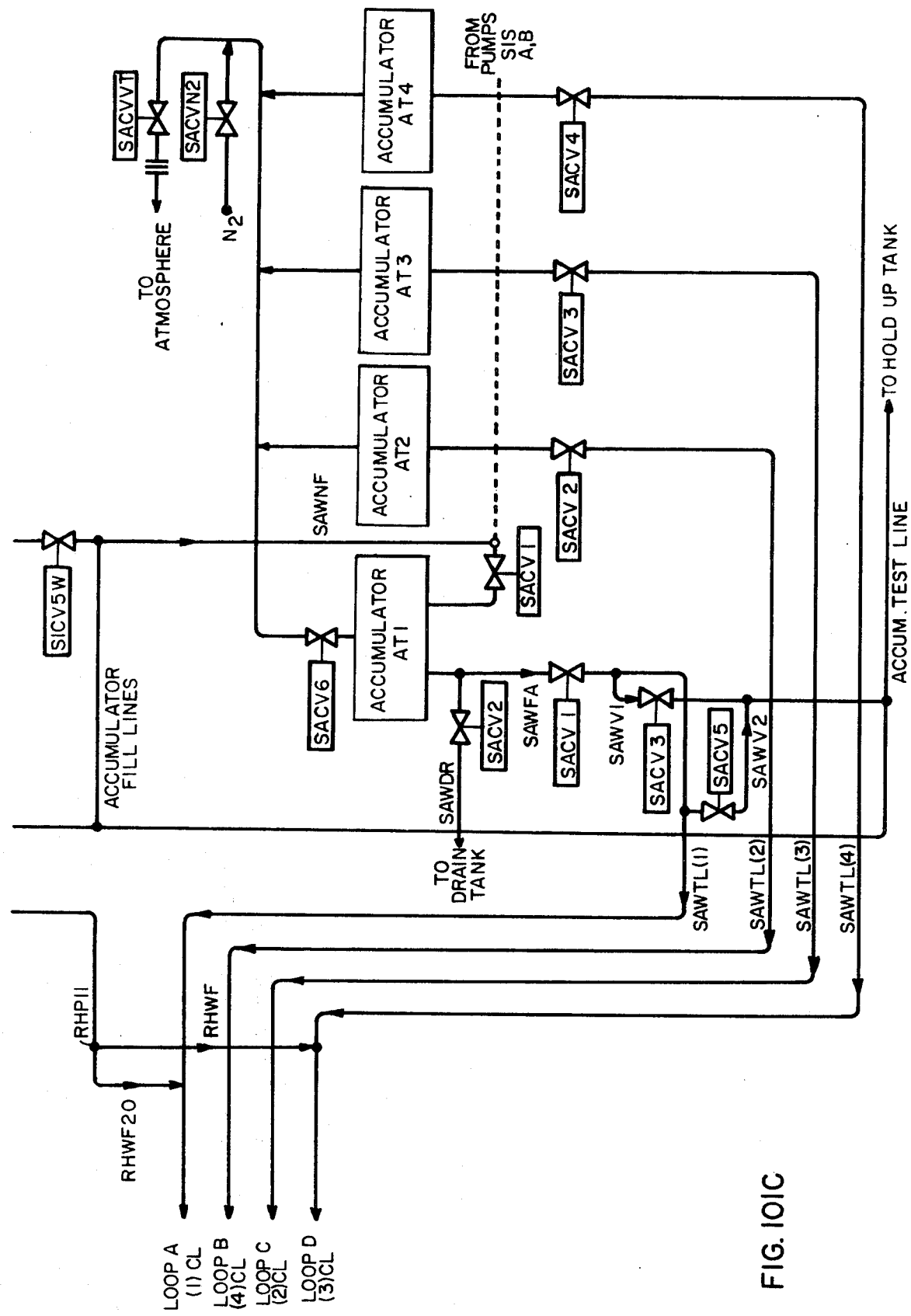

Referring to the control consoles shown in FIGS. 91J and 91K, and the diagram of FIG. 101A through 101C, the system consists of two residual heat exchangers RHRHEX1 and RHRHEX2 (FIG. 101A) and two residual heat removal pumps RHRP1 and RHRP2.

During residual heat removal system operation, the reactor coolant flows from the hot leg of the loop A of the reactor coolant system (FIG. 101B) through inlet isolation valves RHCV01 and RHCV02, pump suction isolation valve RHCV03 to the suction side of the pump RHRP1, and through the pump suction isolation valve RHCV04 to the suction side of the pump RHRP2.

The reactor coolant then flows through the tube side of the residual heat exchangers RHRHEX1 and RHRHEX2, which are cooled by water from the component cooling system described elsewhere. The coolant flow through the residual heat exchangers is controlled by flow control valves RHCV15 RHCV17. The coolant next passes through the outlet isolation valve RHCV20 to the cold legs of loop A and loop D of the reactor coolant system RCS.

To assure that the pumps RHRPA and RHRPB do not overheat or vibrate when the discharge line is closed, miniflow return lines RHWF6 and RHWF7, respectively, from the discharge side of each heat exchangers RHRHEX1 and RHRHEX2 is provided to the suction lines of the pump. A control valve RHCV05 or RHCV06 is located in each miniflow line, and is regulated to open when the pump discharge flow is less than 500 gallons per minute and close when the flow exceeds 1000 gallons per minute. Valve RHCV16 is adjusted to regulate the residual return flow temperature by bypassing the heat exchanger RHRHEX1 and RHRHEX2.

During core refueling, the isolation valves SICV52 and SICV5R are opened to permit the pumps RHRPA and RHRPB to draw water from the refueling water storage tank RWST. The pumps RHRPA and RHRPB can take their suction from the containment sump through valves SICV3A and SICV4A. The discharge from the heat exchanger RHRHEX1 can be directed to the suction side of the charging pumps through valve SICV3C, and the discharge from the heat exchanger RHRHEX2 can be directed to the suction side of the safety injection pumps SIPA and SIPB through valve SICV4C. The crossover header valves SICVR1 and SICVR2 permit crossover flow from the centrifugal charging pump suction to the safety injection suction. The lines and valves just considered are described in more detail in connection with the safety injection system SIS.

In addition to the operation of the valves previously described from the control console in the central office, FIG. 91K illustrates the pressures, flows, levels, and temperatures monitored in the central office as indicated in connection with the description of the simulation of the residual heat removal system RHR.

The model T26 for the residual heat removal system employs the subroutine RHR which covers the behavior of the system in its normal use only as previously described.

The inputs to the system RHR are: component cooling system flows, component cooling system temperatures heat exchangers RHRHEX1, coolant water outlet enthalpies, reactor coolant system loop enthalpy, and reactor coolant system loop pressure. The outputs of this simulation are the flows and the RHR system enthalpies.

Referring to FIG. 101/1, the model of the RHR system follows a close analogy between the electrical quantities and the hydraulic quantities. The analogy is based on Ohms Law $I = GV$ for the electrical circuit and $W^2 = GP$ for the hydraulic network.

In the program, valve admittances are calculated first as a function of the valve or piping coefficient specific volume of water and flow according to the following equation:

$$G_1 = (C_y)^2/V_w * W$$

where $C_y$ is obtained from the valve or the piping characteristics $V_w$ is the specific volume of water and W is the flow through the particular valve or pipe. All equations are protected in the event the flow is less than 0.001 pounds per second, in which case the flow W is set to zero. Also, combined admittances are formed depending on the network layout, that is, either in parallel or series.

Next, the pressures around the loop are calculated A check is made to determine if the RHR system is connected to the reactor coolant system loop RCS or to the refueling water tank RWST. In the event that the valves RHCV01 and RHCV02 are open, the RHR system is connected to the loops in the coolant system RCS and the pressure downstream or below the valves RHCV01 is calcuated from the pressure drop on the valves in accordance with the following equation:

$$RHP01 = RCP1(1) - RHWF1/RHXH1$$

where RHZH1 is the combined admittance of the valves RHCV01 and RHCV02. In the instance when the RHR system is connected to the tak RWST, the expression for the suction pressure to the pumps has the same form with the corresponding values for pressures, admittance and flow.

The suction pressure for pump RHRPA and B is based on the pressure drop across the valves RHCV03 and RHCV04. Thus, the pressure drop RHP02 across the valve RHCV02 corresponds to the following equation:

$$RHP02 = RH(O) - RHWF2/RHZ3$$

RHZ3 is the admittance of the valve RHCV03. Also, the same calculation occurs for pressure RHP03 across the valve RHCV03.

The discharge pressure RHP04 and RHP05 is obtained from the pump characteristics and flows through the pump. The pressures RHP07 and RHP08 at the outlet of the heat exchangers RHRHEX1 and RHRHEX2, respectively, are obtained from the respective pressure drops in the heat exchangers in accordance with the expression used in connection with the pressure drops RHP02 and RHP03.

The pressure RHP09 at the discharge side of the valves RHCV12 and RHCV13 and the inlet to the valves RHCV14 is obtained from the equation:

$$RHP09 = \frac{RHP07 \cdot RHZ12 + RHP08 \cdot RHZ13 - RHWF15}{RHZ12 + RHZ13}$$

where the tersm RHZ12 and RHZ13 are the admittances of the valves RHCV12 and RHCV13. The pressure RHPECV at the inlet of the letdown heat exchanger LDHX is expressed as follows:

$$RHPECV = RHP09 - RHWF15/RHZ14$$

where the term RHZ14 is the admittance of the values RHCV14. Also, the pressure RHP06 at a point between the valves RHCV07 and RHCV08 at the inlet to valve RHCV16 is calculated in a manner similar to the calculation of pressure RHP09 using corresponding admittances, pressures, and flows. Also, the pressure RHP10 at the inlet to valve RHCV18 and RHCV20 and the outlet of RHV16 is calculated in a manner similar to that employed for the pressures RHP06 and RHP09.

The pressure RHPERP of the refueling water tank RWST is obtained from the pressure drop in the valve 8735 as follows:

$$RHPERP = RHP10 - RHWF18/RHZ18$$

The calculated pressures RHPRI and RHPR2P for the loops of the RCS system are calculated in the same manner as the pressure RHPERP. The three pressures, that is RHPERP, RHPRIP and RHPR2P, are used in an iterative scheme to obtain corresponding flows by taking into account the inertia of the fluid in the pipes. The differential equation that is used for obtaining the corresponding flows is as follows:

$$d(w)/dt = (P_c - P_t)/I$$

where W is the flow, $P_c$ is the calculated pressure, $P_t$ is the true pressure and I is the flow inertia. Because of the particular network representation, several checks need to be made to set the flows equal to zero when certain combinations of valves are closed. Then these flows are calculated going from the network outlet toward the network inlet using the expression:

$$W = G \cdot \Delta P/V_w$$

where W is the flow, G is the valve admittance, $\Delta P$ is the pressure difference and $W_w$ is the specific volume of fluid. Finally, a number of limit checks are made for use in the protection logic described elsewhere herein.

SAFETY INJECTION SYSTEM

The safety injection system SIS provides emergency core cooling in the event of a loss of fluid from the primary (RCS) or secondary (steam-side) system, which loss of fluid is referred to as a loss of coolant accident (LOCA). Water containing a high boron content is initially introduced into the reactor coolant system (RCS) to counteract any reactivity resulting from a steam break. This is followed by an injection of water with a lower boron content in order to cool the core and prevent the possibility of an uncontrolled return to criticality. If the containment pressure increases to a preset value as a consequence of a LOCA, water is sprayed into the containment atmosphere by the containment spray system CSS to prevent the ambient pressure from reaching the containment design pressure. After the initial pressure peak is reduced by the CSS system, the SIS is used to provide long term spray capability primarily for removal of airborn radioactivity in the containment.

In describing the SIS system, reference will be made to the control console illustrated in FIGS. 91C through 91G inclusive; and also reference will be made to the diagram illustrated in FIGS. 101A, 101B and 101C.

In the event of a steam break or a small break in the reactor coolant system RCS where the pressure remains high for a long time, the two centrifugal charging pumps CHGPA and CHGPB (FIG. 101B) operate to inject water containing concentrated boric acid into each of the cold legs of loops A through D of the system RCS. Upon initial starting, the pumps force the concentrated solution out of the boron injection tank BIT through valve SICVIF or SICVIE, and through the valves SICVIA through SICVID leading to each of the cold legs of the RCS system. Water containing diluted boric acid is drawn into the suction side of the pumps from the tank RWST through the value SICVIO or SICVIN; and this solution is pumped into the boron injection tank forcing the concentrated boric acid solution out of the tank and into the reactor vessel RV. The pumps continue to inject diluted boric acid acid into the reactor coolant system RCS to cope with any size RCS break. The centrifugal charging pumps CHPA and CHPB are normally aligned for their charging function. On initiation of SIS operation, which initiation shall be referred to herein as an "S" signal, the pumps start while the appropriate valves close in order to isolate the normal charging paths and admit water as previously described. Simultaneously, upon receipt of an "S" signal the normal boric acid circulating path is closed and the BIT tank is aligned for SIS operation.

Once the pressure in the RCS loop has descreased to below the shutoff head of the safety injection pumps SISPA and SISPB, (FIG. 101B) these pumps take water from the tank RWST through valves SICV2M, and discharge through valves SICV2G, line SIW207, and into the hot legs of each of the loops leading to the reactor vessel RV.

Each of the four accumulator tanks AT1 through AT4 inclusive (FIG. 101C) has a separate discharge line into a respective cold leg of each loop of the RCS system. Each tank AT1 through AT4 contains borated water with a pressurized cover gas. The gas is used to propel the tank contents into the cold leg, once the RCS pressure drops below that in the tank. The accumulator portion of the SIS system is particulrly effective in the case of large RCS breaks.

The two residual heat removal pumps RHRPA and RHRPB (FIG. 101B) are normally aligned to operate on an "S" signal. They take water from the tank RWST through valves SICV5R and SICV5Q, valves RHCV03 and RHCV04, and inject it into the reactor vessel RV through the hot legs of each of the loops A through D through the heat exchangers RHRHEX1 and RHRHEX2, valves RHCV15 and RHCV17, and valves SICV5E and SICV5F. The pumps RHRP(A)(B) can be aligned through valves SICV3A and SICV4A to draw water from containment sump COSU. The pumps RHRPA and RHRPB are also used to pump to the spray headers for removing fission products from the containment atmosphere and cooling such atmosphere at the same time.

Immediate, automatic response to an "S" signal, is known as the injection phase. This phase is followed by the recirculation phase. In the injection phase, the response is directed toward preventing or minimizing damage to the reactor core; and in the recirculation phase the effort is directed toward preventing any further reactor core damage, if any has occurred, by continuously removing decay heat from the core. A more detailed description of the SIS system and its operation, where required, is given in connection with the description of the SIS simulation.

Safety Injection System Simulation

The safety injection system model is divided into nine parts T27, T30, and T35-T41 with corresponding subroutines. Each of the subroutines covers a particular portion of the SIS system including the containment spray system CSS. Each of the subsequent eight subroutines are arranged to be called from the subroutine SIMAIN. The calling sequence is dependent on the particular logical function in the plant. The subroutine ACUMM, which governs the operation of the accumulator tanks AT1 through AT4 inclusive, is independent of the other portion of the SIS system. As previously mentioned, this arrangement enables the use of only one routine while the others remain inactive.

SIS System Calling Subroutine (SIMAIN)

In this routine, the several safety injection programs are called in sequence depending upon the status of the simulated plant.

Referring to FIG, 91D, valves 8884A and 8884B, and valves 8885A and 8885B (SICV5)(S)(T)(U)(V), are opened to determine if there is any leakage of the check valves, which serve to prevent flow from the system RCS to the safety injection system SIS, and are initially checked as to position. In the event any of these four valves are opened two logical variables are assigned. Also, the opening of these valves permits the testing of the SIS system during normal plant operation and the pumps SISPA and SISPB can be started to permit discharge into the test lines through the valves 8884A and 8884B (SICV5S, SICV5T).

Secondly, the safety injection program SIS1 is called if a protection logic signal (PL8C62) is set, or if the accumulator fill line test valve SACV86 is open. The protection logic signal in this program is the output from the safeguard sequencing routine.

The safety injection program SIS2 is then called if a protection logic signal (PL8C61) is set, or if the accumulator fill line valve SACV85 from the tank BIT is open.

Next, the safety injection program SIS3 is called if a protection logic signal (PL8C62) is set, and the containment sump isolation valve SICV3A is opened, which permits the RHRPA pump to take its suction from the containment sump COSU.

Subsequently, the safety injection program SIS4 is called if a protection logic signal (PL8C61) is set, and the containment sump isolation valve SICV4A is open.

Next, the safety injection program SIS5 is called if any of the above mentioned test valves are opened or a protection logic signal (PL8C63) is set.

The safety injection program SIS6 is called if the containment spray pumps CSSP are not in their test modes.

The safety injection program SIS7 is called if the valve SIXV5Q and SIZV5R in the suction line between the tank RWST and the pumps RHRPA and RHRPB are opened; and either of the two containment spray valves 0049 or 0050 are opened.

Also, in the program SIMAIN, a logic variable for the accumulator pressurization, ACMCLL, is set TRUE if either the valve SACVVT leading from the accumulator tanks AT1 through AT4 to the atmosphere, or the valve SACVN2 in the line from the nitrogen supply to the accumulators is open.

The mass STMASS of the refueling water storage tank RWST is calculated in this program from the outflows (FIG. 101B) from the tank in accordance with the following equation:

$$d/dt\ (STMASS) = -\ (SIW17 + SIW211 + STWHHF + RHWF7 + + CNWST1 + CNWST2)$$

The volume of tank RWST is obtained from the expression:

$$STVOL = STMASS*SISPVL$$

Safety Injection Simulation SIS1

Subroutine SIS1 is used to simulate high pressure head safety injection through the two centrifugal charging pumps CHGPA and CHGPB and a portion of the accumulator fill line.

Referring to the control console in FIGS. 91E through 91G, and FIGS. 101A through 101D, the admittances are calculated for the valve SICVIA through SICVID for isolating the cold legs of loops A through D, and for the discharge isolation valve SICV1E and SICV1F from the tank BIT, and the inlet isolation valves SICV1H and SICV1I to the tank BIT, and suction valves SICVIN and SICVIO, as well as for the piping in accordance with the following expression:

$$G = C_v^2/W*V,$$

where the symbols are the same as those used in connection with the previous description of the RHR system SICV1E and SICV1F, and the admittance is calculated by using an expression of the form:

$$G = (C_{v1}^2 + C_{v2}^2)/W * V,$$

where $C_{v1}$ and $C_{v2}$ are obtained for each individual valve.

Pressures are calculated starting from pressure, SIPRS of the tank RWST and from the pressure drop in the lines and valves determined in accordance with the following:

$$P_{r+1} = P_r + W/G$$

The pressures obtained at the loop are then used together with the those pressures to calculate flows SIW10(I) based on the differential equation:

$$d/dt\ (W) = (P_c - P_r/I)$$

By using continuity equations, the flows (see FIGS. 101A and 101B) around this loop are obtained; namely:

```
SIW11 = SIW10(1) + SIW10(2)
SIW12 = SIW10(3) + SIW10(4)
SIW13 = SIW11 + SIW12
```

The filling of accumulation tanks AT1 through AT4 through the charging pumps CHGPA and CHGPB and valve SACV85 is simulated by calculating the admittance of valve SACV85 in the accumulation test line. The pressure downstream of this valve is calculated by using the pressure SIPRS in tank RWST, and the loop pressure in the lines. The filling flow itself is calculated from the admittance of the valves SACV8(I) and the calculated pressure SAPP in the accumulators AT11 through AT4 fluid inertia is used to obtain true filling flow SAWMF(I).

Boron concentration SICBIT in the boron injection tank BIT is calculated from the following equation:

$$BAMBIT*d/dt\ (SICBIT) = SIW14*SICBRF - SIW13*SICBIT$$

and the continuity equations are used to obtain flows SIW13, SIW14 and SIW17.

The pressures RHP01, RHP02, RHP06, RHP07, RHP08 and RHP09 are used as temporary variables, or local variables without any connection to the RHR system.

Safety Injection System SIS2

This simulation provides for a high pressure head safety injection through the safety injection pumps SISPA and SISPB and a portion of the accumulator tanks AT1 through AT4, including filling lines. The admittances of the valves and piping are calculated in a manner similar to that employed for admittances in the safety injection system simulation SIS1. The pressures are calculated commencing with the pressure STPRS of the tank RWST, and proceeding toward the RCS loops. The discharge pressures of the safety injection pumps SISPA and SISPB are calculated from the pump characteristics in accordance with the following equation:

$$P_{disch} = P_{suct} + P_{head} + K_2*W^2$$

where P head is the pump head obtained from the pump handler routine hereinbefore described, $K_2$ is the coefficient obtained from the curve fitting of the pump characteristics and W is the flow. The pressures RHP01, RHP02, RHP06, RHP07, and RHP08 are used as temporary or local variables without connection to the RHR system.

The calculated pressure in the RCS loops is then used together with the true loop pressure to determine the flows SIW20(I) (FIG. 101A) by means of the fluid inertia, as described in connection with the subroutine SIS1.

The continuity equations are used to determine the flows from the RCS loops to the discharge of the pumps SISPA and SISPB as follows:

```
SIW205 = SIW20(1) + SIW20(2)
SIW206 = SIW20(3) + SIW20(4)
SIW207 = SIW205 + SIW206
```

The fill flow for the accumulator tanks AT1 through AT4 is calculated from the admittance of the valve SACV86 and the pressure in the line between the valve SICV2G and the valve SACV86. The calculated pressure of the accumulator is obtained from the pressure downstreams of the valve SICV2G previously described; and the pressure drop in the line is used to calculate the filling flow SAWNS(I) by means of the fluid inertia. The continuity equations then provide the connection for the flows as follows:

```
SIW210 = SIW208 + SIW209

SIW211 = SIW210+
```

Safety Injection System SIS3

The safety injection system simulation SIS3 involves recirculation from the containment sump COSU utilizing containment pressure, and the pump RHRPA and the charging pump CHGPA and CHGPB.

In addition to the admittances which are calculated for the valves in connection with the simulation SIS1, SICV3A and SICV4A, the admittance for the valve SICV3C is calculated, and the corresponding combined admittances are formed.

The recirculation occurs when the pump RHRPA takes the water from the sump CCSU. The pump RHRPA suction pressure is calculated from the containment pressure CNPC and the pressure drop across the valve SICV3A. The discharge pressure of the pump RHRPA is obtained from the pump characteristic in accordance with the formula:

$$RHPEE3 = RHPEE2 + RHPOP1 - 1.1*10^{-3}*(RHWS6)^2$$

while the pressures downstream are obtained by subtracting pressure drops in the valves and piping. The pressures RHP02, RHP06, RHP07, RHP08, RHP09 are used as temporary or local variables without connection to the RHR system.

The suction pressures of the charging pumps CHGPA and CHGPB are obtained from the pump RHRPA discharge pressure and the corresponding pressure drops, while the discharge pressure of the charging pumps CHGPA and CHGPB is calculated from the pump characteristics using the same general expression as in the case of the pump RHRPA.

The calculated RCS loop pressure, SIP11A through SIP11D, is then used together with the true RCS loop pressure RCP8(I), to calculated the flows SIW10(I) by using fluid inductance in accordance with the following formula:

$$d/dt\ (SIW10(I)) = SIP11A - RCP8(1)/SIIND3$$

This formula is analogous to the electrical current calculation for inductance. The continuity equations are as follows:

$$SIW11 = SIW10(1) + SIW10(2)$$

$$SIW12 = SIW10(3) + SIW10(3)$$

$$SIW13 = SIW11 + SIW12$$

When the pressure downstream of the valve SICV3C (FIG. 101A) is less than the pressure in the tank RWST, the flow from the tank RWST is calculated from the difference between these two pressures, the combined aadmittances for valves SICV1N and SICV10, and the associated piping. The boron concentration in the boron injection tank BIT is obtained from the differential equation:

$$BAMBIT*d/dt\ (SICBIT) = SIW14 * SICBRF - SIW13*SICBIT$$

Safety Injection System SIS4

The safety injection system simulation SIS4 provides for recirculation from the containment sump COSU using the pump RHRPB, containment pressure, and the safety injection pumps SISPA and SISPB.

Admittances for the valves SICV4A and SICV4C, SICV2G, and the associated piping are calculated. The pressure at the pump RHRPB is calculated from the containment pressure and the pressure drop in the valve SICV4A. The pump RHRPB discharge pressure is calculated from the flow characteristics by using the expression as follows:

$$RHPEE8 = RHPEE7 + RHPOP2 - 1.14*10^{-4}* (RHWS12)^2$$

The pressure RHPOP2 is obtained from the pump handler routine hereinbefore described. The pressure distribution is calculated going downstream and using pressure drops in the valves and pipes. The suction pressure SIP13A at the pumps SISPA and SISPB is used to calculate the discharge pressure SIP24A by using the following formula:

$$SIP24A = SIP13A + max(SIPOP1, SIPOP2) - 0.0874*(SIW208)^2$$

When the "S" signal is obtained, or when both pumps SISPA and SISPB are operating, each individual pressure is calculated based on the same relationship as above. Also, the pressures RHP01, RHP02, RHP06, RHP07 and RHP08 are used as temporary variables without reference to the RHR system. The RCS loop pressures SIPS1P, SIPS2P, SIPS3P, SIPS4P, which are calculated from the pressure drop are used together with the "true" RCS pressure RCP1(I) to calculate the flows SIW20(I) in the differential equation described above.

The continuity equations are as follows:

$$SIW205 = SIW20(1) + SIW20(2)$$

$$SIW206 = SIW20(3) + SIW20(4)$$

$$SIW207 = SIW205 + SIW206$$

$$SIW210 = SIW208 + SIW209$$

where SIW208 and SIW209 are the flows through the pumps SISPA and SISPB.

When the pressure RHP01 downstream of the valve SICV4C is smaller than the pressure STPRS of the tank RWST, the flow from the tank RWST is obtained from the following expression:

$$SIW211 = (STPRS - RHP01)*(SICV2M)^2/SISPVL * SIW211$$

Safety Injection System SIS5

The system simulation SIS5 provides for low head safety injection through the pumps RHRPA and RHRPB.

Initially, the admittances for the valves SICV5E and SICV5F and SICV52 and SICV5R, and the associated piping are calculated using the expressions previously given. The pressure distribution is obtained starting from the pressure of the tank RWST and calculating pressure drops toward the RCS loops. The pump discharge pressure of the pumps RHRPA and RHRPB is calculated, as previously described, by calculating the suction pressure from the pressure drops and by using pump characteristics. The expression for the pump RHRPA is as follows:

$$RHPEE3 = RHPEE2 + RHPOP1 - 1.15*10^{-4}* (RHWS6)^2$$

An analogous expression is obtained for the discharge pressure RHPEE8 of the pump RHRPB. The calculated pressure at the RCS loops, RHPS1P, RHPS2P, RHPS3P, and RHPS4P is now used together with the true loop pressure to calcuate the flows RHWS(I) by using fluid inertia as previously described.

When the isolation valves to the loop B test line and the loop A test line referred to as 8884B and 8884A, respectively, or the valves 8885A and 8885B in the accumulator test line are closed, the admittances for such valves are calculated together with the pressure distribution. The calculated pressure for the holdup tank HUT is then used with the true holdup tank pressure WDPVCT to calculate the flows RHWS14 through RHWS17 inclusive. The total flow is obtained from the continuity equations:

$$RHWS3 = RHWS3 + RHWS14 + RHWS15$$

$$RHWS10 = RHWS10 + RHWS16 + RHWS17$$

Safety Injection System SIS6

Referring to FIGS. 101/2 and 91E, 91F, and 91G, the simulation system SIS6 provides for the spraying of cooling water into the containment building through the containment spray pumps CSP1, CSP2, and CSP3, in the event that the pressure or temperature in the containment building exceeds a preset level.

In modeling the system, admittances for the valves CNCV07(1)(2)(3), CNCV3(1)(2)(3), and the valves CNCV4(1)(2)(3), are calculated, together with the associated piping, utilizing the same formula as described in connection with the simulation SIS5 and previous safety injection system simulations. Also, pressure distribution is calculated starting from the pressure in the tank RWST, as described previously, and by using the pressure drops of the form:

$$P_{drop} = W/G$$

The suction pressure CNPE1 for each of the pumps CSP1, CSP2, and CSP3 is obtained from the pressure in the tank RWST and the pressure drop on the associated piping. The discharge pressure CNPE2 of each of the tanks is obtained from the pump characteristics as before in accordance with the following:

$$CNPE2 = CNPE1 + CNPOP1 - CNK2(I)*(CNW2(I))^2$$

The calculated pressure CNPE5 of the pumps CSP1-3 at the containment is obtained by subtracting the pressure drop of the valves in the associated piping. The pressure CNPE5 is used to calculate the flow CNW5(I) by using fluid inertia in accordance with the following expression:

$$d/dt(CNW5(I)) = (CNPE5 - CNPC)/SIIND6$$

The recirculation flow CNW6(I) is obtained from the flow CNW3(I) at the inlet to the valve CNCV3(I) and the recirculation ratio, while the flow CNW2(I) between the recirculation line and the discharge of the pumps CSP1-3 is obtained from the continuity equation.

The flow CNW7(I) from the spray additive tank to the eductor is obtained by using the following equation:

$$CNW7(I) = CNCV07(I)* CNPOH - CNPE6(I)$$

when the pressure drop CNPOH across the eductor is greater than the pressure CNPE6(I), and where CNPE6(I) is obtained from the pressure drop in the eductor line. The flows CNW1(I) from the tank RWST and CNW8(I) at the outlet of the eductor are obtained from the continuity equations:

$$CNW8(I) = CNW6(I) + CNW7(I)$$

$$CNW1(I) = CNW2(I) + CNW8(I)$$

A total flow CNWNAH to the containment atmosphere is obtained from the expressions:

$$CNWNAH = \sum_I CNW7(I)$$

The spray additive tank volume CNVOL is obtained in accordance with the following:

$$(d/dt)(CNVOL) = - CNWHAH * CNSPV$$

Referring to FIGS. 91E and 91G, when the levers for the containment spray pumps CSP1, 2, and 3, are operated in the test mode as indicated by switches CS36, CS37 and CS38, the pumps circulate the flow from the tank RWST through the valves CNCV3(I) and the test lines back to the tank RWST. The flow CNWST(I) is then calculated from the pressure at the outlet of the valves CNCV3(I) and the pressure drop CNPTST on the test line, together with the flow inertia. Thus, the flow calculation is as follows:

$$d/dt (CNWTST(I)) = (CNPTST - CNPSTG)/SIIND6$$

where CNPTST is obtained from the pressure drop in the test line and the pressure CNPE3(I) in accordance with the following expression:

$$CNPTST = CNPE3 - CNWTST(I)/CNTT$$

where:

$$CNTT = (CNCVT(I))^2/CNWTST(I)$$

Safety Injection System SIS7

In the system simulation SIS7, the containment spray is discharged through the residual heat removal system RHR.

Referring to FIGS. 101A and 101B, the admittances of the valves CNCV9 and CNCV10, and RHCV03 and RHCV04 and the associated piping are calculated in the same manner as the valves and piping described in connection with the previous SIS systems. Similarly, the pressure distribution is calculated starting from the pressure at the tank RWST and by using the pressure drops across the valves and in the piping. The suction head of the RHR pumps RHRPA and RHRPB is obtained from the pressure in the tank RWST and the pressure drops across the valves SICV5Q and SICV5R and the valves RHCV03 and RHCV04 in the suction line of the pumps RHRPA, B. The discharge pressure RHPEE3 is obtained as a function of the pumps characteristics. For the pump RHRPA, the expression is written as follows:

$$RHPEE3 = RHPEE2 + RHPOP1 - 1.15*10^{-4} * (RHWS6)^2$$

The discharge pressure for the RHR pump RHRPB is the same form utilizing the particular variables for that pump. The calculated pressures CNPS1 and CNPS2 of the containment are obtained from the pressure drops across the valves and the pipes. The pressure CNPS1 and CNPS2 are then used to obtain the flows CNW9 and CNW10 on the upstream side of the valves CNCV9 and CNCV10, respectively, by applying the equation:

$$d/dt (CNW9) = CNPS1-CNPC/SIIND7$$

and $$d/dt (CNW10) = CNPS2-CNPC/SIIND7$$

Accumulator Simulation ACUMM

Referring to FIGS. 101C and 91C and 91D, the accumulator simulation ACUMM, provides for the automatic injection of water into the RCS loops when the pressure in the loops reaches a predetermined amount less than the pressure in the accumulator tanks AT1, AT2, AT3, and AT4. Initially, a check is made to see if the accumulator tank pressurization is above a predetermined point. If a logical variable ACMCLL is set TRUE, normal operation of the accumulator tanks is not assumed. When the logical variable is set FALSE, normal operation of the accumulator is assumed. A check is then made to determine if the accumulator liquid mass is less than or equal to a total of 800 pounds. In the event that the liquid mass is greater than 800 pounds, the admittances for the various valves in the system are calculated in accordance with the expression:

$$G = C_v^2/W*V_s$$

where W is the flow, $V_s$ is the specific volume of liquid and $C_v$ is obtained from the value characteristics. The valve admittances which are based upon the above formula pertain to the accumulator drain stop valves SACV2, the accumulator test line isolation valves SACV3, the accumulator test isolation valve after the check valve SACV5, and the safety injection pump accumulator test ine isolation valve SICV5W. In each calculation, a check is made to determine if the flow goes to zero for the valve in question, and if so the admittance is set to zero.

Next, the calculation of pressure is executed. In the event that the drain valve SACV2 is open, the calculated pressure of the drain tank is set equal to the pressure of the accumulator tanks; otherwise the calculated drain tank pressure is a constant NDPDRN. The calculated drain tank pressure in addition to being obtained from the accumulator tank pressure; is also obtained from the pressure drop in the admittance of the accumulator drain stop valve SACV2(I). A drain tank pressure is in accordance with the following formula:

$$P_{i+1} = P_i - W/G$$

where $P_i$ is the pressure upstream of the pressure $P_{i+1}$.

Pressure at the check valve, downstream of the valve SACV1, is calculated from the pressure of the accumulator tank and the pressure drop of this valve. Pressure SAPVP1 in the holdup tank HUT is calculated from the pressure at the check valve SACV1 and the pressure drops in the valve SACV3. Also, the pressure SAPVP2 in the holdup tank HUT is calculated from the pressure at the check valves SACV1 and the valve SACV5. A calculated pressure SAPL of the RCS loop, is obtained from the pressure on the check valves SACV1 and the pressure drop in the accumulator piping. In obtaining the flows in the various branches to and from the accumulator tanks, the fluid inertia is utilized in the following equation:

$$d/dt(W) = (P_c - P_t)/I$$

where W is the flow, $P_c$ is the calculated pressure, $P_t$ is the true pressure and I is the fluid inertia. As is apparent the above equation is analogous to the electrical current calculation for inductance.

The continuity equation for the total outflow from the accumulator tanks AT1 through AT4 is in accordance with the following:

$$SAWFA(I) = SAWTL(I) + SAWV1(I) + SAWV2(I)$$

The liquid mass SAMSL(I) in the accumulator tanks AT1 through AT4 is calculated by integrating the inflow and outflow from the accumulator tanks AT1 through AT4 with the expression:

$$d/dt\ (SAMSL(I)) = -(SAWFA(I) - SAWDR(I)) + SAWMF + SAWNF$$

The volume SAVOL(I) of liquid in the accumulator tanks is calculated in accordance with the following:

$$SAV\phi L(I) = SAMSL(I) * SASPV$$

The pressurization of the accumulator tanks AT1 through AT4 is obtained in accordance with the following:

$$P_{new} = P_{old} * (V_{vapor,\ old}/V_{vapor,\ new})$$

In the event the mass SAMSL(I) of the accumulator tanks is less than 800 pounds, and the pressure of the accumulators is dropping at a rate of 4 pounds per square inch per second, and is limited to 64 pounds per square inch absolute, all the outflows from the accumulators are set to zero.

When the accumulator tanks AT1 through AT4 are pressurized with $N_2$ the accumulator pressure SAP(I) is calculated from the following equation:

$$SAP(I) = SAP(I) + SACV6(I)*(SAP1A-SAP(I)*SAKACM/SAVV0(I)$$

where SAKACM is a gas constant of $N_2$, and the pressure SA1PA in the gas line is:

$$SA1PA = SA1PA - \sum_i W_{n2i} * \frac{SAVPIP}{SAVPIP}$$

When the pressure SAP1A in the gas line is less than 700 pounds per square inch and the valves SACVN2 open, the flow of $N_2$ into the accumulator tanks is obtained from the pressure difference between the nitrogen supply and the gas line.

The flow from the vent of the accumulator tanks through the vent valve SACVVT is proportional to the pressure difference between the pressure in the vent pipe and atmospheric pressure, as well as the position of the vent valves SACVVT.

Finally, the pressure in the gas pipes SAP1A is obtained from the inflow-outflow difference and the ratio of the piping volume and gas constant for $N_2$ pressurization.

It is understood that the various inventive features in the improved method and simulation system, may be implemented in either an analog, digital, or analog/digital with or without single or multiple computer apparatus. Also many of the features are applicable in the simulation of other pressurized water reactor plant arrangements, boiling water reactor plants, and gas and other nuclear plant arrangements. It is further understood, that with respect to the individual models, that the changing of one or more models in the simulator does not affect the system, method, or operation of other models in the simulator.

Reference is made to U.S. Pat. application bearing Ser. No. W.E. 43,695 entitled "Training Simulator For A Nuclear Power Plant" and filed by G. L. Gregg, R. E. Putman and J. W. Gomola which is assigned to the present assignee and filed concurrently herewith; and which is incorporated herein by reference and made a part hereof.

What is claimed is:

1. An automated training simulator for the real-time dynamic operation of a nuclear power plant having an engineered safeguards system which includes a non-linear fluid flow network, comprising
   a control console having command devices operable to generate input data values;
   calculating means including sequence controlling means having the following components,
   a. means responsive to the input data to generate a data value relating to flow in the fluid flow network in accordance with a linear equation and a stored constant,
   b. means to generate a data value relating to a nonlinear coefficient in accordance with the generated data value relating to flow; and indicating means governed by the generated flow data value to indicate a physical value for the fluid flow network.

2. A simulator according to claim 1 wherein the calculating means further comprises means to add a data value relating to fluid inertia to the non-linear coefficient data value.

3. A simulator according to claim 1 wherein the fluid flow network corresponds to a residual heat removal system.

4. A simulator according to claim 1 wherein the fluid flow network corresponds to a safety injection system.

5. A simulator according to claim 4 wherein the safety injection system includes plant components common to other fluid networks in the plant and provides a plurality of different paths for different components in accordance with the operational state of the plant, said calculating means further including,
  means to generate data values for a selected path of the safety injection system, and means to select a safety injection path in accordance with the operational state of the plant.

6. A simulator according to claim 1 wherein the fluid flow network corresponds to a chemical and volume control system.

7. A simulator according to claim 6 wherein the chemical and volume control system includes a regulator for operating a predetermined valve for controlling the volume of fluid, said value being in parallel connection with a predetermined valve, said calculating means further including means to generate a predetermined minimum admittance valve for the parallel connected valve for generating a data value relating to the closed position of the predetermined valve.

8. A simulator according to claim 7 wherein the calculating means is structured in a programmed digital computer.

9. A simulator according to claim 1 wherein the calculating means further comprises,
  c. means to generate a data value relating to pressure for each of a predetermined number of locations at the downstream side of valves in the network in accordance with a data value relating to the admittance of each valve,
  d. means to generate the admittance data value of each valve in accordance with data values relating to specific volume and flow through a respective valve,
  e. means to compare the pressure data value at the inlet location of the network to the generated pressure data value at the outlet location of the network, and
  f. means to generate iteratively data values relating to flow in the predetermined locations until the pressure data value at the outlet is equal to the pressure data value at the inlet.

10. A simulator according to claim 9 wherein the generated data values relating to pressure are calculated sequentially from the inlet to the outlet in the direction of fluid flow, and the iterative calculation of flow data values is sequential from the outlet to the inlet counter the direction of flow.

11. A simulator according to claim 10 wherein the iterative calculation of the flow data value is in accordance with the formula $W = G(\Delta P)/V_w$ where $W$ is the flow data value, $G$ is the valve admittance data value, $\Delta P$ is the pressure difference, and $V_w$ is the specific volume of the fluid.

12. A simulator according to claim 9 wherein the fluid flow network corresponds to a residual heat removal system and includes a flow feedback path in parallel with a residual heat removal pump connecting two pressure locations on opposite sides of the pump.

13. A simulator according to claim 9 wherein the calculating means is structured in a programmed digital computer.

14. A simulator according to claim 1 wherein the calculating means is structured in a programmed digital computer.

15. An automated training simulator for the realtime dynamic operation of a nuclear power plant having an engineered safeguards system including a reactor vessel connected to a reactor coolant loop into which boric acid is capable of being injected from a boric acid tank, comprising
  a control console having command devices operable to generate input data values;
  calculating means including sequence controlling means having the following components,
    a. means to generate a data value relating to reactor coolant loop flow and data values relating to nuclear reactor operation,
    b. means to generate data values relating to boron concentration in the reactor coolant loop in accordance with generated data values relating to reactor coolant system flow into and out of a reactor coolant system,
    c. means to generate data values relating to boron concentration for governing the data values relating to nuclear reactor operation,
    d. means to delay the data values relating to a change in boron concentration in accordance with the data value relating to reactor coolant loop flow; and
  indicating means responsive to the generated data values to monitor plant operation.

16. A simulator according to claim 15 wherein the calculating means is structured in a programmed digital computer.

17. An automated training simulator for the realtime dynamic operation of a nuclear power plant having an engineered safeguard system including a surge tank for cooling plant components, comprising
  a control console having command devices operable to generate input data values;
  calculating means including sequence controlling means having the following components,
    a. means to generate a data value relating to average temperature of the fluid in the component cooling system in accordance with a mixing equation,
    b. means to generate a data value relating to the specific volume of the fluid,
    c. means to generate a data value relating to a change in specific volume in accordance with said generated values,
    d. means to generate a data value relating to surge flow in the tank in accordance with the generated specific volume data value; and
  indicating means operative in accordance with the generated data values.

18. A simulator according to claim 17 wherein the surge tank is divided by a baffle into two sections and the surge flow is generated for each part of the tank, wherein the calculating means includes, means to generate a data value relating to the mass of water in each tank section, and means to generate a data value relating to overflow across the baffle in accordance with the generated mass data values.

19. A simulator according to claim 18 wherein the calculating means is structured in a programmed digital computer.

20. A simulator according to claim 17 wherein the calculating means is structured in a programmed digital computer.

21. An automated training simulator for the realtime dynamic operation of a nuclear power plant having an engineered safeguard system that includes a seal flow system for the reactor coolant pumps, comprising a control console having command devices operable to generate input data;

calculating means including sequence controlling means having the following components,
- a. means to generate data values relating to pressure drop across the pump seals in accordance with generated data values including reactor coolant system flow data values,
- b. means to generate data values relating to return flow from the pump seals in accordance with data values related to bypass flow,
- c. means to generate data values relating to seal temperatures in accordance with generated data values relating to reactor coolant system temperature,
- d. means to generate data values relating to seal water temperature at a predetermined rate at times when the inlet flow data is below a predetermined amount; and indicating means governed by the generated data values.

22. A simulator according to claim 21 wherein the calculating means is structured in a programmed digital computer.

23. An automated training simulator for the realtime dynamic operation of a nuclear power plant having an engineered safeguard system that includes an accumulator system having at least one accumulator tank for automatically discharging coolant water into the reactor coolant loops when the pressure in the loop is below a predetermined amount, comprising a control console having command devices for generating input data values;

calculating means including sequence controlling means having the following components,
- a. means to sense a data value relating to pressure in the accumulator tank,
- b. means to sense a data value relating to liquid mass in the accumulator tank,
- c. means to generate data values relating to valve admittances in accordance with a predetermined minimum mass data value,
- d. means to generate a data value relating to accumulator system pressure in accordance with a generated data value relating to accumulator tank pressure,
- e. means to generate a data value relating to accumulator system flow in accordance with generated data value relating to pressure and a fluid inertia data value,
- f. means to generate a data value relating to accumulator tank pressure in accordance with a vapor pressure data value,
- g. means to generate data values relating to the open condition of accumulator system valves when the reactor coolant system pressure is less than the accumulator system pressure; and indicating means governed by the generated data values to monitor plant operation.

24. A simulator according to claim 23 wherein the calculating means is structured in a programmed digital computer.

* * * * *